United States Patent
Sugano

(10) Patent No.: US 11,138,784 B2
(45) Date of Patent: Oct. 5, 2021

(54) IMAGE PROCESSING APPARATUS AND IMAGE PROCESSING METHOD

(71) Applicant: SONY CORPORATION, Tokyo (JP)

(72) Inventor: Hisako Sugano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 30 days.

(21) Appl. No.: 16/318,217

(22) PCT Filed: Jul. 14, 2017

(86) PCT No.: PCT/JP2017/025727
§ 371 (c)(1),
(2) Date: Jan. 16, 2019

(87) PCT Pub. No.: WO2018/021071
PCT Pub. Date: Feb. 1, 2018

(65) Prior Publication Data
US 2019/0164330 A1 May 30, 2019

(30) Foreign Application Priority Data
Jul. 29, 2016 (JP) .............................. JP2016-149886

(51) Int. Cl.
*G06T 15/04* (2011.01)
*G06T 15/20* (2011.01)
(Continued)

(52) U.S. Cl.
CPC .......... *G06T 15/04* (2013.01); *G02B 27/0172* (2013.01); *G06T 15/20* (2013.01);
(Continued)

(58) Field of Classification Search
CPC ....... G06T 15/04; G06T 15/20; G06T 15/205; G06T 19/006; G02B 27/0172
See application file for complete search history.

(56) References Cited

U.S. PATENT DOCUMENTS 9,392,129 B2 * 7/2016 Simmons ............. H04N 13/344
9,473,758 B1 * 10/2016 Long ..................... A63F 13/497
(Continued)

FOREIGN PATENT DOCUMENTS

| CN | 105392538 A | | 3/2016 | |
| JP | 2004-056335 | * | 7/2002 | ............... H04N 7/24 |

(Continued)

OTHER PUBLICATIONS

International Search Report and Written Opinion of PCT Application No. PCT/JP2017/025727, dated Oct. 10, 2017, 8 pages of ISRWO.

(Continued)

*Primary Examiner* — Asghar H Bilgrami
(74) *Attorney, Agent, or Firm* — Chip Law Group

(57) ABSTRACT

Provided are an image processing apparatus and an image processing method that make it possible to reduce a storage capacity necessary for an omnidirectional image. Of a plurality of images generated by perspectively projecting an omnidirectional image mapped to a 3D model onto a plurality of two-dimensional planes, an image corresponding to a viewing direction of a user and an omnidirectional image reduced in resolution are accepted, and a drawing block generates a display image on the basis of at least one of the accepted image and the accepted omnidirectional image reduced in resolution. A viewing direction acquisition block acquires viewing direction information related with the viewing direction of the user, and a sending block sends a viewing direction log recorded on the basis of the acquired viewing direction information.

20 Claims, 35 Drawing Sheets

(51) Int. Cl.
*G02B 27/01* (2006.01)
*G06T 19/00* (2011.01)

(52) U.S. Cl.
CPC .......... *G06T 15/205* (2013.01); *G06T 19/006* (2013.01); *G02B 27/017* (2013.01); *G02B 2027/0192* (2013.01)

(56) References Cited

U.S. PATENT DOCUMENTS

| | | | |
|---|---|---|---|
| 9,877,016 B2 * | 1/2018 | Esteban | G02B 27/0172 |
| 9,918,136 B2 * | 3/2018 | Cole | H04N 13/161 |
| 10,038,887 B2 * | 7/2018 | Gallup | H04N 13/211 |
| 10,402,649 B2 * | 9/2019 | Rabinovich | G06F 3/0346 |
| 2012/0075168 A1 * | 3/2012 | Osterhout | G06F 3/011 |
| | | | 345/8 |
| 2012/0274745 A1 * | 11/2012 | Russell | G06F 3/013 |
| | | | 348/46 |
| 2016/0026253 A1 * | 1/2016 | Bradski | H04N 13/344 |
| | | | 345/8 |
| 2017/0150218 A1 * | 5/2017 | Oobuchi | H04N 21/44218 |

FOREIGN PATENT DOCUMENTS

| | | |
|---|---|---|
| JP | 2004-056335 A | 2/2004 |
| JP | 2006-014174 A | 1/2006 |
| JP | 2015-012334 A | 1/2015 |
| JP | 2016-527536 A | 9/2016 |
| WO | 2014/197226 A1 | 12/2014 |
| WO | WO-2014197226 A1 * 12/2014 ........... A63F 13/212 |
| WO | 2016/009865 A1 | 1/2016 |

OTHER PUBLICATIONS

Office Action for JP Patent Application No. 2018-529783, dated May 18, 2021, 03 pages of English Translation and 03 pages of Office Action.

* cited by examiner

FIG. 4

| ID | AZIMUTH ANGLE | ELEVATION ANGLE | ROTATION ANGLE | HORIZONTAL VIEW ANGLE | VERTICAL VIEW ANGLE | NUMBER OF HORIZONTAL PIXELS | NUMBER OF VERTICAL PIXELS |
|---|---|---|---|---|---|---|---|
| 1 | −90° | 0° | 0° | 90° | 90° | 1024 | 1024 |
| 2 | −45° | 0° | 0° | 90° | 90° | 1024 | 1024 |
| 3 | 0° | 0° | 0° | 90° | 90° | 1024 | 1024 |
| 4 | +45° | 0° | 0° | 90° | 90° | 1024 | 1024 |
| 5 | +90° | 0° | 0° | 90° | 90° | 1024 | 1024 |

FIG. 16A

| TIME | FILE NAME | AZIMUTH ANGLE | ELEVATION ANGLE | ROTATION ANGLE | LINE-OF-SIGHT VECTORS (x,y,z) | | | VIEWPOINT COORDINATES (x,y,z) | | | HORIZONTAL VIEW ANGLE | VERTICAL VIEW ANGLE | NUMBER OF HORIZONTAL PIXELS | NUMBER OF VERTICAL PIXELS |
|---|---|---|---|---|---|---|---|---|---|---|---|---|---|---|
| t | posZ | 0° | +30° | 0° | 0 | 0 | +1 | 0 | 0 | 0 | 90° | 90° | 1024 | 1024 |
| t+1 | posX | +90° | +25° | 0° | +1 | 0 | 0 | 0 | 0 | 0 | 90° | 90° | 1024 | 1024 |
| t+2 | posX | +90° | +25° | 0° | +1 | 0 | 0 | 0 | 0 | 0 | 90° | 90° | 1024 | 1024 |
| t+3 | negZ | −180° | +20° | 0° | −1 | 0 | 0 | 0 | 0 | 0 | 90° | 90° | 1024 | 1024 |

FIG. 16B

| TIME | FILE NAME | AZIMUTH ANGLE | ELEVATION ANGLE | ROTATION ANGLE | LINE-OF-SIGHT VECTORS (x,y,z) | | | VIEWPOINT COORDINATES (x,y,z) | | | HORIZONTAL VIEW ANGLE | VERTICAL VIEW ANGLE | NUMBER OF HORIZONTAL PIXELS | NUMBER OF VERTICAL PIXELS |
|---|---|---|---|---|---|---|---|---|---|---|---|---|---|---|
| t | posZ | 0° | +30° | 0° | 0 | 0 | +1 | 0 | 0 | 0 | 90° | 90° | 1024 | 1024 |
| t+1 | posX | +90° | +25° | 0° | +1 | 0 | 0 | +1 | 0 | 0 | 90° | 90° | 1024 | 1024 |
| t+2 | posX | +90° | +25° | 0° | +1 | 0 | 0 | +2 | 0 | 0 | 0° | 90° | 1024 | 1024 |
| t+3 | negZ | −180° | +20° | 0° | −1 | 0 | 0 | 0 | 0 | −3 | 90° | 90° | 1024 | 1024 |

(Annotations: "MOVE TO RIGHT", "MOVE FORWARD", "CROUCHED")

FIG. 21

IMAGE PROCESSING APPARATUS AND IMAGE PROCESSING METHOD

CROSS REFERENCE TO RELATED APPLICATIONS

This application is a U.S. National Phase of International Patent Application No. PCT/JP2017/025727 filed on Jul. 14, 2017, which claims priority benefit of Japanese Patent Application No. JP 2016-149886 filed in the Japan Patent Office on Jul. 29, 2016. Each of the above-referenced applications is hereby incorporated herein by reference in its entirety.

TECHNICAL FIELD

The present disclosure relates to an image processing apparatus and an image processing method and, more particularly, to an image processing apparatus and an image processing method that are configured to reduce a storage size necessary for storing omnidirectional images.

BACKGROUND ART

A storage apparatus is known in which an omnidirectional image is generated by mapping images captured in surrounding 360 degrees in a horizontal direction and surrounding 180 degrees in a vertical direction with a multiple-camera onto a 2D image (a plane image) (refer to PTL 1, for example).

In addition, a reproduction apparatus is known in which an encoded stream of an omnidirectional image stored in a storage apparatus is decoded and a resultant omnidirectional image is used so as to cause a texture image in a vision field range of a viewer (hereafter also referred to as a user) to be displayed. In such a reproduction apparatus, an omnidirectional image is attached on the surface of a 3D model such as a sphere or a cube and, as seen from a viewpoint that is one point inside that 3D model, a texture image in the vision field range of the viewer at the time when the surface of a 3D model in the line-of-sight direction of the viewer is viewed is displayed. Consequently, a captured image in the vision field range of a viewer of a predetermined viewpoint is reproduced.

CITATION LIST

Patent Literature

[PTL 1]
Japanese Patent Laid-Open No. 2006-14174

SUMMARY

Technical Problem

However, realizing such a reproduction apparatus requires a large storage size because images in all directions that are possibly the line-of-sight directions of a viewer, namely, omnidirectional images need be stored.

Therefore, the present disclosure addresses the above-identified and other problems associated with related-art methods and apparatuses and solves the addressed problems by providing an image processing apparatus and an image processing method that are configured to reduce the storage size necessary for storing omnidirectional images.

Solution to Problem

An image processing apparatus according to a first aspect of the present disclosure is an image processing apparatus including: an acceptance block configured to accept, of a plurality of images generated by projecting an omnidirectional image mapped to a 3D model onto a plurality of two-dimensional planes, an image corresponding to a viewing direction of a user and the omnidirectional image reduced in resolution; a drawing block configured to generate a display image on the basis of at least one of the image or the omnidirectional image reduced in resolution accepted by the acceptance block; a viewing direction acquisition block configured to acquire viewing direction information related with the viewing direction of the user; and a sending block configured to send a viewing direction log recorded on the basis of the viewing direction information acquired by the viewing direction acquisition block.

An image processing method according to the first aspect of the present disclosure corresponds to the image processing apparatus according to the first aspect of the present disclosure.

In the first aspect of the present disclosure, of a plurality of images generated by projecting an omnidirectional image mapped to a 3D model onto a plurality of two-dimensional planes, an image corresponding to a viewing direction of a user and the omnidirectional image reduced in resolution are accepted, and a display image is generated on the basis of at least one of the image or the omnidirectional image reduced in resolution thus accepted. Further, viewing direction information related with the viewing direction of the user is acquired, and a viewing direction log recorded on the basis of the viewing direction information thus acquired is sent.

An image processing apparatus according to a second aspect of the present disclosure is an image processing apparatus including: a storage block configured to store a plurality of images generated by projecting an omnidirectional image mapped to a 3D model onto a plurality of two-dimensional planes and the omnidirectional image reduced in resolution; a sending block configured to send the omnidirectional image and an image corresponding to a viewing direction of a user among the plurality of images to a terminal; an acceptance block configured to accept a viewing direction log related with the viewing direction of the user from the terminal; and an image change block configured to change the plurality of images stored in the storage block in accordance with the viewing direction log accepted by the acceptance block.

An image processing method according to the second aspect of the present disclosure corresponds to the image processing apparatus according to the second aspect of the present disclosure.

In the second aspect of the present disclosure, from a storage block in which a plurality of images generated by projecting an omnidirectional image mapped to a 3D model onto a plurality of two-dimensional planes and the omnidirectional image reduced in resolution are stored, the omnidirectional image and an image corresponding to a viewing direction of a user among the plurality of images are sent to a terminal. Further, a viewing direction log related with the viewing direction of the user is accepted from the terminal. The plurality of images stored in the storage block are changed in accordance with the viewing direction log thus accepted.

It should be noted that the image processing apparatuses according to the first and second aspects of the present disclosure can be realized by having a computer execute programs.

Further, programs for having a computer realize the image processing apparatuses according to the first and second aspects of the present disclosure can be provided by transmission via a transmission medium or as recorded in a recording medium.

Advantageous Effect of Invention

According to the first aspect of the present disclosure, images can be changed. Further, according to the first aspect of the present disclosure, the storage capacity necessary for an omnidirectional image can be reduced.

Further, according to the second aspect of the present disclosure, images can be changed. Further, according to the second aspect of the present disclosure, the storage capacity necessary for an omnidirectional image can be reduced.

It should be noted that the effects described here are not always limited; namely, any other effects described in the present disclosure may also be included.

FIG. 4 is diagram depicting a configurational example of a two-dimensional plane table.

FIGS. 16A and 16B are diagrams depicting an example of a viewing direction log.

Figure 18:
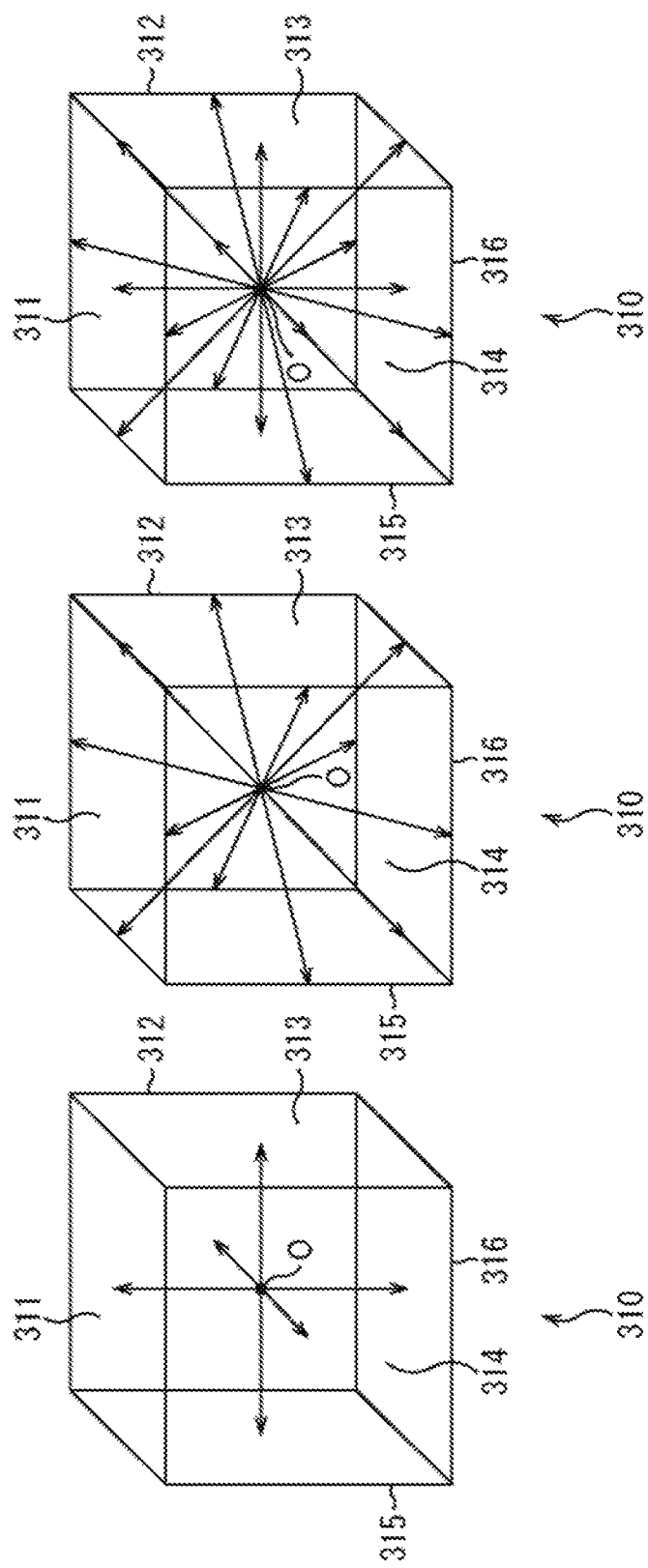

FIGS. 18A, 18B, and 18C are diagrams depicting a second example of a two-dimensional plane.

Figure 19:
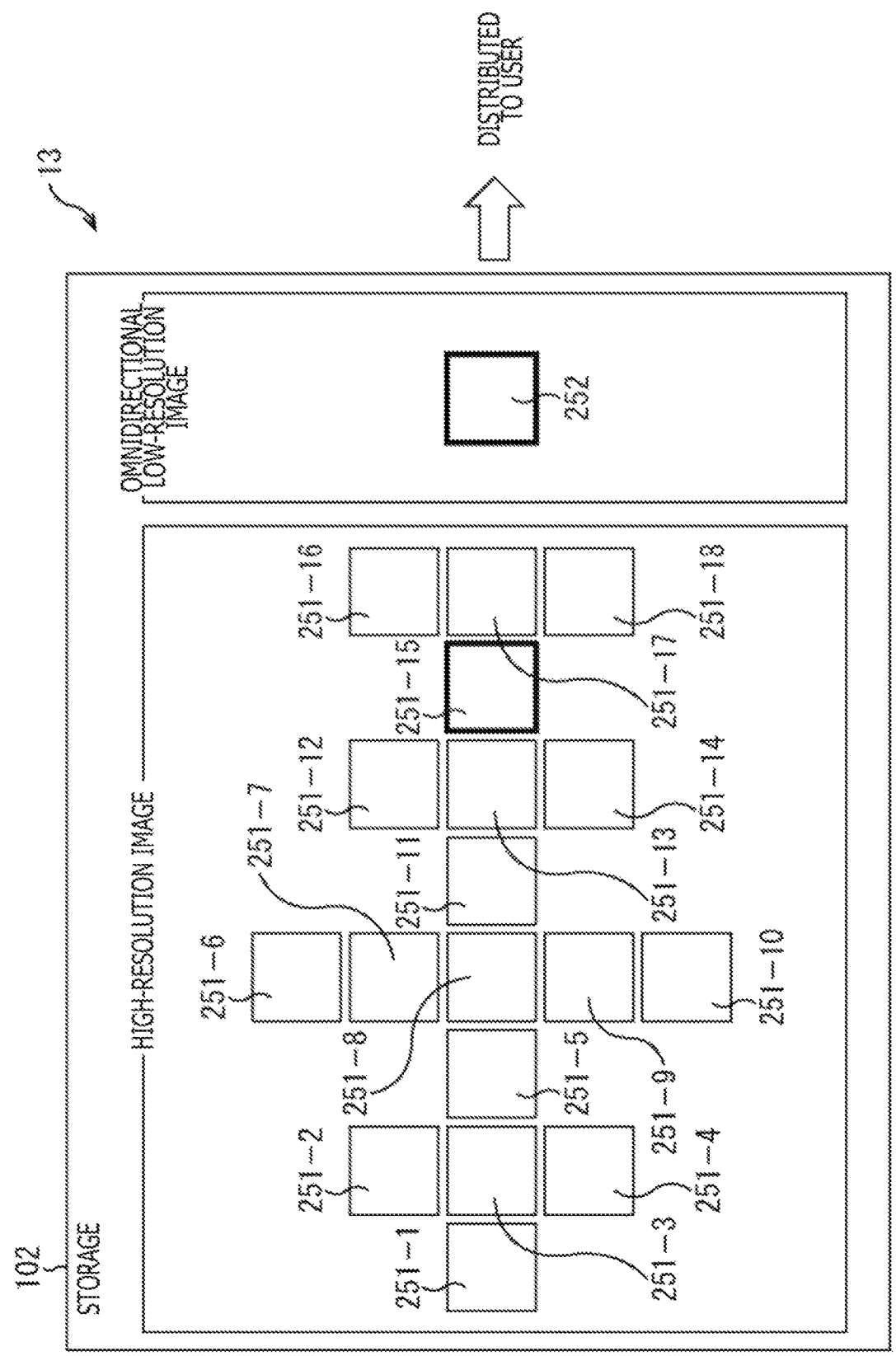

FIG. 19 is a diagram describing a first method of image changing processing.

Figure 20:
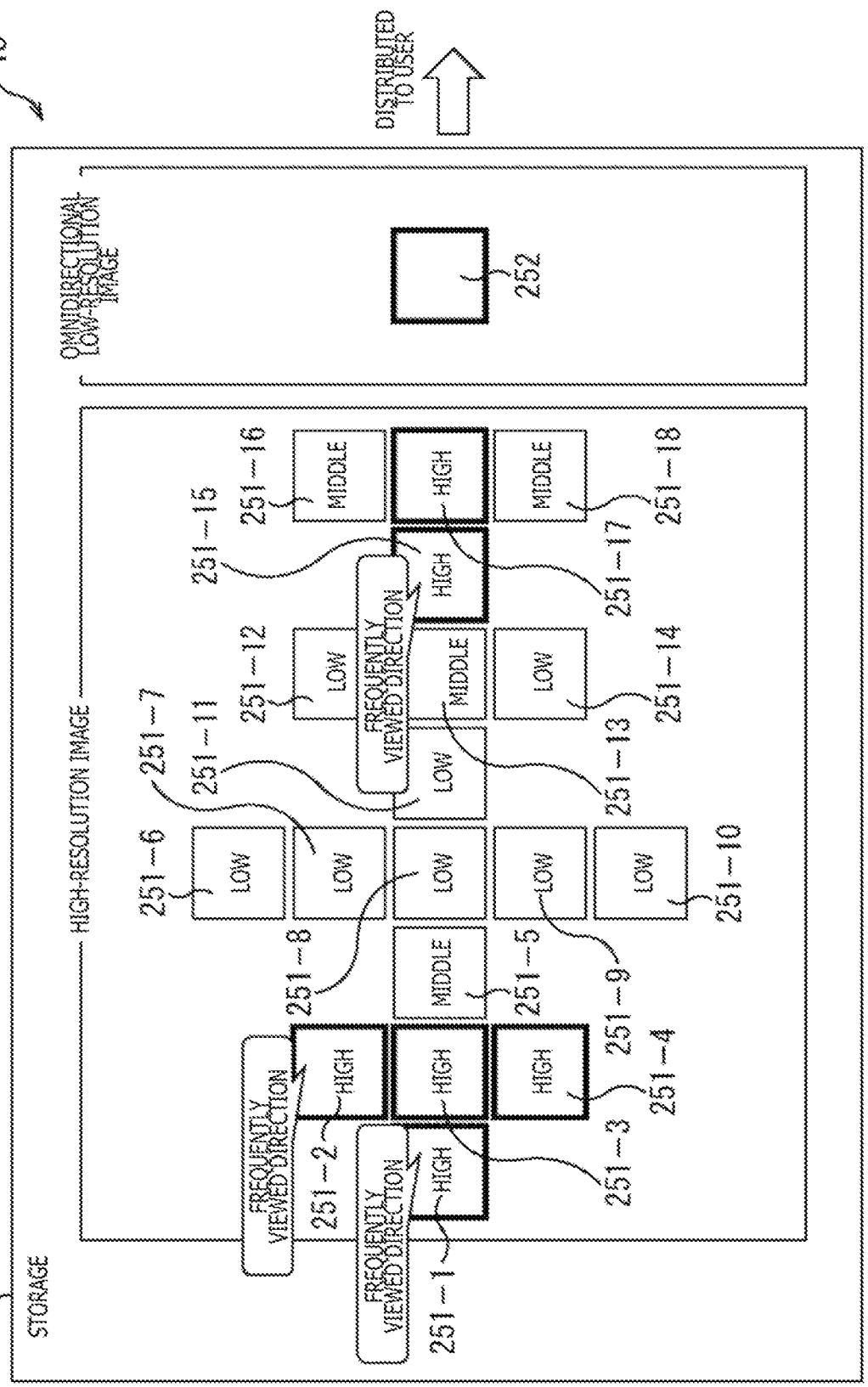

FIG. 20 is a diagram describing the first method of image changing processing.

Figure 21:
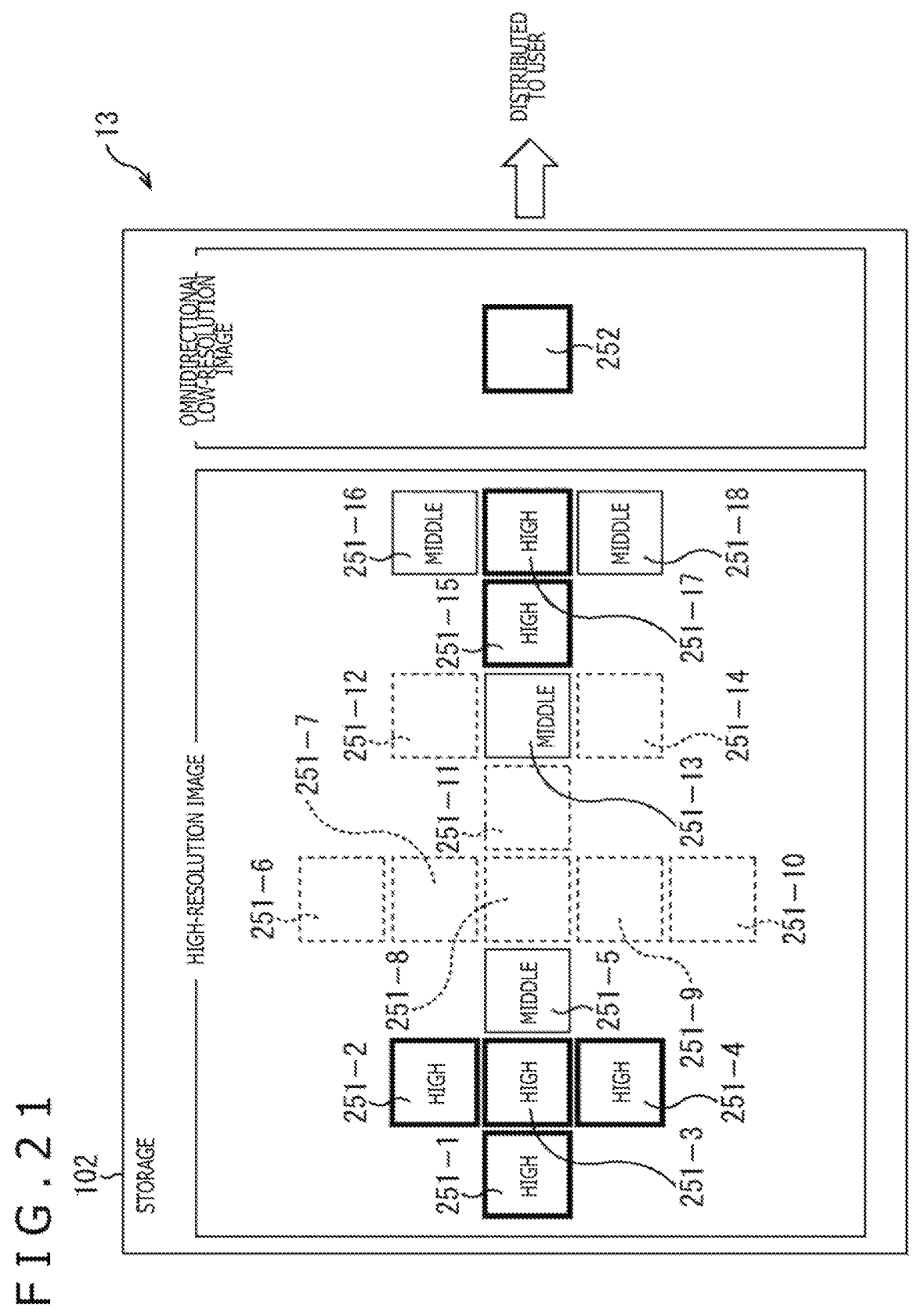

FIG. 21 is a diagram describing a second method of image changing processing.

Figure 22:
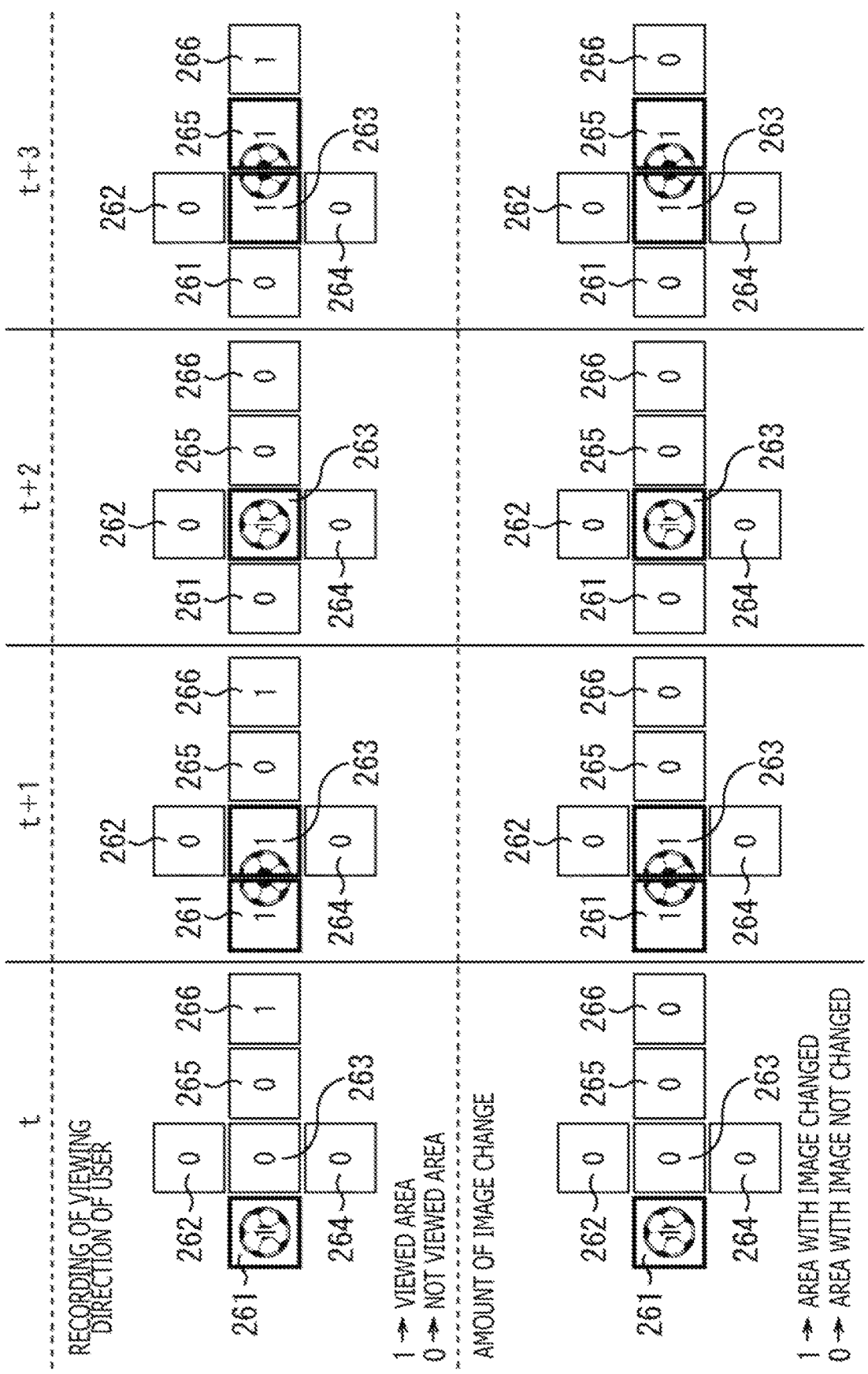

FIG. 22 is a diagram describing the second method of image changing processing.

Figure 23:
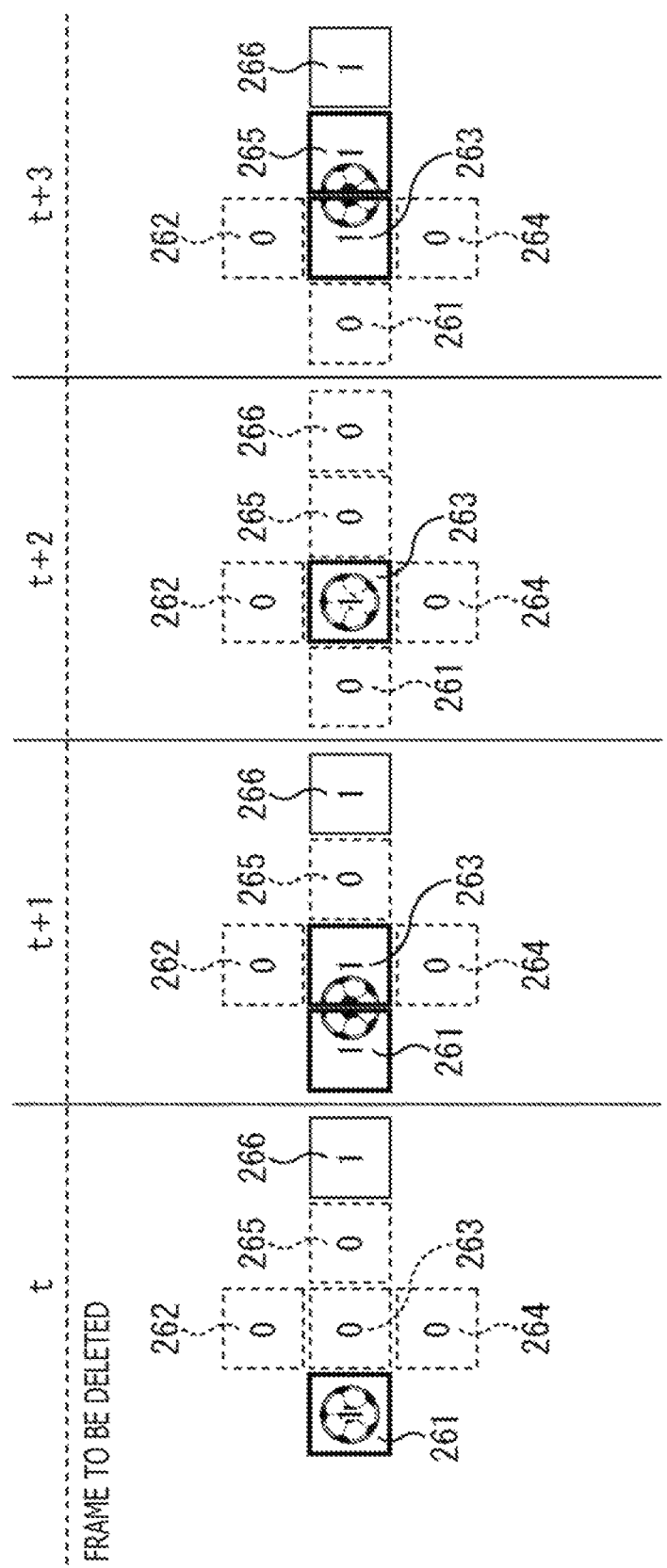

FIG. 23 is a diagram describing the second method of image changing processing.

Figure 24:
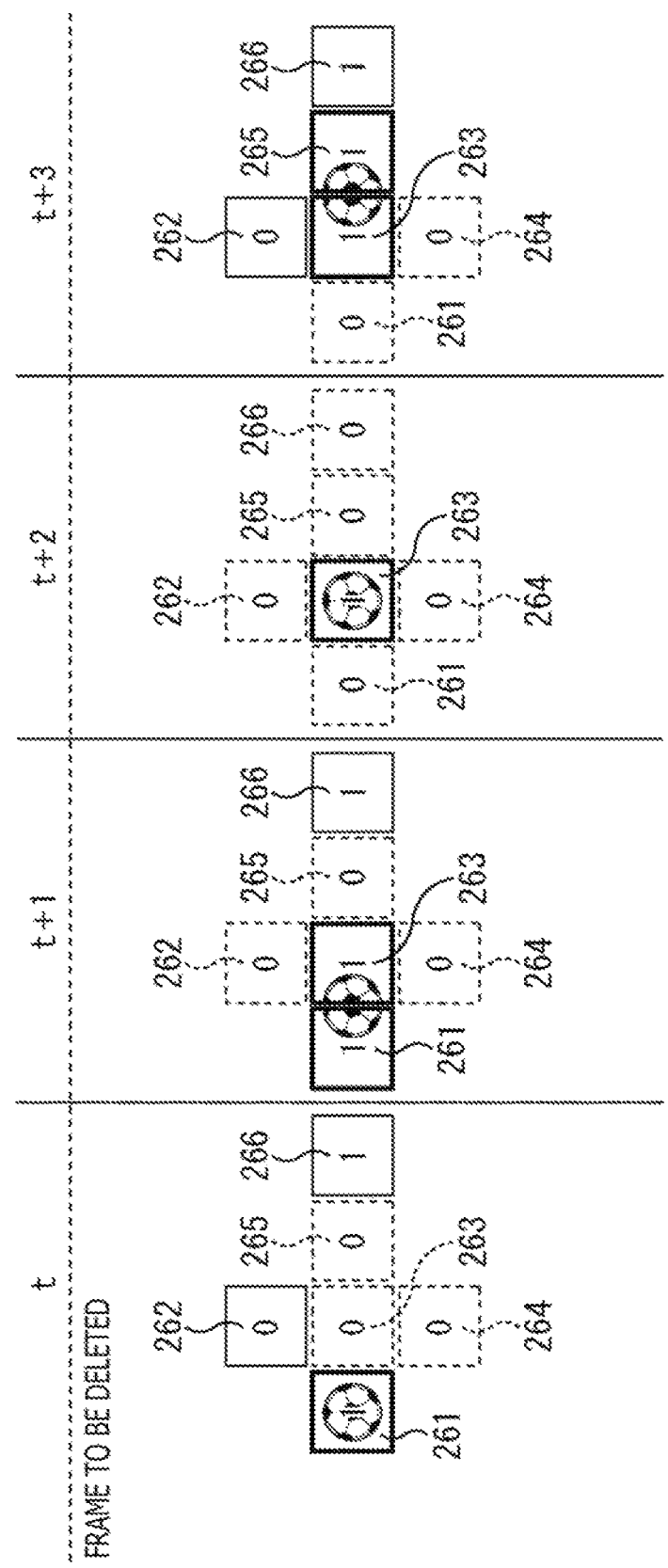

FIG. 24 is a diagram describing the second method of image changing processing.

Figure 25:
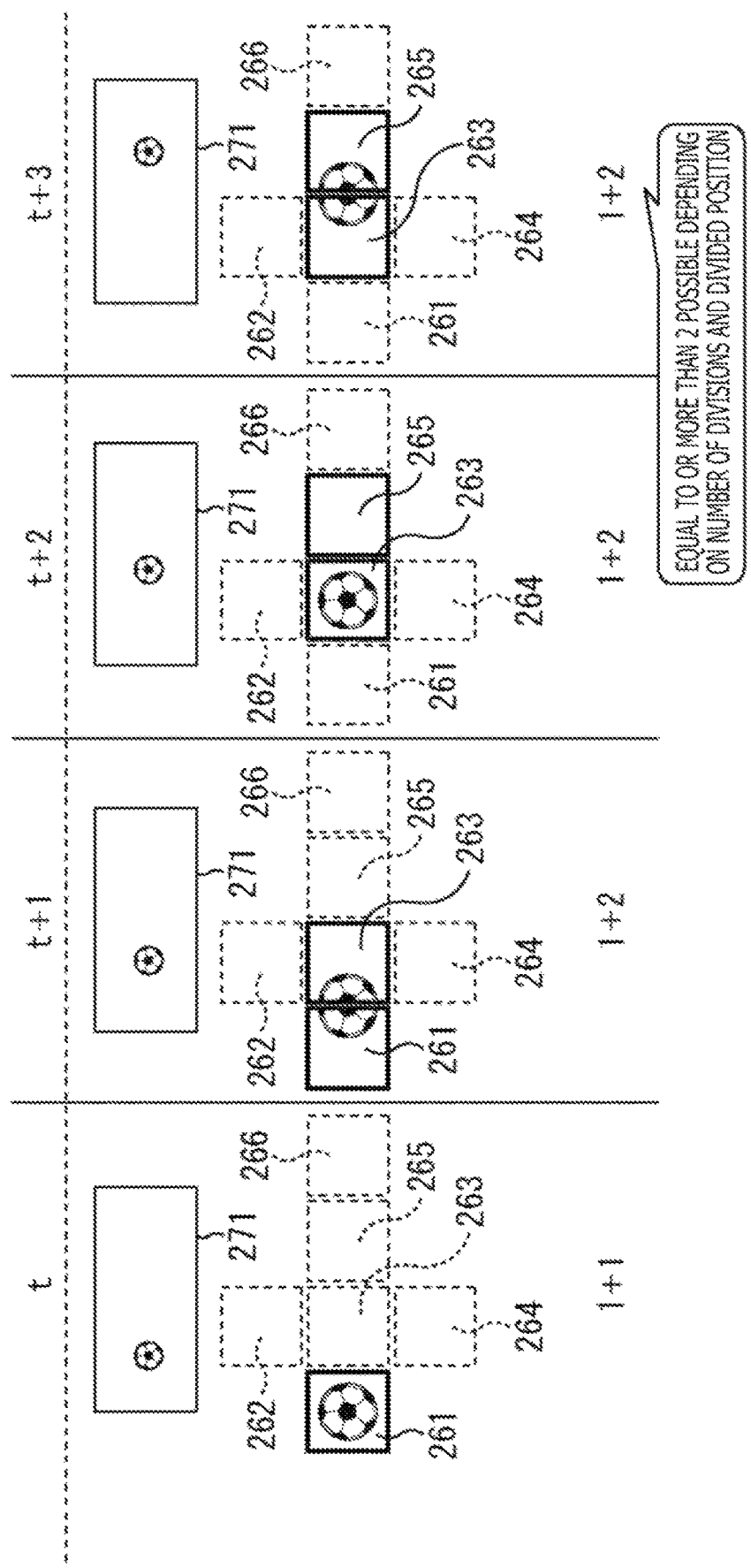

FIG. 25 a diagram describing a third method of image changing processing.

Figure 26:
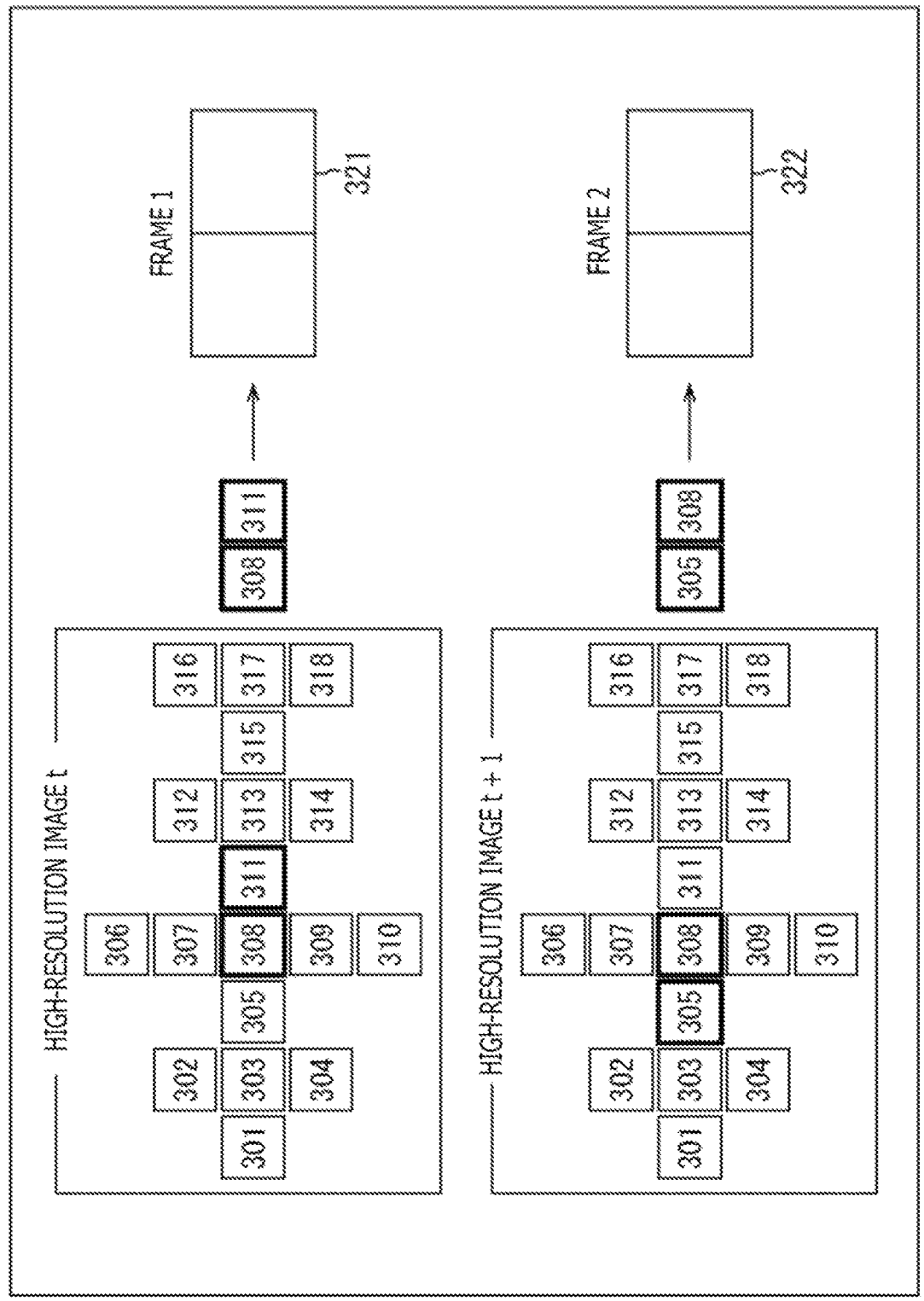

FIG. 26 is a diagram describing 2D image generation processing.

Figure 27:
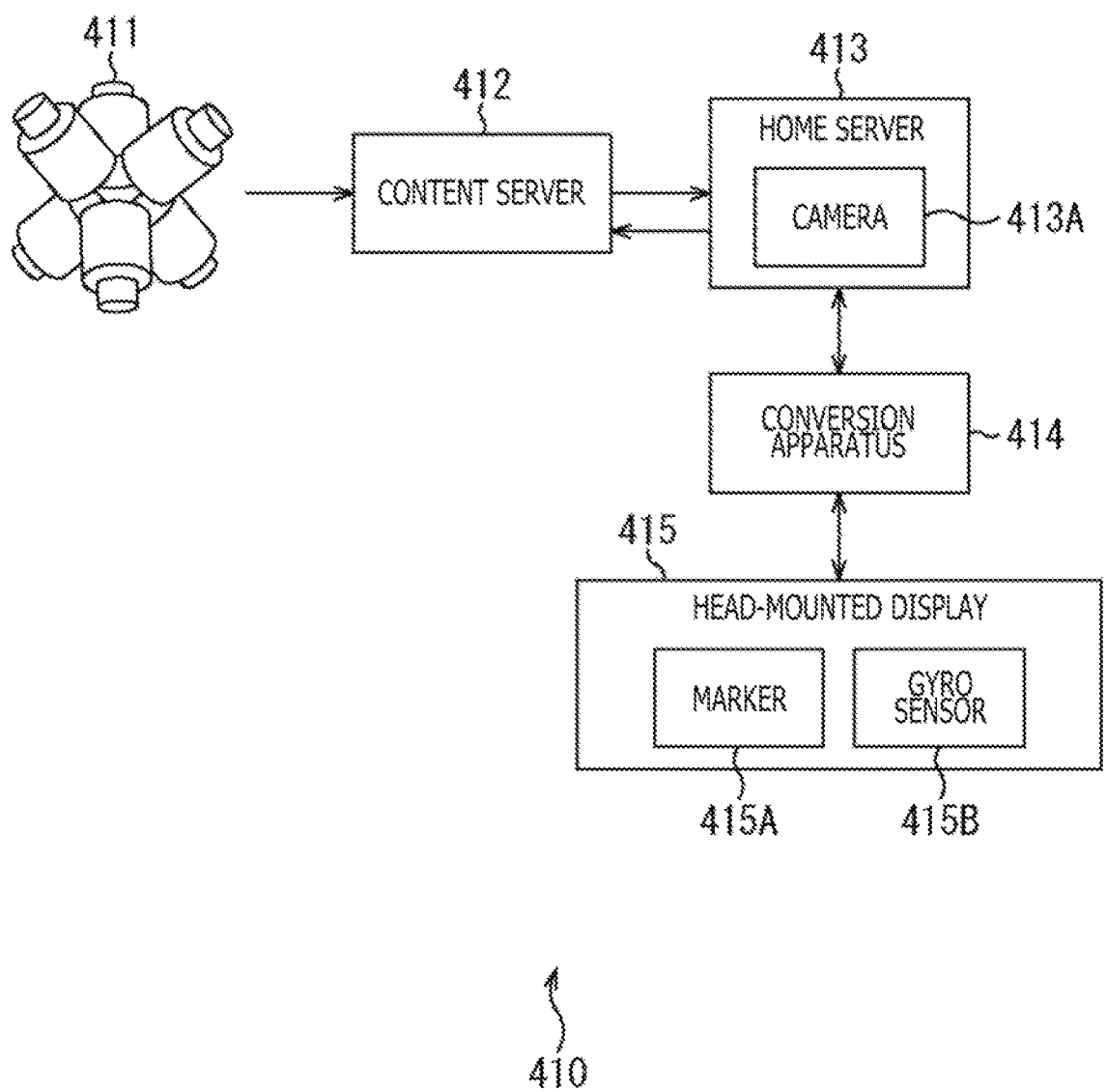

FIG. 27 is a block diagram depicting a configurational example of a first embodiment of an image display system to which the present disclosure is applied.

Figure 28:
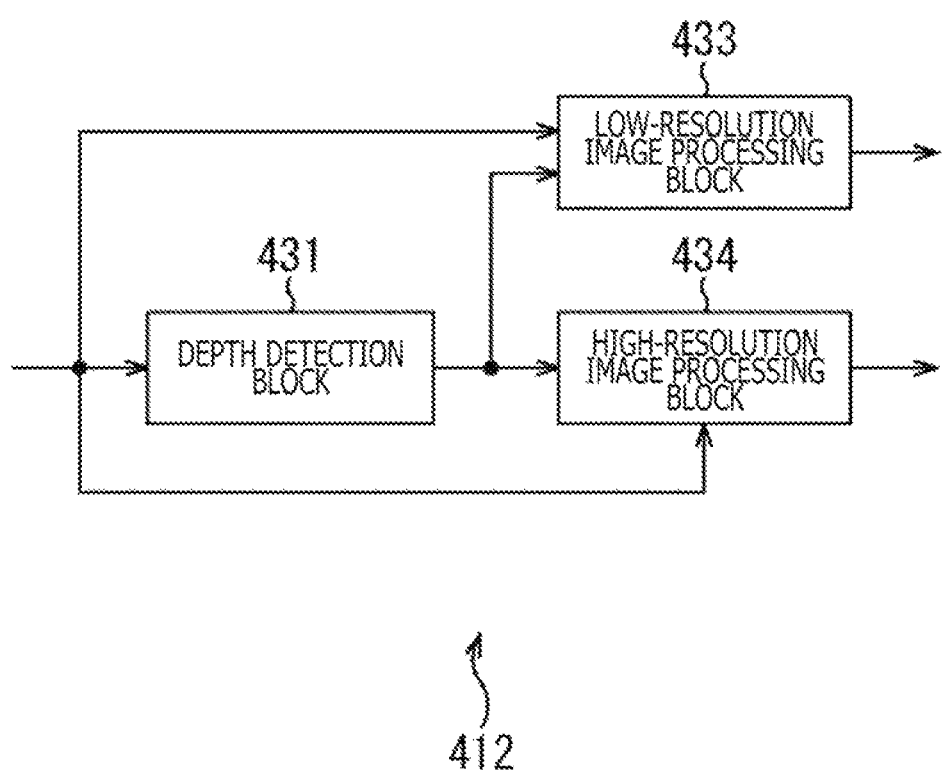

FIG. 28 is a block diagram depicting a configurational example of a content server.

Figure 29:
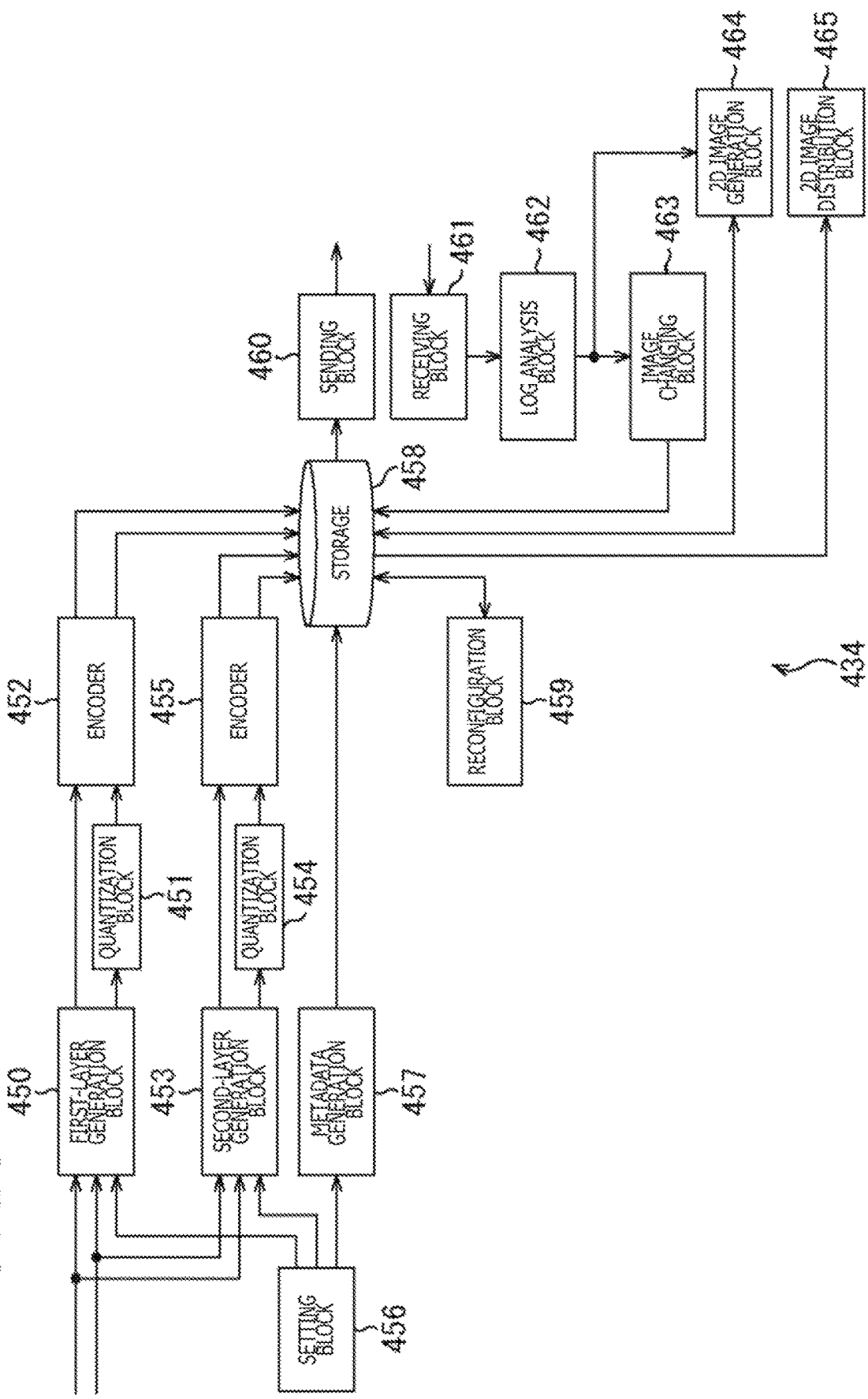

FIG. 29 is a block diagram depicting a configurational example of a high-resolution image processing block.

Figure 30:
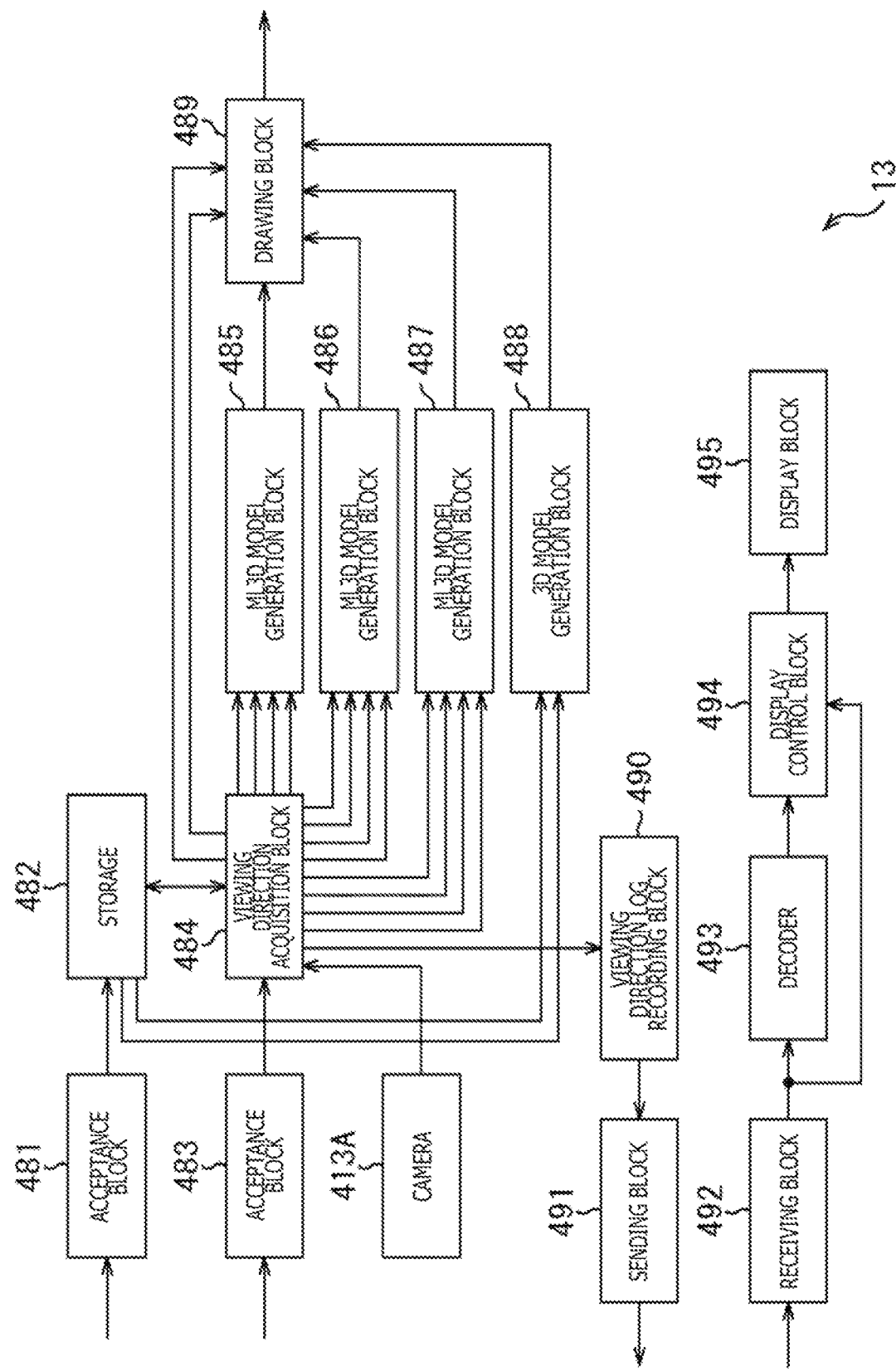

FIG. 30 is a block diagram depicting a configurational example of a home server.

Figure 31:
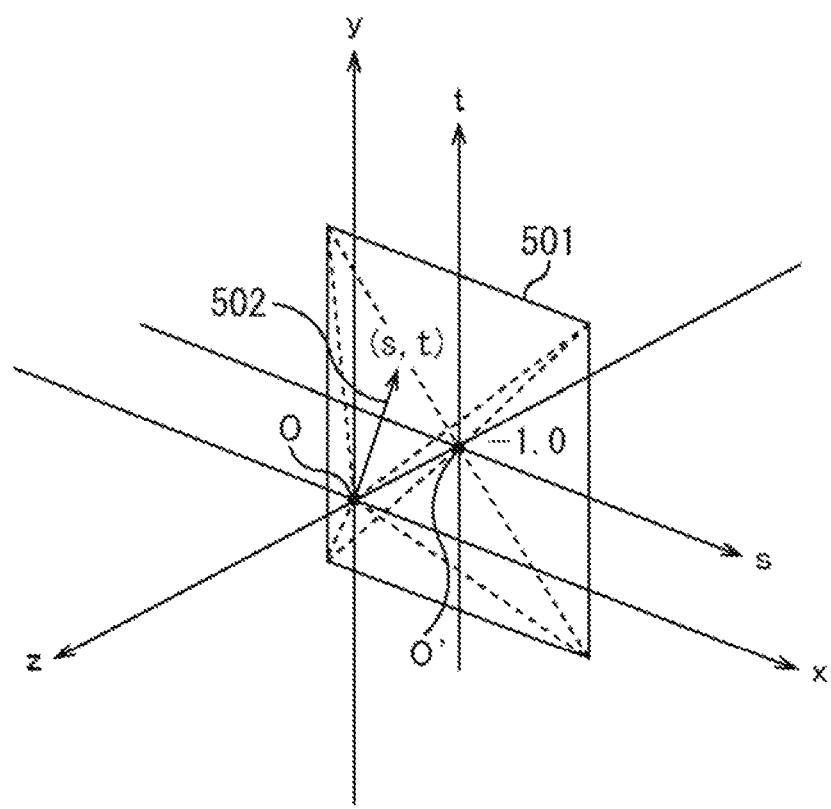

FIG. 31 is a diagram describing a coordinate system of a projection surface.

Figure 32:
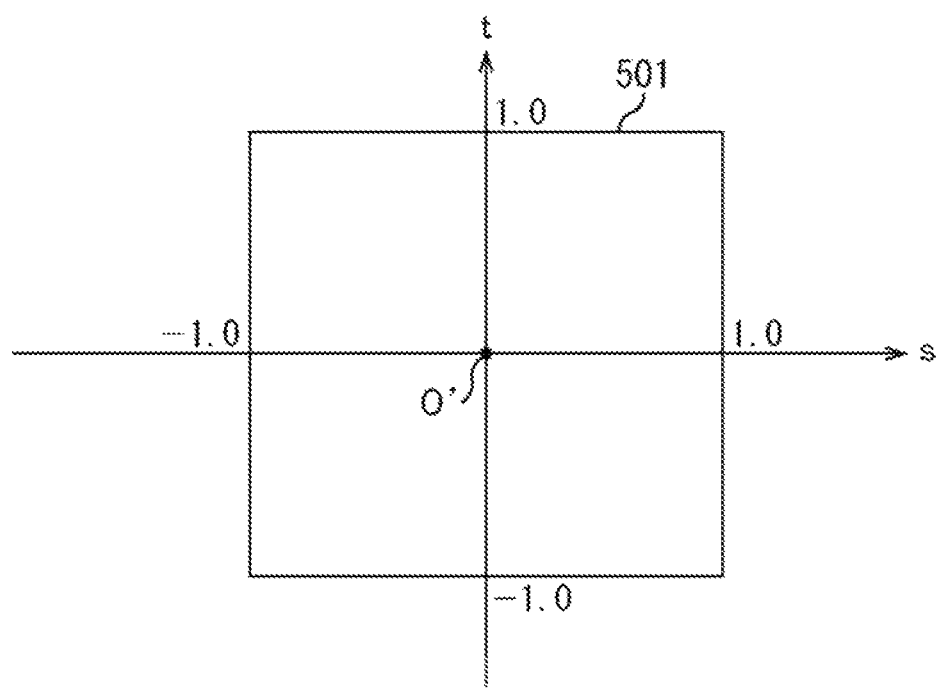

FIG. 32 is a diagram describing tan-axis projection.

Figure 33:
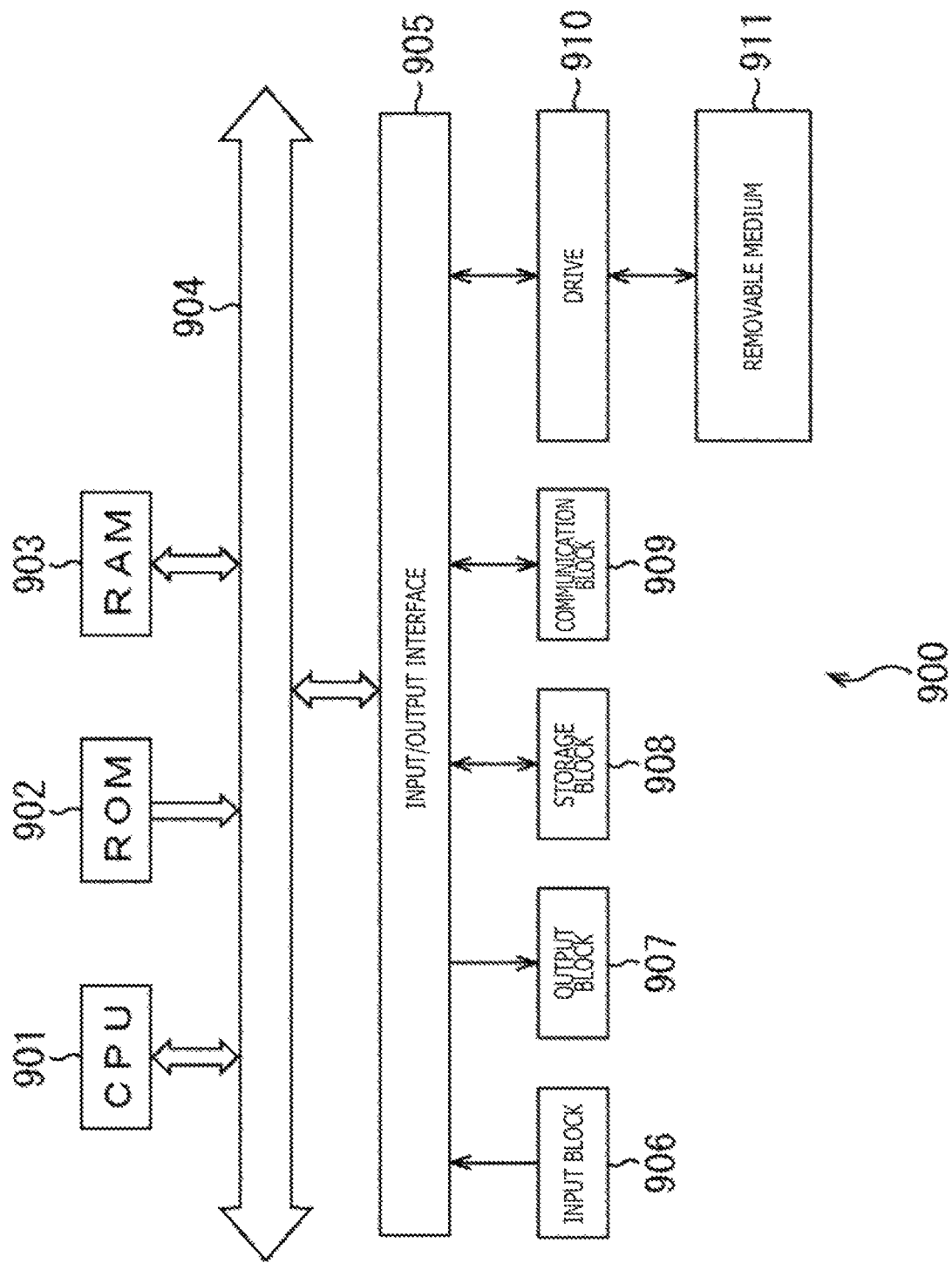

FIG. 33 is a block diagram depicting a configurational example of the hardware of a computer.

Figure 34:
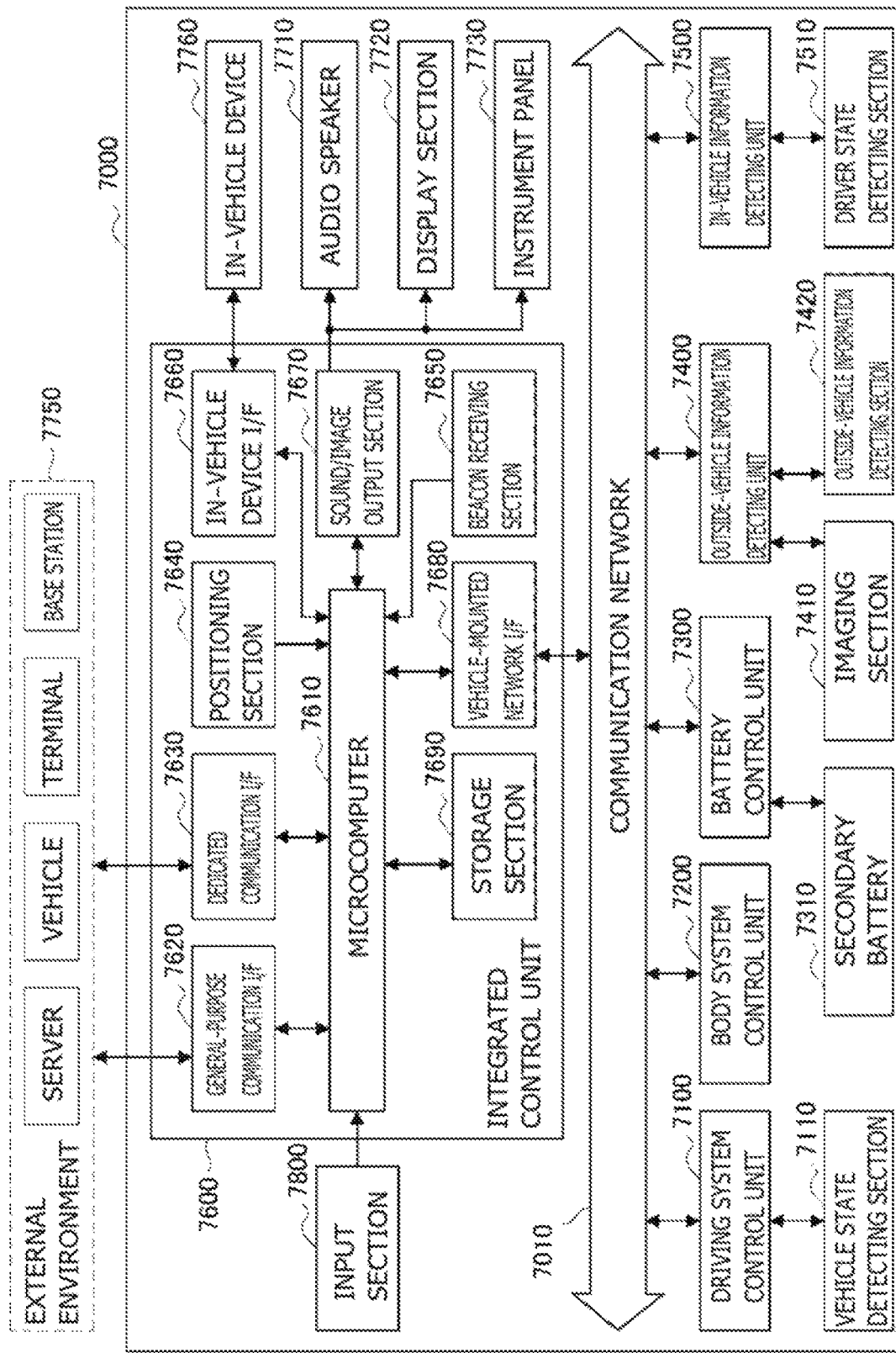

FIG. 34 is a block diagram depicting an example of schematic configuration of a vehicle control system.

Figure 35:
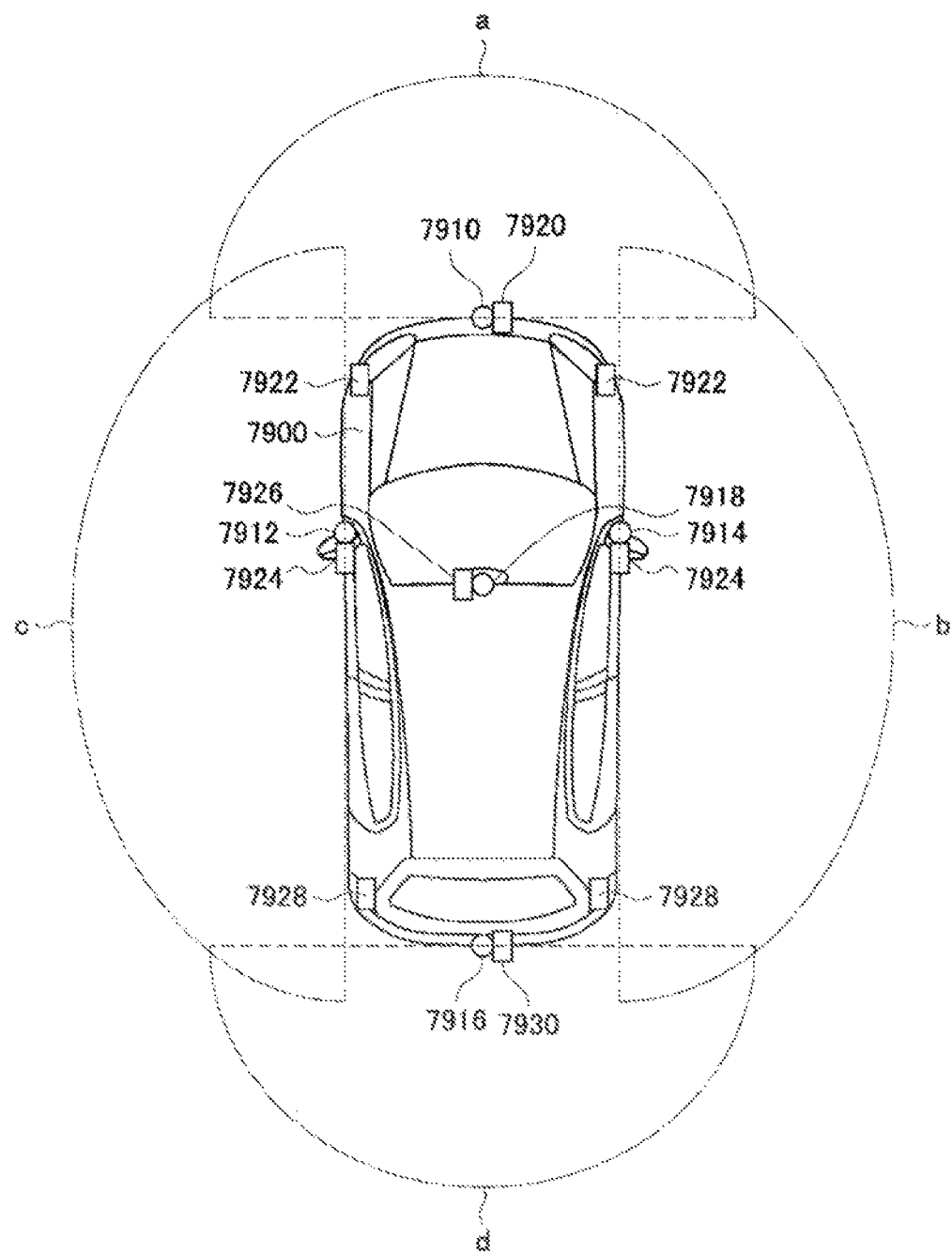

FIG. 35 is a diagram of assistance in explaining an example of installation positions of an outside-vehicle information detecting section and an imaging section.

DESCRIPTION OF EMBODIMENTS

The following describes modes (hereafter referred to as embodiments) for practicing the present disclosure. It should be noted that the description will be done in the following order:

1. First Embodiment: Distribution System (FIG. 1 through FIG. 26)
2. Second Embodiment: Image Display System (FIG. 27 through FIG. 30)
3. Third Embodiment: tan-axis Projection (FIG. 31 and FIG. 32)
4. Fourth Embodiment: Computer (FIG. 33)
5. Application examples (FIG. 34 and FIG. 35)

1. First Embodiment (Configurational Example of Distribution System)

Figure 1:
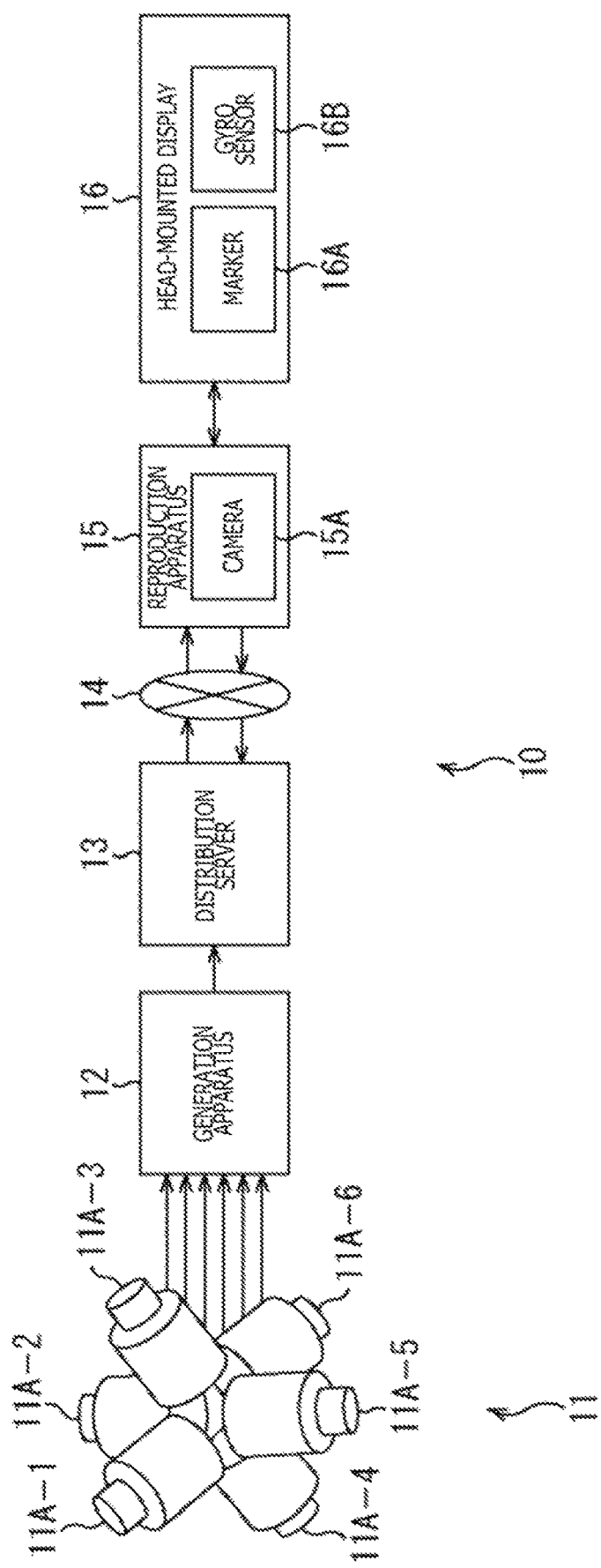
FIG. 1 is a block diagram depicting a configurational example of a first embodiment of a distribution system to which the present disclosure is applied.

FIG. 1 is a block diagram depicting a configurational example of the distribution system to which the present disclosure is applied.

The distribution system 10 depicted in FIG. 1 has an image-capture apparatus 11, a generation apparatus 12, a distribution server 13, a network 14, a reproduction apparatus 15, and a head-mounted display 16. The distribution system 10 generates an omnidirectional image from captured images captured by the image-capture apparatus 11 so as to display a display image in the vision field range of a user (or a viewer) by use of the generated omnidirectional image.

To be more specific, the image capture apparatus 11 of the distribution system 10 has six cameras 11A-1 through 11A-6. It should be noted that, in what follows, the cameras 11A-1 through 11A-6 are generically referred to as a camera 11A unless otherwise specified.

Each camera 11A captures a moving image. The image capture apparatus 11 supplies the moving images in six directions captured by the cameras 11A to the generation apparatus 12 as captured images. It should be noted that the number of cameras installed on the image capture apparatus 11 may be any other than six units if not one.

The generation apparatus 12 generates an omnidirectional image from the captured images supplied from the image capture apparatus 11 by a method based on equirectangular projection and reduces the resolution of the generated omnidirectional image. The generation apparatus 12 encodes the low-resolution image (or a YUV image) that is the omnidirectional image reduced in resolution so as to generate one low-resolution stream.

Further, the generation apparatus 12 maps the omnidirectional image onto a sphere that is a 3D model and perspectively projects the omnidirectional image mapped to the sphere onto two-dimensional planes corresponding to five viewing directions (or line-of-sight directions) with the center of the sphere being the focal point, thereby generating five images. The generation apparatus 12 encodes each of the five images into a high-resolution image (a YUV image), thereby generating five high-resolution streams.

Still further, the generation apparatus 12 generates two-dimensional plane information indicative of the position, tilt, and size of a two-dimensional plane corresponding to each high-resolution image. The generation apparatus 12 uploads one low-resolution stream, five high-resolution streams, and the two-dimensional plane information to the distribution server 13.

The distribution server 13 is connected to the reproduction apparatus 15 via the network 14. The distribution server 13 stores the one low-resolution stream, five high-resolution streams, and two-dimensional plane information uploaded from the generation apparatus 12. In response to a request from the reproduction apparatus 15, the distribution server 13 sends the stored low-resolution stream, high-resolution streams, and two-dimensional plane information to the reproduction apparatus 15 via the network 14.

In addition, the distribution server 13 receives a viewing direction log sent from the reproduction apparatus 15, analyzes a user viewing timestamp and a viewing vision field angle that provide a viewing direction log, and extracts an attention point. The attention point is a point indicative of a most viewed viewing direction. On the basis of the extracted attention point, the distribution server 13 changes a stored high-resolution image (the compression ratio and the resolution thereof). Also, on the basis of the timestamp and vision field angle of the attention point, the distribution server 13 generates a 2D image and distributes the generated 2D image to the reproduction apparatus 15 of a user who has viewed at a vision field angle different from the attention point.

The reproduction apparatus 15 requests the distribution server 13 for one low-resolution stream and the two-dimensional plane information via the network 14 and receives the one low-resolution stream and the two-dimensional plane information sent in response to this request.

Further, the reproduction apparatus 15 internally has the camera 15A so as to capture a marker 16A attached to the head-mounted display 16. Then, on the basis of the captured image of the marker 16A, the reproduction apparatus 15 detects a viewing position of the user in a 3D model coordinate system. Further, the reproduction apparatus 15 receives results of the detection by a gyro sensor 16B of the head-mounted display 16 from the head-mounted display 16. On the basis of the results of the detection by the gyro sensor 16B, the reproduction apparatus 15 determines the viewing direction of the user in the 3D model coordinate system. On the basis of the viewing position and the viewing direction, the reproduction apparatus 15 determines the vision field range of the user position inside the 3D model.

Then, on the basis of the two-dimensional plane information and the vision field range of the user, the reproduction apparatus 15 requests for one of the five high-resolution streams via the network 14 and accepts the requested one high-resolution stream sent in response to this request.

The reproduction apparatus 15 decodes the accepted one low-resolution stream and one high-resolution stream. The reproduction apparatus 15 maps the low-resolution image obtained as a result of the decoding onto a sphere that is a 3D model and maps the high-resolution image onto a two-dimensional plane that is a 3D model internal to the sphere so as to generate a 3D model image.

Then, the reproduction apparatus 15 perspectively projects the 3D model image into the vision field range of the user with the viewing position being the focal point, thereby generating the image in the vision field range of the user as a display image. The reproduction apparatus 15 supplies the display image to the head-mounted display 16.

Further, during viewing, the reproduction apparatus 15 records a viewing direction log that includes a log of viewing timestamp and viewing vision field angle or the like and, upon the end of viewing, sends the recorded viewing direction log to the distribution server 13. In the case in which a suggestion for viewing an attention point comes from the distribution server 13, the reproduction apparatus 15 displays a display image corresponding to a 2D image of the attention point sent from the distribution server 13 in accordance with a manipulation done by the user.

The head-mounted display 16, worn around the head of the user, displays a display image supplied from the reproduction apparatus 15. The head-mounted display 16 has a marker 16A that is captured by a camera 15A. Therefore, the user is able to specify a viewing position by traveling with the head-mounted display 16 worn on the head. In addition, the head-mounted display 16 incorporates the gyro sensor 16B, transmitting results of the detection of an angular speed obtained by the gyro sensor 16B to the reproduction apparatus 15. Therefore, by rotating the head worn with the head-mounted display 16, the user is able to specifying a viewing direction.

In the distribution system 10, the distribution from the distribution server 13 to the reproduction apparatus 15 may be executed in any method. In the case in which the distribution method is based on MPEG-DASH (Moving Picture Experts Group phase—Dynamic Adaptive Streaming over HTTP), then the distribution server 13 is an HTTP (HyperText Transfer Protocol) server and the reproduction apparatus 15 is an MPEG-DASH client.

It should be noted that, in the example depicted in FIG. 1, the generation apparatus 12 and the distribution server 13 are separately configured; it is also practicable to configure the generation apparatus 12 and the distribution server 13 as one apparatus.

(Configurational Example of Generation Apparatus)

Figure 2:
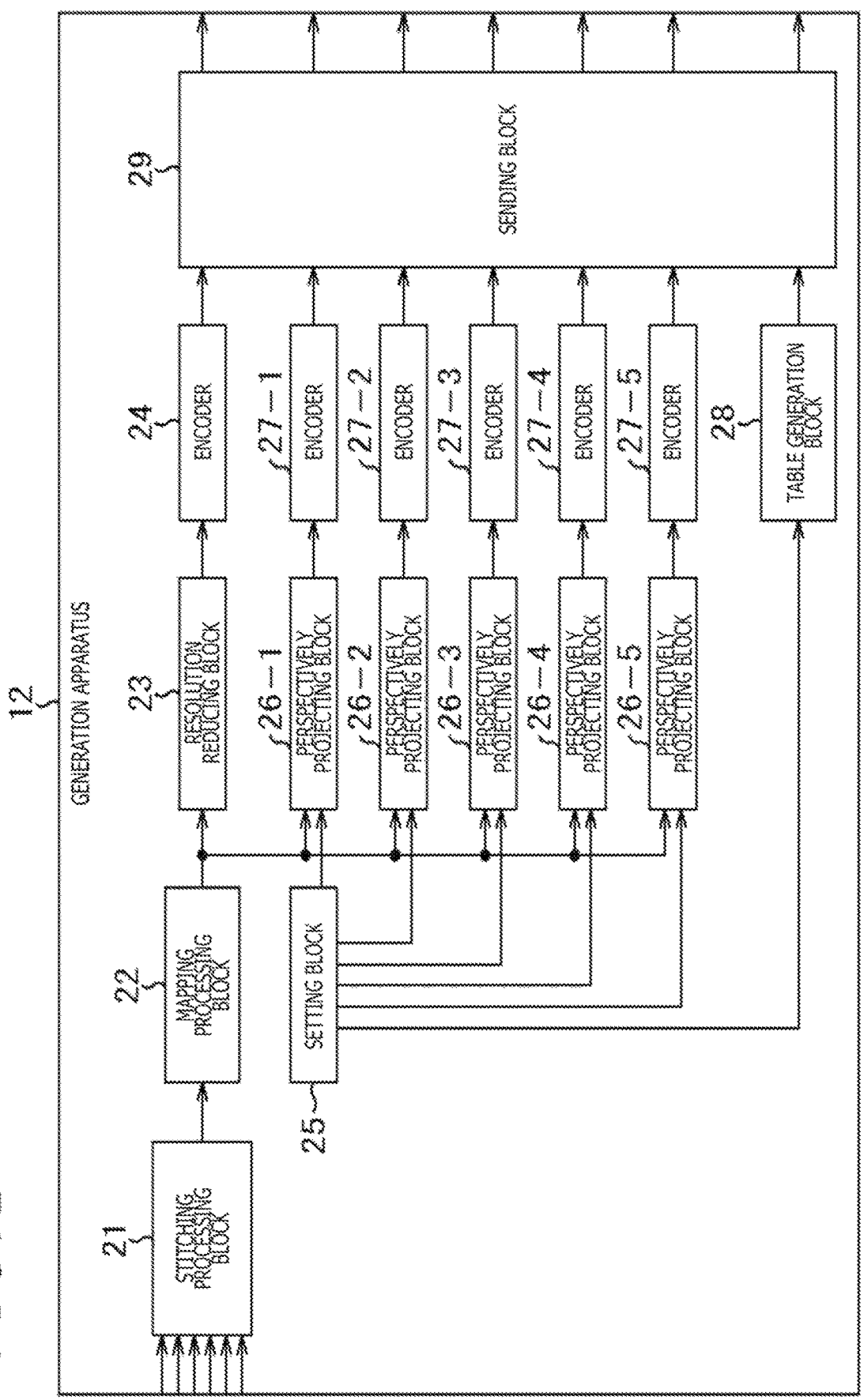
FIG. 2 is a block diagram depicting a configurational example is a generation apparatus.

FIG. 2 is a block diagram depicting a configurational example of the generation apparatus 12 depicted in FIG. 1.

The generation apparatus 12 depicted in FIG. 2 has a stitching processing block 21, a mapping processing block 22, a resolution reducing block 23, an encoder 24, a setting block 25, a perspectively projecting blocks 26-1 through 26-5, encoders 27-1 through 27-5, a table generation block 28, and a sending block 29.

The stitching processing block 21 makes equal, in color and brightness, frame by frame, the captured images in six directions supplied from the camera 11A depicted in FIG. 1 so as to remove the overlaps for stitching. The stitching processing block 21 supplies a captured image on a frame basis obtained as a result of the stitching to the mapping processing block 22.

The mapping processing block 22 generates an omnidirectional image from the captured image supplied from the stitching processing block 21 by use of a method based on equirectangular projection. To be more specific, the mapping processing block 22 maps the captured image to a sphere as a texture, thereby generating an image of this sphere obtained by equirectangular projection as an omnidirectional image. Therefore, the shape of the omnidirectional image generated by the mapping processing block 22 is a rectangle suitable for encoding.

The mapping processing block 22 supplies the omnidirectional image to the resolution reducing block 23 and the perspectively projecting blocks 26-1 through 26-5. It should be noted that the stitching processing block 21 and the mapping processing block 22 may be unitized.

The resolution reducing block 23 reduces the resolution of the omnidirectional image supplied from the mapping processing block 22 so as to generate a low-resolution image. The resolution reducing block 23 supplies the generated low-resolution image to the encoder 24.

The encoder 24 (the resolution reduction encoding block) encodes the low-resolution image supplied from the resolution reducing block 23 by an encoding scheme such as MPEG2 (Moving Picture Experts Group phase 2) or AVC (Advanced Video Coding) so as to generate one low-resolution stream. The encoder 24 supplies one low-resolution stream to the sending block 29.

The setting block 25 sets pieces of two-dimensional plane information corresponding to five viewing directions (line-of-sight direction). The setting block 25 supplies these pieces of the two-dimensional plane information to the perspectively projecting blocks 26-1 through 26-5. In addition, the setting block 25 supplies the five pieces of two-dimensional plane information to the table generation block 28.

The perspectively projecting blocks 26-1 through 26-5 each maps the omnidirectional image supplied from the mapping processing block 22 to a sphere. The perspectively projecting blocks 26-1 through 26-5 each perspectively projects the omnidirectional image mapped to the sphere to a two-dimensional plane indicated by the two-dimensional plane information supplied from the setting block 25 with the center of the sphere being the focal point, thereby generating an image. Consequently, the generated image provides an image with the omnidirectional image mapped to the sphere viewed in a predetermined line-of-sight direction from the center of the sphere. The perspectively projecting blocks 26-1 through 26-5 each supplies the generated image to the encoders 27-1 through 27-5 as a high-resolution image.

The encoders 27-1 through 27-5 (the high-resolution encoding blocks) each encodes the high-resolution image supplied from the perspectively projecting blocks 26-1 through 26-5 by an encoding scheme such as MPEG2 or AVC so as to generate one high-resolution stream.

At this moment, between five high-resolution streams generated by the encoders 27-1 through 27-5, for example, such symbol points as a head picture and an ID picture of GOP (Group of Picture) are made common. The encoders 27-1 through 27-5 each supplies the generated one high-resolution stream to the sending block 29.

It should be noted that, in what follows, the perspectively projecting blocks 26-1 through 26-5 are generically referred to as the perspectively projecting block 26 unless otherwise specified. Likewise, the encoders 27-1 through 27-5 are generically referred to as the encoder 27 unless otherwise specified.

The table generation block 28 generates a two-dimensional plane table that includes five pieces of two-dimensional plane information supplied from the setting block 25 and sends the generated two-dimensional plane table to the sending block 29.

The sending block 29 uploads (or sends) one low-resolution stream supplied from the encoder 24, a total of five high-resolution streams supplied from the encoders 27, and the two-dimensional plane table supplied from the table generation block 28 to the distribution server 13 depicted in FIG. 1.

(First Example of Two-dimensional Plane)

Figure 3B:
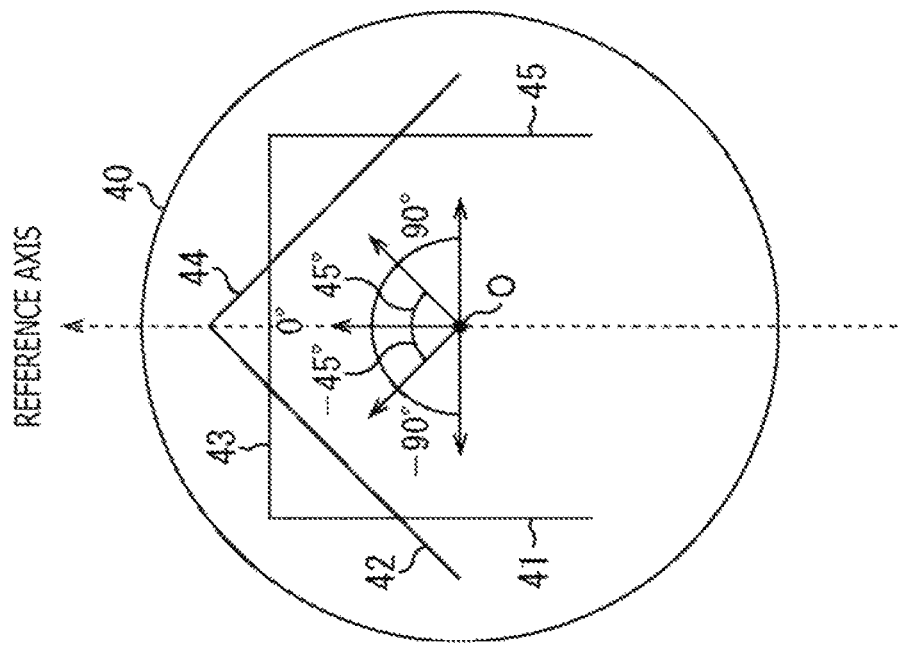
FIGS. 3A and 3B are block diagrams depicting a first example of a two-dimensional plane.
Figure 3A:
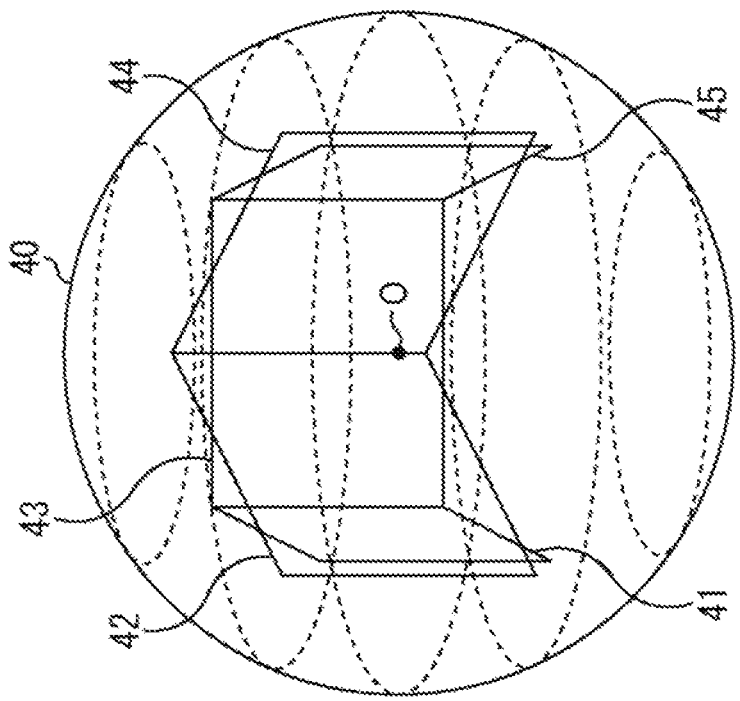

FIGS. 3A and 3B are diagrams depicting an example of five two-dimensional planes that are set by the setting block 25 depicted in FIG. 2.

FIG. 3A and FIG. 3B depict a perspective view of a sphere as a 3D model in which two-dimensional planes are set and a top view of a horizontally cut surface, respectively.

In the example depicted in FIGS. 3A and 3B, the omnidirectional image is an omnidirectional image generated from the captured images of a concert venue, for example. Further, when an omnidirectional image is mapped to a sphere 40, there exists an omnidirectional image of a stage arranged in the concert venue in the directions with angles horizontal to the reference axis on a horizontal plane passing center O of the sphere 40 being −90 degrees, −45 degrees, 0 degrees, 45 degrees, and 90 degrees. That is, the angles horizontal to the reference axis in a line-of-sight direction supposed to be important for the user whose viewing position is center O are −90 degrees, −45 degrees, 0 degrees, 45 degrees, and 90 degrees.

Therefore, as depicted in FIG. 3A and FIG. 3B, the setting block 25 makes a line that passes center O of the sphere 40 and has angles −90 degrees, −45 degrees, 0 degrees, 45 degrees, and 90 degrees in the directions horizontal to the reference axis be the normal line and sets two-dimensional planes 41 through 45 inside the sphere 40 such that the adjacent planes cross each other. Therefore, portions of the omnidirectional image that is perspectively projected to adjacent ones of the two-dimensional planes 41 through 45 are overlapped each other.

Further, in the example depicted in FIGS. 3A and 3B, the absolute value the horizontal angle between the normal line passing the center of the two-dimensional planes 41 through 45 and the reference axis is equal to or less than 90 degrees. Therefore, even if the high-resolution images corresponding to all two-dimensional planes are used, the reproduction apparatus 15 cannot generate a display image that corresponds to all viewing directions (or line-of-sight directions) of horizontal 360 degrees around and vertical 180 degrees around.

It should be noted that, in the example depicted in FIGS. 3A and 3B, the vertical angles between the normal line passing the center of the two-dimensional planes 41 through 45 and the reference axis are all 0 degrees and there is no tilt of the two-dimensional planes 41 through 45.

(Configurational Example of Two-Dimensional Plane Table)

FIG. 4 is a diagram depicting a configurational example of a two-dimensional plane table that is generated by the table generation block 28 depicted in FIG. 1.

In the example depicted in FIG. 4, two-dimensional plane information includes azimuth angles and elevation angles as information indicative of the positions of the two-dimensional planes 41 through 45 depicted in FIGS. 3A and 3B, rotation angles as the information indicative of tilts, and horizontal view angles and vertical view angles as the information indicative of sizes.

It should be noted that the azimuth angle and the elevation angle are a horizontal angle and a vertical angle, respectively, between the line interconnecting center O of the sphere 40 and the center of the two-dimensional planes 41 through 45. The rotation angle is an angle in the rotational directions of the two-dimensional planes 41 through 45 if the line interconnecting the centers of the two-dimensional planes 41 through 45 and center O is the axis. The horizontal view angle is an angle between lines connecting each of the two horizontal ends of the two-dimensional planes 41 through 45 and center O. The vertical view angle is an angle between lines connecting each of the two vertical ends of the two-dimensional planes 41 through 45 and center O.

In this case, as depicted in FIG. 4, the ID unique to each of the two-dimensional planes 41 through 45 is registered in the two-dimensional plane table. In the example depicted in FIG. 4, IDs are assigned to the two-dimensional planes 41 through 45 from 1 on, 1 through 5 being registered in the two-dimensional plane table as IDs.

Further, the two-dimensional plane information of the two-dimensional planes corresponding to the IDs and the number of horizontal pixels that is the number of pixels in horizontal direction and the number of vertical pixels that is the number of pixels in vertical direction of the high-resolution image of each two-dimensional plane are registered in the two-dimensional plane table.

To be more specific, with each of the two-dimensional planes 41 through 45, the line passing center O of the sphere 40 and having angles in the direction horizontal to the reference axis of −90 degrees, −45 degrees, 0 degrees, 45 degrees, and 90 degrees and angles in vertical direction being all 0 degrees is the normal line that passes the center, thereby setting each two-dimensional plane without tilt. Therefore, in correspondence to ID "1" through ID "5," azimuth angle "−90 degrees," azimuth angle "−45 degrees," azimuth angle "0 degrees," azimuth angle "45 degrees," and azimuth angle "90 degrees" are registered. In addition, in correspondence to ID "1" through ID "5," elevation angle "0 degrees" and rotation angle "0 degrees" are registered.

Further, in the example depicted in FIG. 4, the horizontal view angle the vertical view angle of the two-dimensional planes 41 through 45 are 90 degrees each and the number of horizontal pixels and the number of vertical pixels are 1024 each. Therefore, in correspondence to ID "1" through ID "5," horizontal view angle "90 degrees," vertical view angle "90 degrees," the number of horizontal pixels "1024," and the number of vertical pixels "1024" are registered.

(Description of Processing to be Executed by Generation Apparatus)

Figure 5:
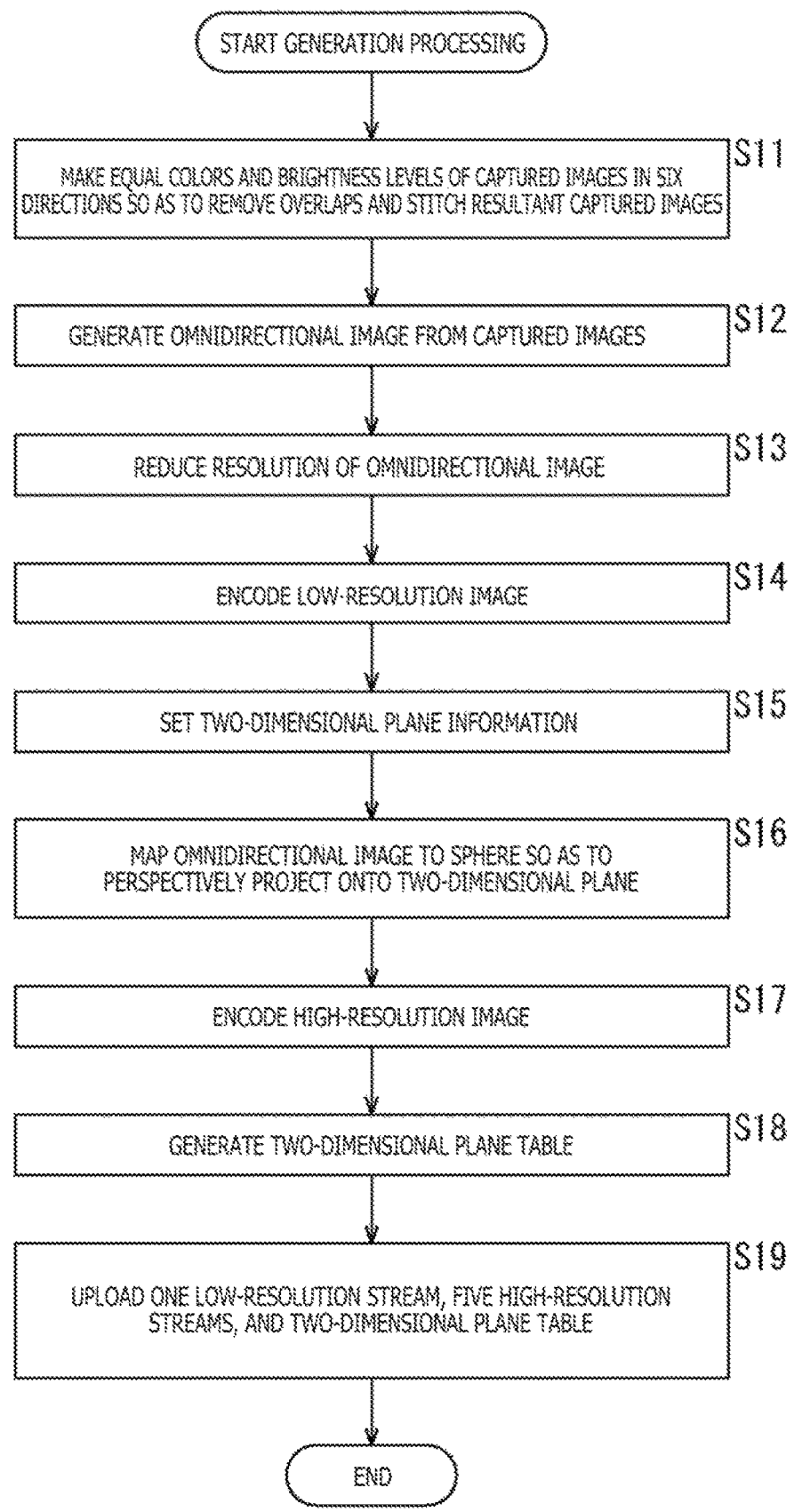
FIG. 5 is a flowchart describing the generation processing to be executed by the generation apparatus.

FIG. 5 is a flowchart indicative of the generation processing to be executed by the generation apparatus 12.

In step S11 in FIG. 5, the stitching processing block 21 makes equal the color and brightness of the captured images in six directions supplied from the camera 11A depicted in FIG. 1 and removes the overlaps for stitching. The stitching processing block 21 supplies a captured image on a frame basis obtained as a result of the stitching to the mapping processing block 22.

In step S12, the mapping processing block 22 generates an omnidirectional image from the captured images supplied from the stitching processing block 21 by use of a method based on equirectangular projection. The mapping processing block 22 supplies the generated omnidirectional image to resolution reducing block 23 and the perspectively projecting blocks 26-1 through 26-5.

In step S13, the resolution reducing block 23 reduces the resolution of the omnidirectional image supplied from the mapping processing block 22 so as to generate a low-resolution image. The resolution reducing block 23 supplies the generated low-resolution image to the encoder 24.

In step S14, the encoder 24 encodes the low-resolution image supplied from the resolution reducing block 23 so as to generate one low-resolution stream. The encoder 24 supplies the generated one low-resolution stream to the sending block 29.

In step S15, the setting block 25 sets five pieces of two-dimensional plane information corresponding to line-of-sight directions. The setting block 25 supplies each piece of two-dimensional plane information to each of the perspectively projecting blocks 26 and the five pieces of two-dimensional plane information to the table generation block 28.

In step S16, each of the perspectively projecting blocks 26 maps the omnidirectional image supplied from the mapping processing block 22 onto a sphere and perspectively projects the omnidirectional image mapped to the sphere onto a two-dimensional plane indicated by the two-dimensional plane information supplied from the setting block 25 with the center of the sphere being the focal point, thereby generating an image. Each of the perspectively projecting blocks 26 supplies the generated image to each encoder 27 as a high-resolution image.

In step S17, each encoder 27 encodes the high-resolution image supplied from the perspectively projecting blocks 26 so as to generate one high-resolution stream, supplying this high-resolution stream to the sending block 29.

In step S18, the table generation block 28 generates a two-dimensional plane table that includes the five pieces of two-dimensional plane information supplied from the setting block 25 and sends the generated two-dimensional plane table to the sending block 29.

In step S19, the sending block 29 uploads the one low-resolution stream supplied from the encoder 24, a total of five high-resolution streams supplied from the encoders 27, and the two-dimensional plane table supplied from the table generation block 28 to the distribution server 13.

(Configurational Examples of Distribution Server and Reproduction Apparatus)

Figure 6:
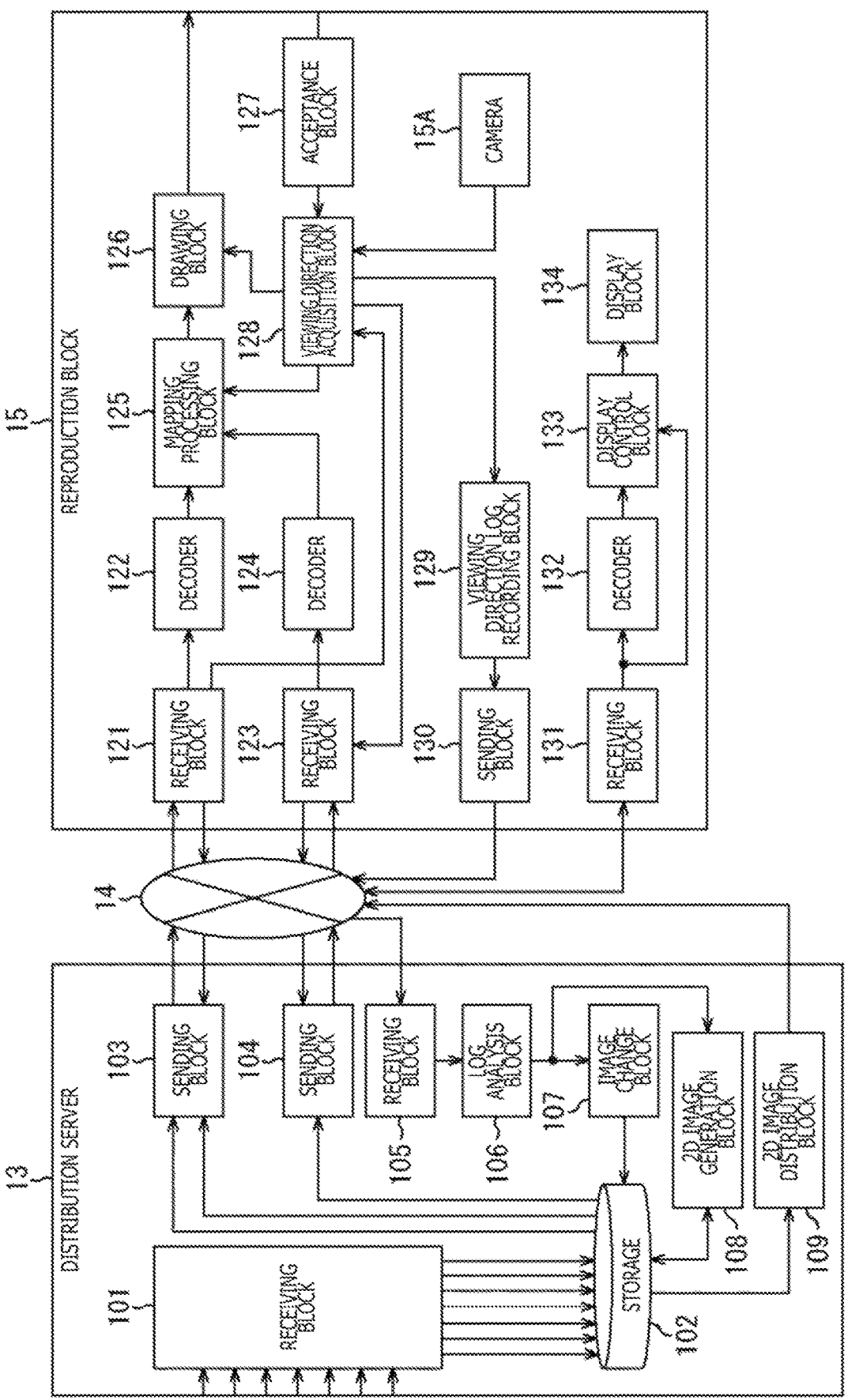
FIG. 6 is a block diagram depicting a configurational examples of a distribution server and a reproduction apparatus.

FIG. 6 is a block diagram depicting configurational examples of the distribution server 13 and the reproduction apparatus 15 depicted in FIG. 1.

As depicted in FIG. 6, the distribution server 13 has a receiving block 101, a storage 102, a sending block 103, a sending block 104, a receiving block 105, a log analysis block 106, an image change block 107, a 2D image generation block 108, and 2D image distribution block 109.

The receiving block 101 receives one low-resolution stream, five high-resolution streams, and the two-dimensional plane table uploaded from the generation apparatus 12 depicted in FIG. 1 and supplies received streams and table to the storage 102.

The storage 102 stores the one low-resolution stream, five high-resolution streams, and two-dimensional plane table supplied from the receiving block 101.

In response to a request from the reproduction apparatus 15, the sending block 103 reads one low-resolution stream and the two-dimensional plane table from the storage 102 and sends the stream and table to the reproduction apparatus 15 via the network 14.

In response to a request from the reproduction apparatus 15, the sending block 104 reads one high-resolution stream from the storage 102 and sends this stream to the reproduction apparatus 15 via the network 14. It should be noted that changing of the high-resolution streams to be send is executed at a sink point. Therefore, changing of the high-resolution streams to be sent is executed in units of several frames to several tens of frames.

Further, as described above, between the five high-resolution streams, the sink point is common. Therefore, by switching between the high-resolution streams by the sink point, the sending block 104 can easily switch between the high-resolution images to be reproduced by the reproduction apparatus 15.

The receiving block 105 receives the viewing direction log sent from the reproduction apparatus 15 and supplies the received viewing direction log to the log analysis block 106. The log analysis block 106 analyzes the viewing timestamp and viewing vision field angle of the user that provide a viewing direction log, extracts an attention point of the highest number of viewing counts, and supplies the information related with the extracted attention point to the image change block 107 and the 2D image generation block 108.

The image change block 107 extracts a high image quality area and a low image quality area from the attention point extracted by the log analysis block 106 so as to change the images of a high-resolution stream recorded to the storage 102. For example, the compression ratio and resolution of an image are changed. The 2D image generation block 108 generates a 2D image corresponding to the attention point from a high-resolution stream recorded to the storage 102, corresponding to the attention point extracted by the log analysis block 106 and registers the generated 2D image corresponding to the attention point into the storage 102. The 2D image distribution block 109 sends a suggestion for viewing the registered 2D image corresponding to the attention point to the reproduction apparatus 15 and, in response to a request from the reproduction apparatus 15, distributes a stream of the 2D image corresponding to the attention point to the reproduction apparatus 15.

The reproduction apparatus 15 has the camera 15A, a receiving block 121, a decoder 122, a receiving block 123, a decoder 124, a mapping processing block 125, a drawing block 126, an acceptance block 127, a viewing direction acquisition block 128, a viewing direction log recording block 129, a sending block 130, a receiving block 131, a decoder 132, a display control block 133, and a display block 134.

The receiving block 121 of the reproduction apparatus 15 requests the distribution server 13 for one low-resolution stream and two-dimensional plane information via the network 14. The receiving block 121 (or the acceptance block) receives the one low-resolution stream and two-dimensional plane information sent from the sending block 103 in response to the request. The receiving block 121 supplies one low-resolution stream to the decoder 122 and the two-dimensional plane information to the viewing direction acquisition block 128.

The decoder 122 (the low-resolution decoding block) decodes the low-resolution stream supplied from the receiving block 121 to as to generate a low-resolution image. The decoder 122 supplies the generated low-resolution image to the mapping processing block 125.

The receiving block 123 acquires selected-plane information indicative of the ID of a selected plane that is one of the five two-dimensional planes from the viewing direction acquisition block 128. On the basis of the selected-plane information, the receiving block 123 requests for one high-resolution stream of a selected plane identified by the selected-plane information of five high-resolution streams via the network 14. The receiving block 123 receives the one high-resolution stream sent from the sending block 104 in response to the request and supplies the received one high-resolution stream to the decoder 124.

The decoder (or the high-resolution decoding block) 124 decodes the one high-resolution stream supplied from the receiving block 123 so as to generate a high-resolution image. The decoder 124 supplies the generated high-resolution image to the mapping processing block 125.

On the basis of the two-dimensional plane information of the selected plane supplied from the viewing direction acquisition block 128, the mapping processing block 125 sets, as a 3D model, the selected plane inside the sphere set in advance as a 3D model. The mapping processing block 125 maps the low-resolution image supplied from the decoder 122 onto the sphere that is a 3D model as a texture. Further, the mapping processing block 125 maps the high-resolution image supplied from the decoder 124 onto the two-dimensional plane that is a 3D model as a texture. The mapping processing block 125 supplies the 3D model image with the texture mapped on the sphere and the selected plane to the drawing block 126.

The drawing block 126 perspectively projects the 3D model image supplied from the mapping processing block 125 to the vision field range of the user with the viewing position supplied from the viewing direction acquisition block 128 being the focal point, thereby generating the image in the vision field range of the viewer as a display image. That is, the drawing block 126 generates the sphere 40 seen from the viewing position through the vision field range or the image mapped to the two-dimensional plane as a display image. The drawing block 126 supplies the generated display image to the head-mounted display 16.

The acceptance block 127 accepts a result of the detection by the gyro sensor 16B depicted in FIG. 1 from the head-mounted display 16 and supplies the accepted detection result to the viewing direction acquisition block 128.

On the basis of the detection result from the gyro sensor 16B supplied from the acceptance block 127, for example, the viewing direction acquisition block 128 determines a line-of-sight direction (or a viewing direction) of the user in the coordinate system of the 3D model. In addition, the viewing direction acquisition block 128 acquires a captured image of the marker 16A from the camera 15A and, on the basis of the acquired captured image, detects the viewing position in the coordinate system of the 3D model.

On the basis of the viewing position and viewing direction in the coordinate system of the 3D model and the two-dimensional plane information supplied from the receiving block 121, the viewing direction acquisition block 128 (or the selection block) determines one of the five two-dimensional planes that corresponds to the normal line nearest to the line-of-sight of the user as a selected plane.

To be more specific, the viewing direction acquisition block 128 acquires, as the ID of the selected plane, the ID of the two-dimensional plane corresponding to the azimuth angle, elevation angle, and rotation angle that are nearest to the horizontal and vertical angles between the line-of-sight extending from the viewing position in the viewing direction and the reference axis and the rotation angle of the line-of-sight.

Consequently, in order to maximize the ratio of a high-resolution image to be perspectively projected in the vision field range of the user, the viewing direction acquisition block 128 can selects, as a selected plane, the two-dimensional plane corresponding to this high-resolution image. The viewing direction acquisition block 128 supplies the selected-plane information to the receiving block 123 and the two-dimensional plane information of the selected plane to the mapping processing block 125.

Further, the viewing direction acquisition block 128 supplies a viewing timestamp and the information regarding the viewing direction that is a log of the viewing vision field angles (azimuth angle, elevation angle, and a rotation angle) acquired by the viewing direction acquisition block 128 at that moment to the viewing direction log recording block 129. The viewing direction log recording block 129 records the viewing direction log from the viewing direction acquisition block 128. After the end of viewing, the sending block 130 sends the viewing direction log acquired by the viewing direction log recording block 129 to the distribution server 13 via the network 14.

The receiving block 131 receives the suggestion of viewing the attention point and the 2D image sent from the distribution server 13 via the network 14 and supplies the received attention point viewing suggestion to the display control block 133 and the 2D image of the attention point to the decoder 132. The decoder 132 decodes the 2D image of the attention point sent from the receiving block 131 and supplies the decoded 2D image to the display control block 133.

The display control block 133 controls the displaying of an attention point viewing suggestion sent from the receiving block 131 and, according to a manipulation done by the user, controls the displaying of the decoded 2D image of the attention point. The display block 134 includes an LCD or the like. The display block 134 displays the viewing suggestion of the attention point and the 2D image of the attention point.

(Operation Example of Distribution Server)

Figure 7:
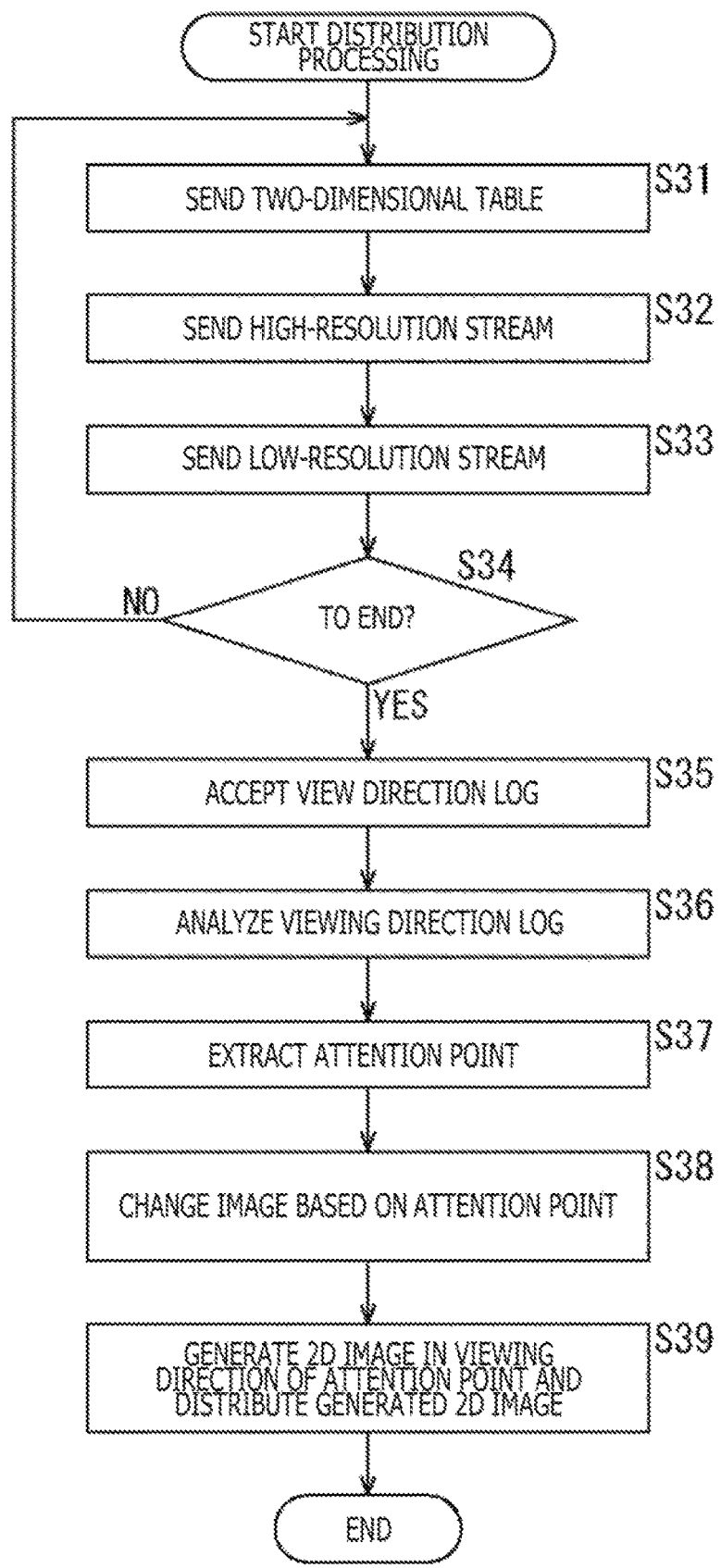
FIG. 7 is a flowchart describing the distribution processing to be executed by the distribution server.
Figure 8:
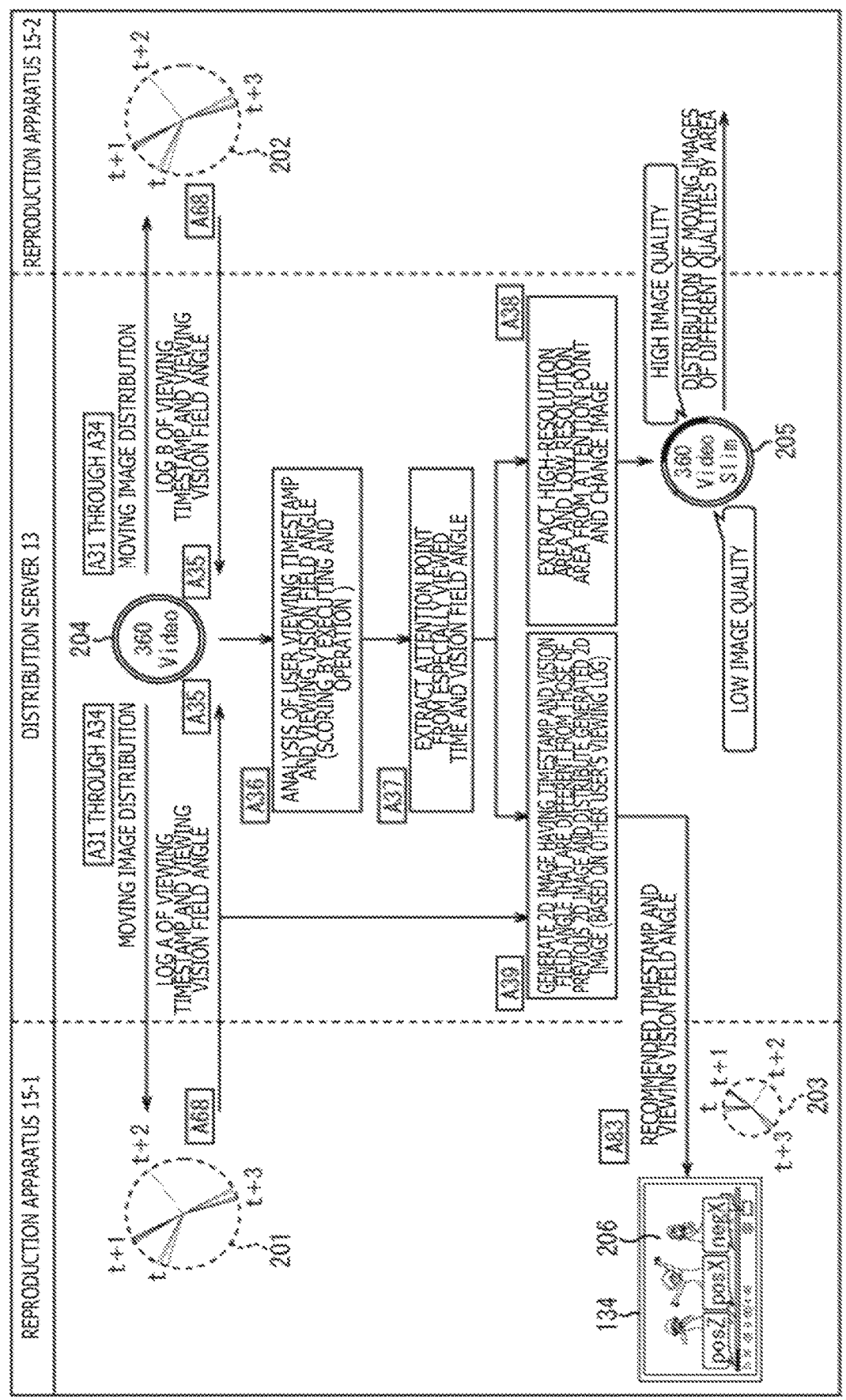
FIG. 8 is a diagram depicting an overview of the present technology.

The following describes the processing to be executed by the distribution server 13 with reference to the flowchart depicted in FIG. 7. It should be noted that the example depicted in FIG. 8 is indicative of an overview of the present technology, so that the description will be done with reference to FIG. 8 from time to time. In the figure, each combination of A and numeral corresponds to a step number in each flowchart. Further, in the viewing direction logs 201 through 203 (FIG. 8), t, t+1, t+2, and t+3 are indicative of timestamps and a direction in which a timestamp is noted is indicative of a viewing vision field angle. Further, the reproduction apparatuses 15-1 and 15-2 are indicated; however, these apparatuses are generically referred to as the reproduction apparatus 15 unless otherwise specified.

In steps S31 through S34 in FIG. 7, the distribution server 13 executes the distribution of moving images (A31 through A34 in FIG. 8). That is, in step S31, the sending block 103 reads a two-dimensional plane table from the storage 102 in response to a request from the reproduction apparatus 15 and sends the two-dimensional plane table to the reproduction apparatus 15 via the network 14.

In step S32, the sending block 104 reads one high-resolution stream 204 (FIG. 8) from the storage 102 in response to a request from the reproduction apparatus 15 and sends the one high-resolution stream 204 to the reproduction apparatus 15 via the network 14. It should be noted that the changing of the high-resolution stream to be sent is executed at the sink point. Therefore, the changing of the high-resolution stream is executed in units of several frames to several tens of frames.

In step S33, in response to the request from the reproduction apparatus 15, the sending block 103 reads one low-resolution stream from the storage 102 and sends the one low-resolution stream to the reproduction apparatus 15 via the network 14.

In step S34, the sending block 104 determines whether to end the moving image distribution. In the case in which the moving image distribution is determined not to be ended in step S34, then the processing returns to step S31 to repeat the processing therefrom. In the case in which the moving image distribution is determined to be ended in step S34 in response to the request from the reproduction apparatus 15, then the processing goes to step S35.

In step S35, the receiving block 131 receives a log of viewing timestamp and viewing vision field angle (A35 in FIG. 8) as a viewing direction log from the reproduction apparatus 15 and supplies the received log to the log analysis block 106.

In step S36, the log analysis block 106 the viewing timestamp and the viewing vision field angle of the user that provide a viewing direction log (A36 in FIG. 8). For example, an AND operation is executed as an analysis method for scoring.

In step S37, the log analysis block 106 extracts an attention point especially from viewing time and vision field angle (A37 in FIG. 8) and supplies the information regarding the extracted attention point to the image change block 107 and the 2D image generation block 108.

In step S38, the image change block 107 extracts a high-image-quality area and a low-image-quality area from the attention point extracted by the log analysis block 106 (A38 in FIG. 8) so as to change the image (the compression ratio or the resolution thereof) of a high-resolution stream recorded to the storage 102.

Consequently, a subsequent high-resolution stream 205 (FIG. 8) is moving image distribution of different image qualities by area and the stream with the image compression ratio (or resolution) changed is distributed to the reproduction apparatus 15-2 (15-1) in accordance with the viewing direction log.

In step S39, a 2D image (or moving image) 206 (FIG. 8) in the viewing direction of the attention point is generated to be distributed (A39 in FIG. 8). That is, the 2D image generation block 108 generates the 2D image 206 corresponding to the attention point from the high-resolution stream recorded to the storage 102 corresponding to the attention point extracted by the log analysis block 106 and registers the generated 2D image 206 corresponding to the attention point into the storage 102. The 2D image distribution block 109 sends a suggestion for viewing the registered 2D image corresponding to the attention point to the reproduction apparatus 15 and distributes the stream of the 2D image 206 corresponding to the attention point to the reproduction apparatus 15 in response to a request from the reproduction apparatus 15.

Consequently, the user of the reproduction apparatus 15-1 is able to know that there is a viewing method in a viewing direction (or at a vision field angle) other than that in which the user has been viewing. In addition, the user of the reproduction apparatus 15-1 is able to see a 2D image in the viewing direction viewed most frequently by another user, this viewing direction being different from the direction in which the user of the reproduction apparatus 15-1 has been viewing.

(Operation Example of Reproduction Apparatus)

Figure 9:
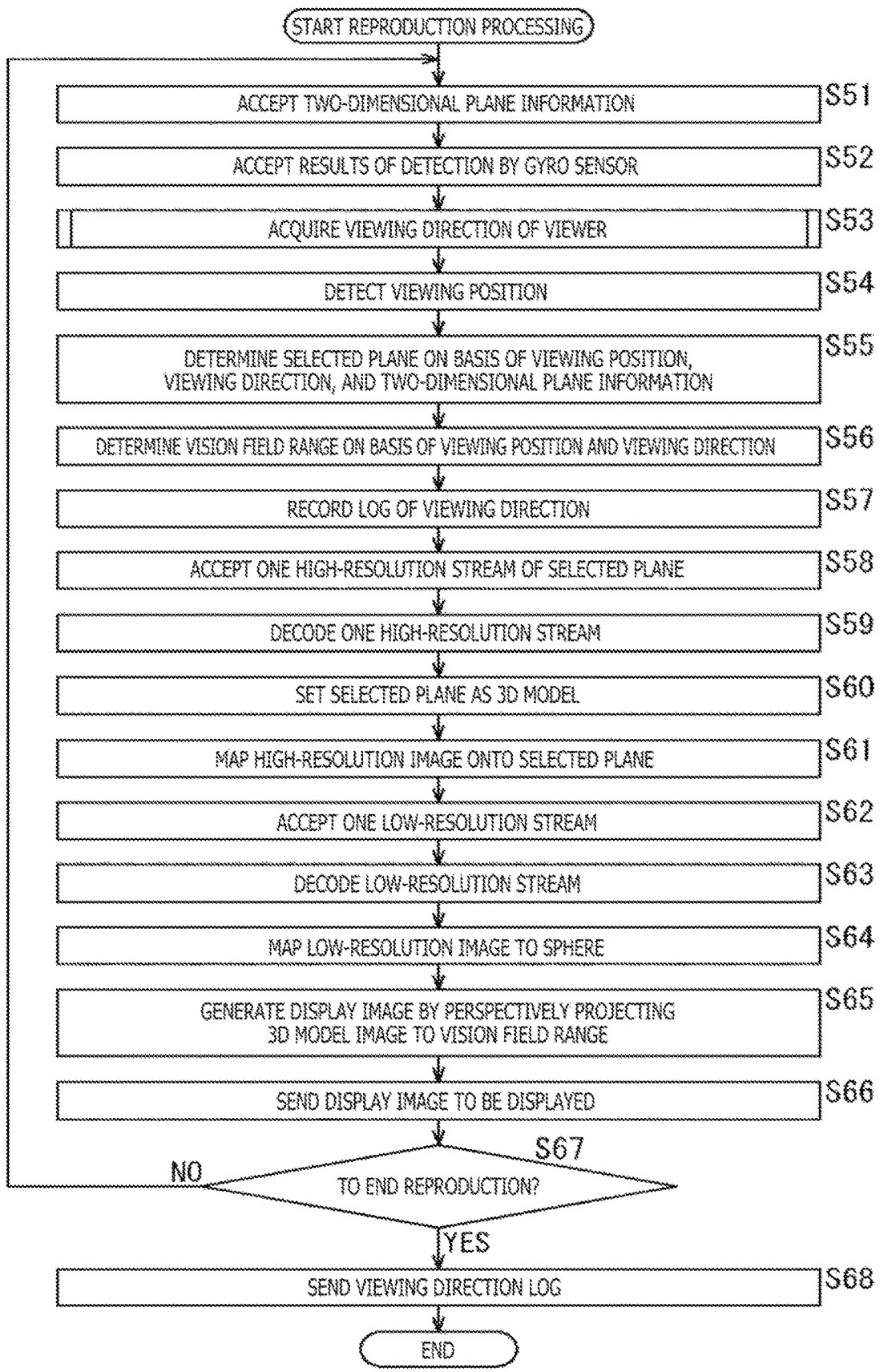
FIG. 9 is a flowchart describing the reproduction processing to be executed by the reproduction apparatus.

The following describes the reproduction processing to be executed by the reproduction apparatus 15 with reference to the flowchart depicted in FIG. 9. It should be noted that, also in FIG. 9, as described above with reference to FIG. 7, the description will be done with reference to FIG. 8 indicative of an overview of the present technology. In the figure, each combination of A and numeral corresponds to a step number in each flowchart. Further, the reproduction apparatuses 15-1 and 15-2 are indicated; however, these apparatuses are generically referred to as the reproduction apparatus 15 unless otherwise specified. This reproduction processing is starts upon a request from the user, for example.

In step S51 in FIG. 9, the receiving block 121 of the reproduction apparatus 15 requests the distribution server 13 for two-dimensional plane information and receives the two-dimensional plane information sent from the sending block 103 in response to this request. The receiving block 121 supplies the received two-dimensional plane information to the viewing direction acquisition block 128.

In step S52, the acceptance block 127 accepts a result of the detection by the gyro sensor 16B depicted in FIG. 1 from the head-mounted display 16 and supplies the accepted detection result to the viewing direction acquisition block 128.

In step S53, the viewing direction acquisition block 128 determines a viewing direction (or a line-of-sight direction) of the user in the coordinate system of a 3D model on the basis of the detection result of the gyro sensor 16B supplied from the acceptance block 127.

In step S54, the viewing direction acquisition block 128 acquires a captured image of the marker 16A from the camera 15A and, on the basis of this captured image, detects a viewing position in the coordinate system of the 3D model.

In step S55, on the basis of the viewing position and viewing direction in the coordinate system of the 3D model and the two-dimensional plane information supplied from the receiving block 121, the viewing direction acquisition block 128 determines, as a selected plane, one of five two-dimensional planes that is nearest to the line-of-sight of the user. The viewing direction acquisition block 128 supplies the selected plane information of the determined selected plane to the receiving block 123 and the two-dimensional plane information of the selected plane to the mapping processing block 125.

In step S56, on the basis of the viewing position and viewing direction in the coordinate system of the 3D model, the viewing direction acquisition block 128 determines the vision field range of the user in the coordinate system of the 3D model. The viewing direction acquisition block 128 supplies the vision field range of the user and the viewing position to the drawing block 126.

In step S57, the viewing direction log recording block 129 records, to a memory or the like not depicted, a viewing direction log that is a log of a viewing timestamp and viewing vision field angles (azimuth angle, elevation angle, and rotation angle) acquired by the viewing direction acquisition block 128 at that moment.

In step S58, the receiving block 123 requests the distribution server 13 for one high-resolution stream of the selected plane identified by the selected plane information supplied from the viewing direction acquisition block 128 and receives one high-resolution stream sent from the sending block 104 in response to the request. The receiving block 123 supplies the received one high-resolution stream to the decoder 124.

In step S59, the decoder 124 decodes the one high-resolution stream supplied from the receiving block 123 so as to generate a high-resolution image. The decoder 124 supplies the high-resolution image to the mapping processing block 125.

In step S60, on the basis of the two-dimensional plane information of the selected plane supplied from the viewing direction acquisition block 128, the mapping processing block 125 sets, as a 3D model, the selected plane into a sphere set as a 3D model in advance.

In step S61, the mapping processing block 125 maps the high-resolution image supplied from the decoder 124 onto the selected plane set as a 3D model as texture.

In step S62, the receiving block 121 requests the distribution server 13 for one low-resolution stream and receives one low-resolution stream sent from the sending block 103 in response to the request. The receiving block 121 supplies the received one low-resolution stream to the decoder 122.

In step S63, the decoder 122 decodes the low-resolution stream supplied from the receiving block 121 so as to generate a low-resolution image. The decoder 122 supplies the low-resolution image to the mapping processing block 125.

In step S64, the mapping processing block 125 maps the low-resolution image supplied from the decoder 122 onto the sphere that is a 3D model as texture. The mapping processing block 125 supplies, to the drawing block 126, the 3D model image with the texture mapped to the sphere and the two-dimensional plane.

In step S65, by perspectively projecting the 3D model image supplied from the mapping processing block 125 to the vision field range of the viewer with the viewing position supplied from the viewing direction acquisition block 128 as a focal point, the drawing block 126 generates an image of the vision field range of the user as a display image.

In step S66, the drawing block 126 sends the display image to the head-mounted display 16 so as to cause the display image to be displayed thereon. In step S67, the reproduction apparatus 15 determines whether the reproduction is to be ended, namely, the end of the reproduction has been requested by the user, for example.

In the case in which the reproduction is determined not to be ended in step S67, the processing returns to step S51 to repeat the processing in steps S51 through S67 until the reproduction is determined to be ended. On the other hand, in the case in which the reproduction is determined to be ended in step S67, then the processing ends.

In step S68, the sending block 130 sends the viewing direction log acquired by the viewing direction log recording block 129 to the distribution server 13 via the network 14 (A68 in FIG. 8).

As described above, a moving image is viewed and after the viewing, a viewing direction log is sent from the reproduction apparatus 15 to the distribution server 13.

(Another Operation Example of Reproduction Apparatus)

Figure 10:
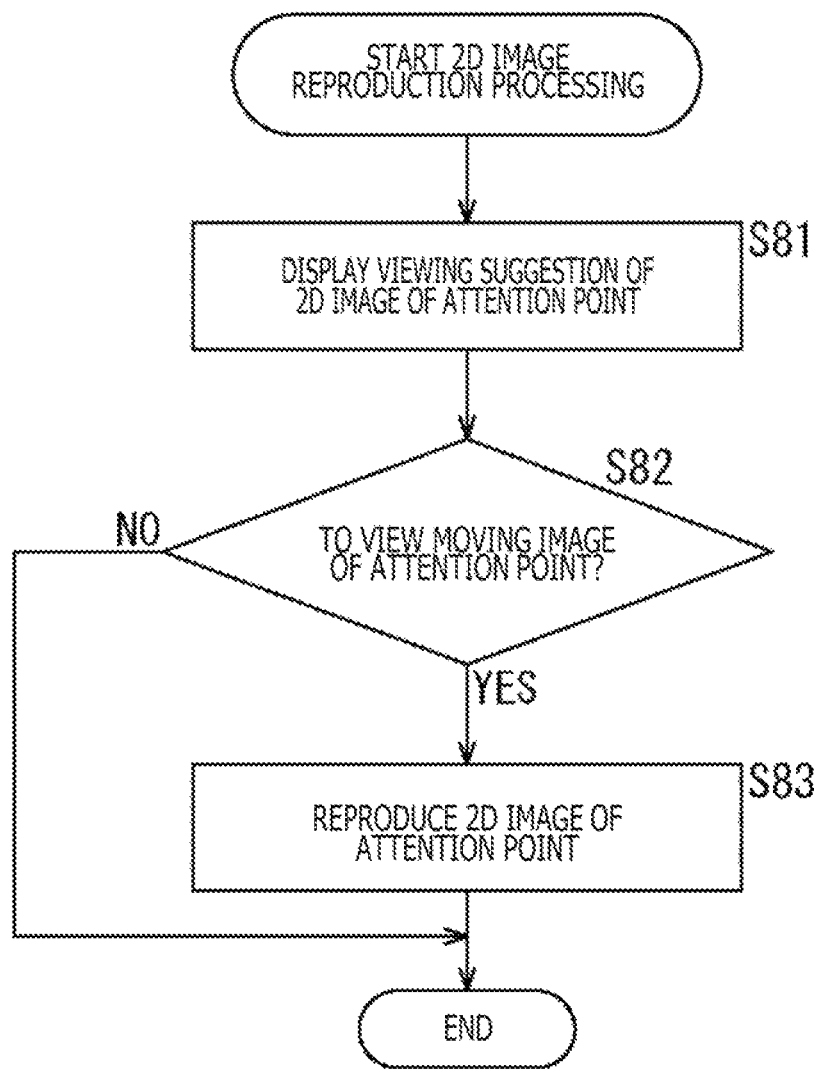
FIG. 10 is a flowchart describing 2D image reproduction processing.

The following describes 2D moving image reproduction processing by the reproduction apparatus 15 with reference to the flowchart depicted in FIG. 10. For example, in step S39 in FIG. 7, the 2D image distribution block 109 sends a suggestion for viewing a registered 2D image 206 of attention point to the reproduction apparatus 15. For example, in the case in which the last viewing direction is different from the viewing direction of attention point, then a suggestion for viewing the 2D image 206 of attention point may be sent.

The receiving block 123 of the reproduction apparatus 15 receives the suggestion for viewing the 2D image 206 of attention point and supplies the received suggestion to the display control block 133. In response, the display control block 133 causes the display block 134 to display the suggestion for viewing the 2D image of attention point in step S81.

When the user manipulates a manipulation block not depicted on the reproduction apparatus 15 and issues a command for viewing, then, in step S82, the receiving block 131 determines whether the moving image of attention point is to be viewed. In the case in which the moving image of attention point is determined in step S82 not to be viewed, then the 2D moving image reproduction processing ends.

In step S82, in the case in which the moving image of attention point is determined to be viewed, then the processing goes to step S83. The receiving block 131 sends a viewing command to the distribution server 13 via the network 14. In response, the 2D image distribution block 109 sends a 2D image stream corresponding to the attention point to the reproduction apparatus 15.

In step S83, the reproduction apparatus 15 reproduces the 2D moving image of attention point. That is, the receiving block 131 receives the 2D image via the network 14 and supplies the received 2D image of attention point to the decoder 132. The decoder 132 decodes the 2D image of attention point from the receiving block 131 and supplies the decoded 2D image to the display control block 133. The display control block 133 causes the display block 134 to display the decoded 2D image of attention point.

As described above, distributing a 2D image of attention point allows a proposal of viewing at a most viewed point different from the viewing by the user.

It should be noted that, in the above description, while an example of acquiring a viewing direction by line-of-sight detection has been explained, the following describes other examples.

(Viewing Direction Acquisition Processing)

Figure 11:
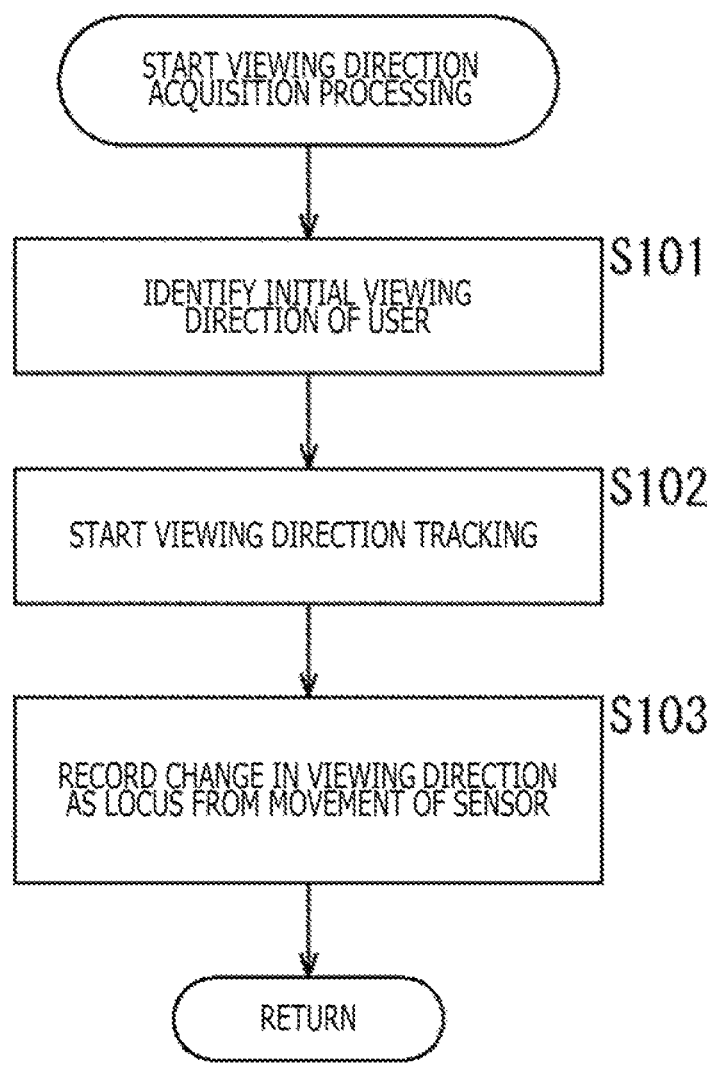
FIG. 11 is a flowchart describing the viewing direction acquisition processing to be executed in step S53 of FIG. 9.

The following describes the processing of acquiring viewing directions to be executed by the viewing direction acquisition block 128 with reference to the flowchart depicted in FIG. 11. In FIG. 11, a case is described in which viewing directions are acquired by issuing commands to various sensors. The sensors in this case include the gyro sensor 16B, an acceleration sensor, and a geomagnetic sensor mounted on the head-mounted display 16, a smartphone (a multifunctional mobile phone), and an active sensor based on infrared ray, for example.

In step S101, the viewing direction acquisition block 128 identifies an initial viewing direction of the user. It should be noted that, for the identification of an initial viewing direction, an initial viewing direction may be initialized in absolute direction or at a relative position by use of the gyro sensor 16B.

In step S102, the viewing direction acquisition block 128 starts viewing direction tracking. In step S103, the viewing direction log recording block 129 records the change in viewing direction from the movement of the gyro sensor 16B as a locus as depicted in FIG. 12.

Figure 12:
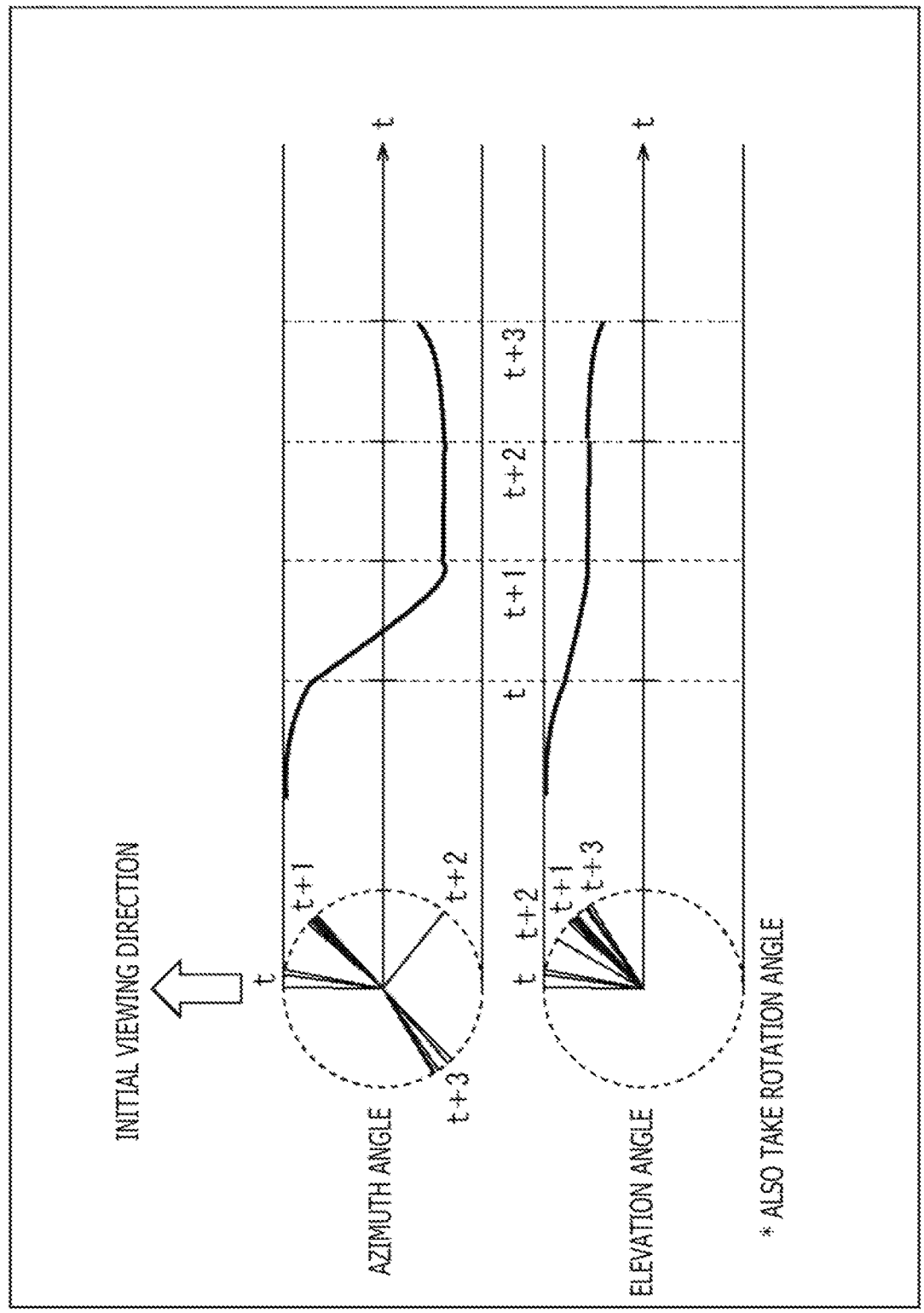
FIG. 12 is a diagram describing the viewing direction acquisition processing in FIG. 11.

The example depicted in FIG. 12 is indicative of the loci of times t through t+3 of azimuth angle and elevation angle as viewing directions with the upper section in the figure being viewing directions. It should be noted that, although not depicted in the example in FIG. 12, a rotation angle is also taken as a viewing direction, a locus thereof being recorded.

Figure 13:
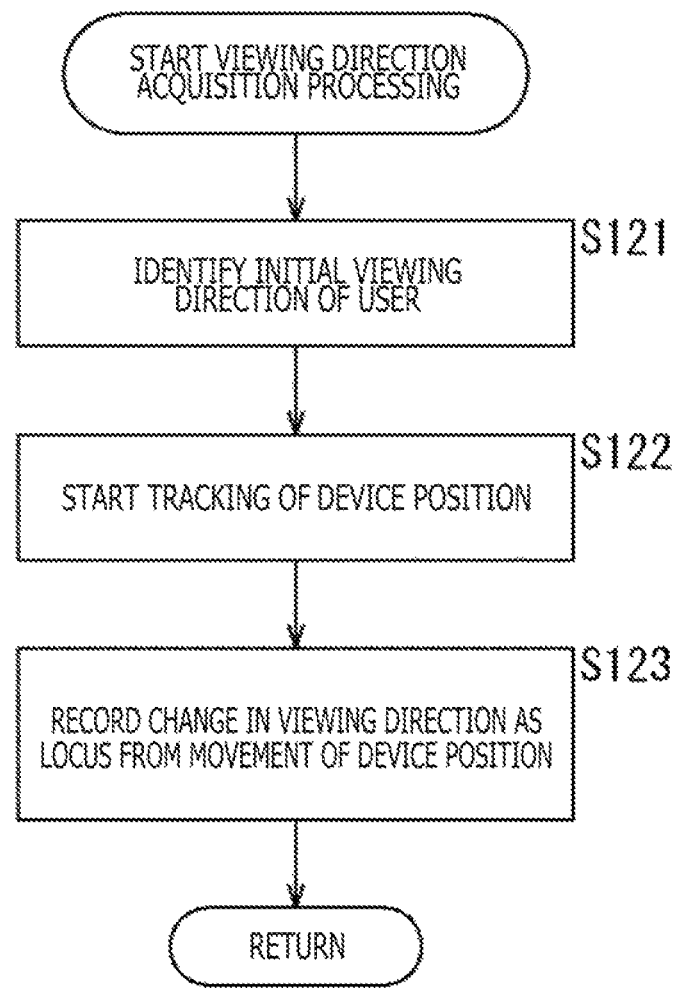
FIG. 13 is a flowchart describing another example of the viewing direction acquisition processing to be executed in step S53 of FIG. 9.

The following describes another example of viewing direction acquisition processing to be executed by the viewing direction acquisition block 128 with reference to the flowchart depicted in FIG. 13. FIG. 13 describes the case in which devices (the head-mounted display 16, a game controller, and a mouse) mounted on the user are externally observed for acquisition. The outside means in this case include the Play station (registered trademark) move and PSVR LED information, a tracking camera for the head-mounted display 16, an indoor high precision GPS, a mouse, a game controller and so on.

In step S121, the viewing direction acquisition block 128 identifies the initial viewing direction of the user.

In step S122, the viewing direction acquisition block 128 starts viewing-direction tracking of a device position. In step S123, the viewing direction log recording block 129 records a change in the viewing direction from the movement of the device position as a locus.

Figure 14B:
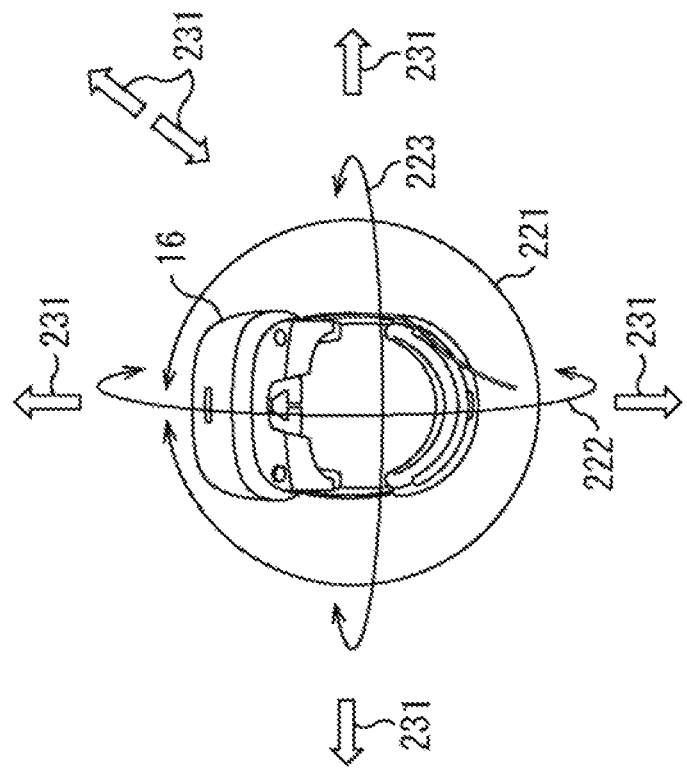
FIGS. 14A and 14B are diagrams depicting the viewing direction acquisition processing illustrated in FIG. 13.
Figure 14A:
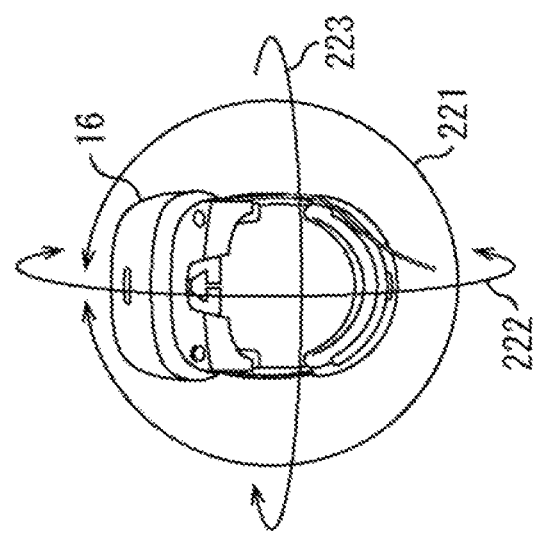

It should be noted that, in the case of the head-mounted display 16, A of FIG. 14A depicts an example in which the user is sits on a chair or the like and therefore the position of the head-mounted display 16 does not move. In the example depicted in FIG. 14A, a locus 221 of azimuth angle, a locus 222 of elevation angle, and a locus 223 of rotation angle are acquired as a viewing direction log.

Further, FIG. 14B depicts an example in which the user can freely move and change attitude and therefore the position of the head-mounted display 16 moves. In the example depicted in FIG. 14B, the a locus 221 of azimuth angle, the locus 222 of elevation angle, the locus 223 of rotation angle, and a locus 231 of moving positions in forward/backward, left/right, and diagonal directions are acquired as a viewing direction log.

It should be noted that, in the above description, viewing direction acquiring processing in the case of acquisition by issuing commands to various sensors and in the case of acquisition by the observation from the outside has been explained; also, it is practicable to acquire a viewing direction from an image seen by the user. In this case, an image in the direction in which the user sees this image is regularly captured and then matching is taken between the captured image and the distributed original image data so as to estimate the viewing direction, thereby acquiring the viewing direction. Further, in Facebook (SNS), 360-degree "Like" buttons are arranged so as to allow the recording of "Like" and a message in the viewed direction. Thus, it is also practicable that the user inputs a viewed direction so as to acquire the information thereof.

(Viewing Direction Recording Processing)

Figure 15:
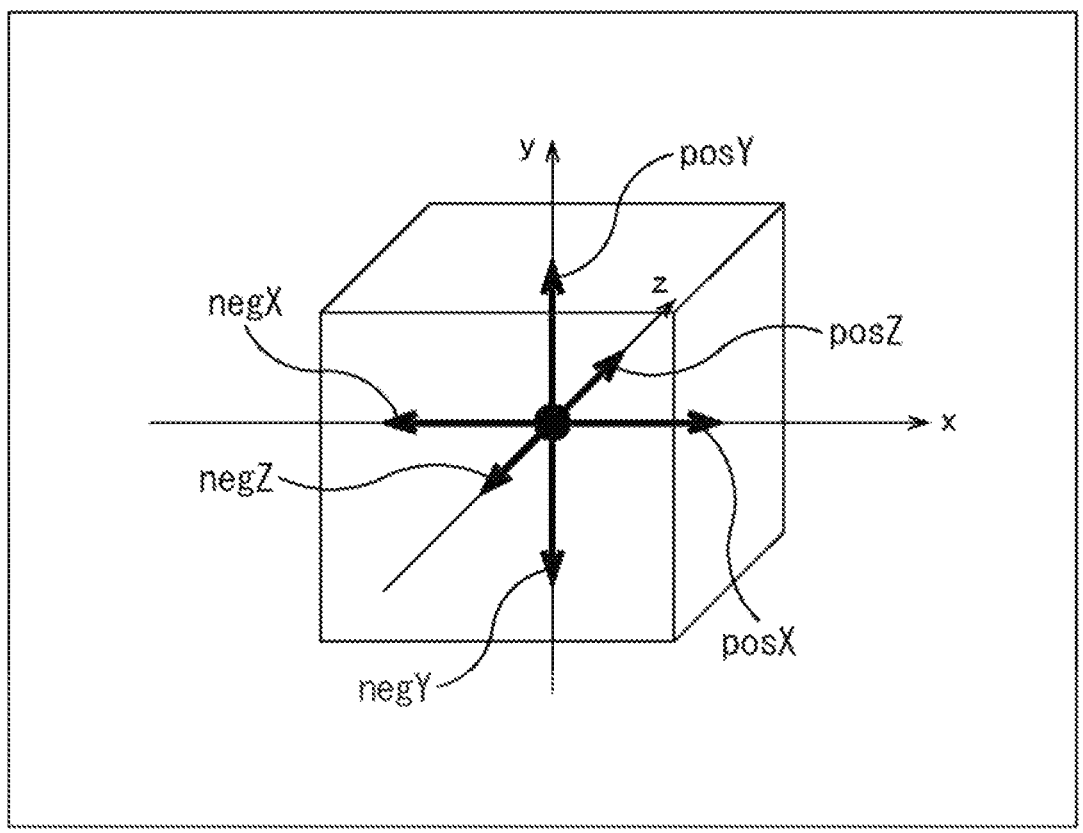
FIG. 15 is a diagram depicting an example of a hexahedral cube.

The following describes an example of writing a table of viewing direction (azimuth angle, elevation angle, and rotation angle) logs acquired as described above. It should be noted that the viewing direction logs described below are each expressed by a hexahedron cube with the positive direction of x-axis being posX, the negative direction of x-axis being negX, the positive direction of y-axis being posY, the negative direction of y-axis being negY, the positive direction of z-axis being posX, and the negative direction of z-axis being negX as depicted in FIG. 15; however, it is also practicable to provide any other number of perspective projection surfaces.

FIGS. 16A and 16B are diagrams depicting an example of a viewing direction log that is recorded by the viewing direction log recording block 129. The viewing direction log recording block 129 records a locus of the change in the viewing direction from the movement of the gyro sensor 16B describe above with reference to FIG. 12 and records (or generate) a viewing direction log as depicted in FIGS. 16A and 16B at the end of the viewing.

In the example of FIG. 16A, there is depicted a case in which the user sits on a chair or the like and therefore the head-mounted display 16 does not move.

For example, with a viewing direction log of time "t," file name is "posZ," azimuth angle is "0 degrees," elevation angle is "+30 degrees," the rotation angle is "0 degrees," line-of-sight vectors (x, y, z) are "0, 0, +1," viewpoint coordinates (x, y, z) are (0, 0, 0), horizontal view angle is "90 degrees," vertical view angle is "90 degrees," number of horizontal pixels is "1024," and number of vertical pixels is "1024."

With a viewing direction log of time "t+1," file name is "posX," azimuth angle is "90 degrees," elevation angle is "+25 degrees," the rotation angle is "0 degrees," line-of-sight vectors (x, y, z) are "+1, 0, 0," viewpoint coordinates (x, y, z) are (0, 0, 0), horizontal view angle is "90 degrees," vertical view angle is "90 degrees," number of horizontal pixels is "1024," and number of vertical pixels is "1024."

With a viewing direction log of time "t+2," file name is "posX," azimuth angle is "+90 degrees," elevation angle is "+25 degrees," the rotation angle is "0 degrees," line-of-sight vectors (x, y, z) are "+1, 0, 0," viewpoint coordinates (x, y, z) are (0, 0, 0), horizontal view angle is "90 degrees," vertical view angle is "90 degrees," number of horizontal pixels is "1024," and number of vertical pixels is "1024."

With a viewing direction log of time "t+3," file name is "negZ," azimuth angle is "−180 degrees," elevation angle is "+20 degrees," the rotation angle is "0 degrees," line-of-sight vectors (x, y, z) are "−1, 0, −1," viewpoint coordinates (x, y, z) are (0, 0, 0), horizontal view angle is "90 degrees," vertical view angle is "90 degrees," number of horizontal pixels is "1024," and number of vertical pixels is "1024."

In the example of FIG. 16B, there is depicted a case in which the user can freely move and change attitude and therefore the head-mounted display 16 moves. It should be noted that, with these viewing direction logs, time, file name, azimuth angle, elevation angle, rotation angle, line-of-sight vector, horizontal view angle, vertical view angle, number of horizontal pixels, and number of vertical pixels are the same as those of the line-of-sight direction logs depicted in FIG. 16A. In the example depicted in FIG. 16B, only that the viewpoint coordinates (x, y, z) indicative of positional information are not (0, 0, 0) in the viewing direction logs is different from the example depicted in FIG. 16A.

That is, the viewpoint coordinates (x, y, z) of the viewing direction log of time "t" are (+1, 0, 0). The viewpoint coordinates (x, y, z) of the viewing direction log of time "t+1" are (+2, 0, 0), so that it is known that a movement has been made to the right from time "t." The viewpoint coordinates (x, y, z) of the viewing direction log of time "t+2" are (0, +1, 0), so that it is known a movement has been made forward from time "t+1." The viewpoint coordinates (x, y, z) of the viewing direction log of time "t+3" are (0, 0, −3), so that it is known that movement has been made to crouching from time "t+2."

Figure 17:
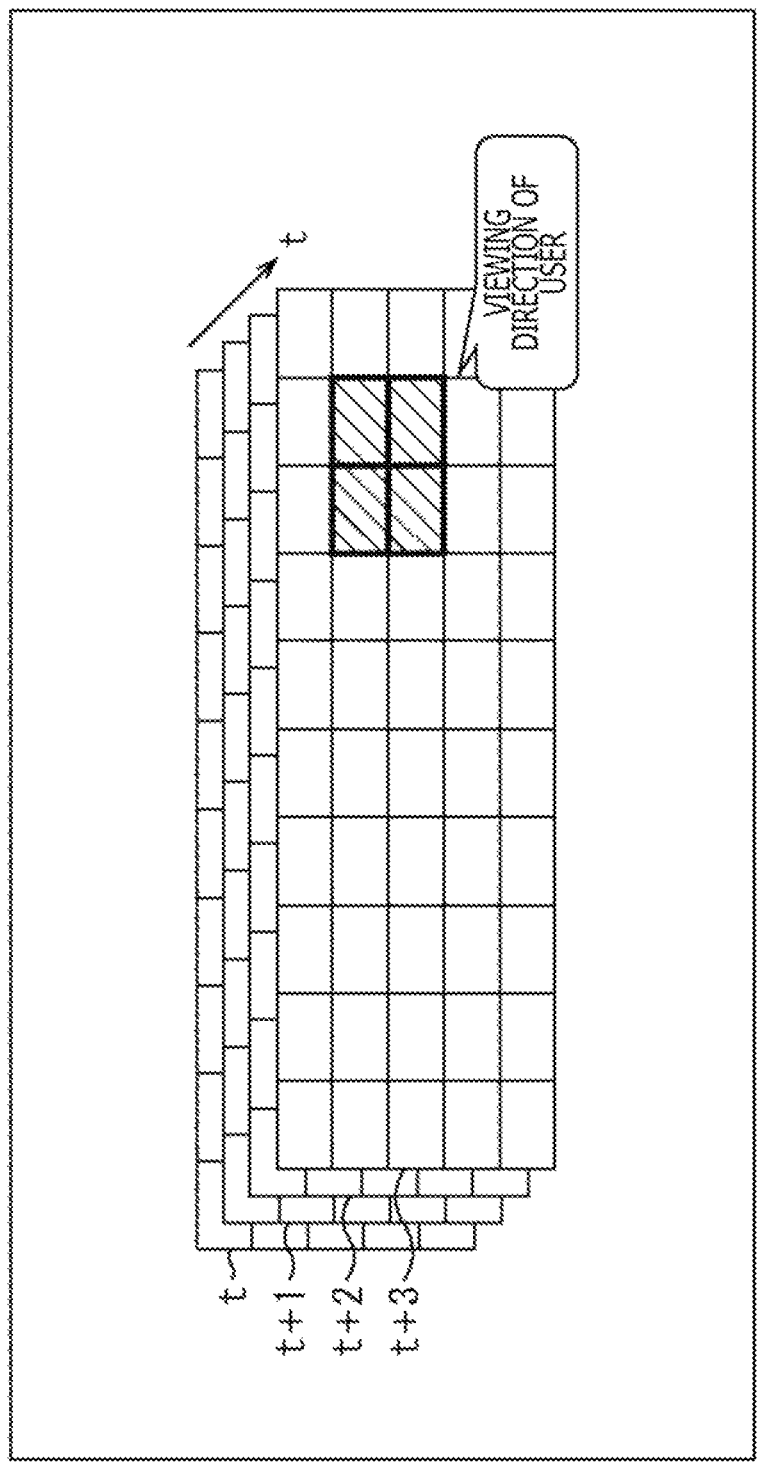
FIG. 17 is a diagram depicting another example of a viewing direction log.

It should be noted that the locus of the change in the viewing direction from the movement of the gyro sensor 16B as described above with reference to FIG. 12 may also be expressed by an equirectangular heat map as depicted in FIG. 17 as the viewing direction log.

In the example depicted in FIG. 17, the viewing logs t, t+1, t+2, and t+3 are expressed by an equirectangular heat map from the depth of the figure. For example, in the equirectangular heat map of t+3, the viewing direction of the user is indicated with an expression (hatching) different from the other directions.

It should be noted that, in the above description, the number of two-dimensional planes is five; however, the number of two-dimensional planes is not restricted to five. As the number of two-dimensional planes increases, the reproduction apparatus 15 can generates display images by use of high-resolution images corresponding to a normal line nearer to the line-of-sight of the user. Therefore, the ratio of high-resolution images to display images increases, thereby enhancing the image quality of the display images. However, since the number of high-resolution streams increases, the storage size of the storage 102 necessary for the processing and the processing amount of the generation apparatus 12 necessary for generating the high-resolution streams increase accordingly.

Further, values other than fixed values of two-dimensional plane information, number of horizontal pixels, and number of vertical pixels may be registered in a two-dimensional plane table. Still further, a two-dimensional plane may be set on a frame basis equal to or more than 1 or on a scene basis.

(Second Example of Two-dimensional Planes)

FIGS. 18A, 18B, and 18C are diagrams depicting an example of two-dimensional planes in the case in which the number of two-dimensional planes is other than five.

It should be noted that, in FIGS. 18A, 18B, and 18C, each arrow is indicative of a normal line that passes the center of each two-dimensional plane.

As depicted in FIG. 18A, the setting block 25 can set six, as two-dimensional planes, surfaces 311 through 316 of a cube 310 with center O of the sphere 40 (FIGS. 3A and 3B) being the center. In this case, the normal lines passing the center of the six two-dimensional planes are a total of six lines passing center O and in both directions of three orthogonal axes. The horizontal view angle and the vertical view angle of each two-dimensional plane are 90 degrees each and these two-dimensional planes do not overlap with each other.

That is, in this case, a high-resolution image of each two-dimensional plane is an image obtained by dividing an omnidirectional image generated by cube-mapping in unit of a surface of a cube that is a 3D model. It should be noted that the cube-mapping is a method of generating an omnidirectional image in which an image is mapped onto a cube that is a 3D model so as to use the development diagram of the cube with the image mapped as an omnidirectional image.

Further, as depicted in FIG. 18B, the setting block 25 can also set 12 two-dimensional planes such that the normal lines passing the center of each two-dimensional planes are 12 lines that pass the midpoints of the sides of the cube 310. In this case, as compared with the case depicted in FIG. 18A, the angles between the adjacent two-dimensional planes get smaller, so that the reproduction apparatus 15 can select a two-dimensional plane corresponding to a normal line nearer to the line-of-sight as a selected plane. As a result, the ratio of high-resolution images in a display image gets larger, thereby enhancing the image quality of the display image.

Still further, as depicted in FIG. 18C, the setting block 25 can set 18 two-dimensional planes such that the normal lines passing the center of each two-dimensional plane are 12 lines that pass the midpoints of the sides of the cube 310 and six lines that pass the center of each of the planes 311 through 316 of the cube 310 and center O. In this case, the two-dimensional planes are the surfaces 311 through 316 and the two-dimensional planes in the case of FIG. 18B.

In the examples depicted in FIG. 18A and FIG. 18C, the high-resolution images corresponding to the surfaces 311 through 316 can all be used so as to generate the display images corresponding to all line-of-sight directions of horizontal 360 degrees around and vertical 180 degrees around.

(Example of Change in Images)

The following describes the changing of image compression ratios as a first method of image change processing that is executed by the image change block 107 with reference to FIG. 19. It should be noted that the description will be done by use of an example in which the high-resolution images corresponding to the 18 two-dimensional planes described above with reference to FIG. 18C and the omnidirectional low-resolution images are registered in the storage 102 of the distribution server 13.

As depicted in FIG. 19, high-resolution images 251-1 through 251-18 corresponding to the 18 two-dimensional planes and an omnidirectional low-resolution image 252 are registered in the storage 102 of the distribution server 13. Then, of these images, a stream of one high-resolution image (the high-resolution image 251-15, for example) and the omnidirectional low-resolution image 252 is distributed to the reproduction apparatus 15.

Subsequently, the distribution server 13 distributes any one of the high-resolution images 251-1 through 251-15 of the selected plane selected by the reproduction apparatus 15 in accordance with the line-of-sight range of the user and the reproduction apparatus 15 acquires and records the viewing direction log. After the end of the reproduction, the recorded viewing direction log is sent from the reproduction apparatus 15 to the distribution server 13.

Then, the log analysis block 106 of the distribution server 13 analyzes the viewing direction logs from the plurality of reproduction apparatuses 15 and, by use of a predetermined threshold value, determines the image in the direction frequency viewed and the image in the direction seldom (or not) viewed.

As depicted in FIG. 20, the image change block 107 does not change the compression ratio of the high-resolution images 251-1 through 251-4, 251-15 and 251-17 determined by the log analysis block 106 to be in the frequently viewed direction, thereby leaving these images as high-resolution images.

On the other hand, the image change block 107 executes re-encoding so as to raise the compression ratio of the high-resolution images 251-5, 251-13, 251-16, and 251-18 that are adjacent to the high-resolution images in the frequently viewed direction determined by the log analysis block 106 so as to change these images to mid-resolution images, thereby overwriting the storage 102 with these mid-resolution images.

Further, the image change block 107 executes re-encoding so as to significantly raise the compression ratio the high-resolution images 251-5, 251-13, 251-16, and 251-18 that are determined in the seldom viewed direction by the log analysis block 106 so as to change these images to low-resolution images, thereby overwriting the storage 102 with the changed low-resolution images.

It should be noted that the high-resolution images 251-5, 251-13, 251-16, and 251-18 that are determined to be in the directions seldom or not viewed may be deleted from the storage 102 as depicted in FIG. 21. In this case, the images in these viewing directions are substituted with omnidirectional low-resolution images if so required.

The above-mentioned arrangement can reduce the storage capacity in the distribution server 13. It should be noted that, at the time of image changing, the resolution may also be directly changed in addition to the change in compression ratio.

The following describes, as a second image changing processing method, a method of deleting frames that are unnecessary depending upon the viewing direction and viewing time of the user from the high-resolution images on the distribution server 13.

As depicted in FIG. mapping processing block 22, the log analysis block 106 references the record of user viewing directions at time t through time t+3 so as to determine whether the viewing direction is in a viewed area (or direction) or a not viewed area. At time t, an image 261 and an image 266 are determined to be in the viewed area and an image 262 through image 265 are determined to be in the not-viewed area. At time t+1, the image 261, the image 263 and the image 265 are determined to be in the viewed area and the image 262, the image 264, and the image 265 are determined to be in the not-viewed area.

At time t+2, the image 263 is determined to be in the viewed area and the image 261, the image 262 through image 266 are determined to be in the no-viewed area. At time t+3, the image 263, the image 265, and the image 266 are determined to be in the viewed area and the image 261, the image 262, and the image 264 are determined to be in the not-viewed area.

On the other hand, at the same time, the log analysis block 106 determines references an image change amount at time t through time t+3 whether images are in the image-changed area or in the image-not-changed area. It should be noted that the change amount of each image is defined by a motion vector or flat detection.

At time t, the image 261 is determined to be in the image-changed area and the images 262 through 266 are determined to be in the image-not-chanted area. At time t+1, the image 261 and the image 263 are determined to be in the image-changed area and the image 262 and the image 264 through image 266 are determined to be in the image-not-changed area.

At time t+2, the image 263 is determined to be in the image-changed area and the image 261 and the images 262 through 266 are determined to be in the image-not-changed area. At time t+3, the image 263 and the image 265 are determined to be in the image-changed area and the image 261, the image 262, the image 264, and the image 266 are determine to be in the image-not-changed area.

Then, as depicted in FIG. 23, the image change block 107 determines, as the frames to be deleted, the images determined to be in the not-viewed area or the images determined to be the image-not-changed area. For example, an area in which data has been accumulated to a certain degree but has not been viewed at all is determined to be deleted. Further, an area may be deleted by reason of the complexity of images (a flat sequence having no movement at all), for example.

In the example depicted in FIG. 23, dashed lines are indicative of an image determined to be in a frame to be deleted. That is, at time t, the frames of the images 262 through 265 are determined to be deleted; at time t+1, the frames of the image 262, the image 264, and the image 265 are determined to be deleted; at time t+2, the frames of the image 261, the image 262, the image 264, the image 265, and the image 266 are determined to be deleted; and, at time t+3, the frames of the image 261, the image 262, and the image 264 are determined to be deleted.

It should be noted that, for the image 262, the frames are deleted at time t through time t+3; however, as depicted in the image 262 in FIG. 24, it is also practicable to delete frames in a decimated manner rather than on a batch basis.

Further, in the above description, a method of deleting the unnecessary frames from the high-resolution images on the distribution server 13 depending on the user viewing direction and viewing time has been explained; the following describes a method of sending the divided images highly possible in being viewed next depending on the user viewing direction and viewing time to the reproduction apparatus 15 beforehand with reference to FIG. 25.

That is, in the above description, one high-resolution image in accordance with a viewing range and one (omnidirectional) low-resolution image to the reproduction apparatus 15; however, it is also practicable to also send beforehand a high-resolution image highly possible in being viewed next on the basis of a viewing record.

For example, at time t, one low-resolution image and one image 261 as a high-resolution image are distributed. At time t+1, one low-resolution image and two images 261 and 263 as high-resolution images are distributed. At time t+2, one low-resolution image and two images 263 and 265 as high-resolution images are distributed. At time t+3, one low-resolution image and two images 263 and 265 as high-resolution images are distributed.

It should be noted that, in this case, re-decoding is required. Further, in the example depicted in FIG. 24, the number of high-resolution images is one or two; however, depending on the number of divisions and the divided position, the number of high-resolution images may be equal to or more than two.

The above-mentioned arrangement allows the reduction of the storage capacity of the distribution server 13 in the distribution system 11.

(Example of 2D Image Generation Processing)

The following describes a method of generating a 2D image by the 2D image generation block 108 by use of a viewing direction log with reference to FIG. 26. FIG. 26 is also indicative of the case in which 18 high-resolution images are stored.

For example, at time t, in the case in which an attention point corresponds to the directions of the image 308 and the image 311 among the image 301 through the image 318 that are high-resolution images, a 2D image 321 including the image 308 and the image 311 is generated and distributed to the reproduction apparatus 15 in response to a request.

At time t+1, in the case in which an attention point is offset from time t to the left side and corresponds to the directions of the image 305 and the image 308 among the image 301 through the image 318 that are high-resolution images, a 2D image 322 including the image 305 and the image 308 is generated and distributed to the reproduction apparatus 15 in response to a request.

The above-mentioned arrangement allows the recommendation of the viewing from another viewpoint (or point) to the user.

It should be noted that the present technology is also applicable to an image display system depicted in FIG. 27 in which the texture images and depth images of the first layer and the second layer of the six surfaces making up a cube with a viewpoint in an omnidirectional image being the center are stored to be sent to a user.

2. Second Embodiment (Configurational Example of Image Display System)

FIG. 27 is a block diagram depicting a configurational example of an image display system to which the present disclosure is applied.

An image display system 410 depicted in FIG. 27 has a multiple-camera 411, a content server 412, a home server 413, a conversion apparatus 414, and a head-mounted display 415. The image display system 410 generates an omnidirectional image from captured images that are YCbCr images (or YUV images) captured with the multiple-camera 411 and displays the images in the omnidirectional image that are within the vision field range of the user.

To be more specific, the multiple-camera 411 of the image display system 410 includes plural cameras (six units in the example in FIG. 27) arranged toward the outside with a capture range of horizontal 360 degrees around and vertical 180 degrees around. Each camera captures images so as to generate the captured images on a frame basis. The multiple-camera 411 supplies the generated captured images of these cameras to the content server 412.

The content server 412 (or the image processing apparatus) generates a texture image and a depth image of an omnidirectional image of a predetermined viewpoint from the captured images captured by the cameras supplied from the multiple-camera 411. In the second embodiment, the depth image is an image with which reciprocal number 1/r of distance r is a pixel value as a value of eight bits indicative of straight-line distance r from the predetermined viewpoint to a subject in each pixel.

The content server 412 reduces the resolution of the texture image and the depth image of the omnidirectional image so as to generate a low-resolution texture image and a low-resolution depth image. The content server 412 compressingly encodes the low-resolution texture image and the low-resolution depth image by an encoding scheme such as AVC (Advanced Video Coding) or HEVC (High Efficiency Video Coding)/H.265. The content server 412 an encoded stream of the low-resolution texture image (hereafter referred to as a low-resolution texture stream) and an encoded stream of the low-resolution depth image (hereafter referred to as a low-resolution depth stream) that are obtained as a result of the encoding.

Further, by use of the captured image captured by each camera, the content server 412 generates texture images and depth images corresponding to the six surfaces making up a cube with the viewpoint in an omnidirectional image being the center by putting these texture images and depth images into layers. To be more specific, the content server 412 generates the texture images and the depth images on the first layer and the second layer of each six surface. It should be noted that the viewpoint in an omnidirectional image and the center of a cube may be different from each other.

The content server 412 compressingly encodes the first layer image including a texture image and a depth image on the first layer of each surface and the second layer image including a texture image and a depth image on the second layer of each surface by use of an encoding scheme such as AVC or HEVC as sorted by surface, image type, and layer. The content server 412 stores an encoded stream of the texture image on the first layer of each surface (hereafter referred to as a first-layer texture stream), an encoded stream of the depth image on the first layer (hereafter referred to as the first-layer depth stream), an encoded stream of the texture image on second first layer of each surface (hereafter referred to as a second-layer texture stream), and an encoded stream of the depth image on the second layer (hereafter referred to as the second-layer depth stream) that are obtained as results of the encoding. It should be noted that the encoding scheme for a first layer image and a second layer image may be MVC (Multiview Video Coding) or 3D-HEVC.

Further, the content server 412 generates as metadata the information and so on related with each surface of the first layer and the second layer and stores the generated information and so on. The content server 412 transmits the low-resolution texture stream and the low-resolution depth stream, the first-layer texture stream, the first-layer depth stream, the second-layer texture stream, and the second-layer depth stream that are of each of the six surfaces, and the metadata that are stored in the content server 412 to the home server 413 via a network not depicted.

It should be noted that the content server 412 can reconfigure the first-layer texture stream, the first-layer depth stream, the second-layer texture stream, and the second-layer depth stream that are of each of the six surfaces. In this case, the content server 412 can also transmit the reconfigured first-layer texture stream, first-layer depth stream, second-layer texture stream, second-layer depth stream, and metadata corresponding thereto to the home server 413. However, in what follows, it is assumed that, even in the case in which the reconfiguration is executed, the first-layer texture stream, first-layer depth stream, second-layer texture stream, and the second-layer depth stream of each of the six surfaces that are before the reconfiguration be transmitted to the content server 412.

Further, as with the distribution server 13 depicted in FIG. 1, the content server 412 receives a viewing direction log sent from the home server 413, analyzes the user viewing timestamp and viewing vision field angle that are in the viewing direction log, and extracts an attention point. On the basis of the extracted attention point, the content server 412 changes the stored first-layer texture image (the compression ratio and resolution thereof, for example). It should be noted that the change may also be executed on the second-layer texture image. Still further, on the basis of the timestamp and vision field angle of the attention point, the content server 412 generates a 2D image and distributes the generated 2D image to the home server 413 of the user who has viewed at a field vision angle different from the attention point.

The home server 413 (or the image processing apparatus) receives the low-resolution texture stream and the low-resolution depth stream and the first-layer texture stream, first-layer depth stream, second-layer texture stream, second-layer depth stream and metadata that are of each of the six surfaces from the content server 412.

Further, the home server 413 incorporates a camera 413A and captures a marker 415A attached to a head-mounted display 415 worn around the head of a user. Then, on the basis of a captured image of the marker 415A, the home server 413 detects a viewing position. Further, the home server 413 receives a result of the detection by the gyro sensor 415B of the head-mounted display 415 from the head-mounted display 415 via the conversion apparatus 414. On the basis of the received result of the detection by the gyro sensor 415B, the home server 413 determines the line-of-sight direction of the user and, on the basis of the viewing position and the detected line-of-sight direction, determines the vision field range of the user.

Of the six surfaces on the first layer, the home server 413 selects the three surfaces corresponding to the line-of-sight direction of the user. Then, the home server 413 decodes the first-layer texture stream, first-layer depth stream, second-layer texture stream, and second-layer depth stream that correspond to the selected three surfaces. Consequently, the home server 413 generates the first-layer and second-layer texture images and depth images corresponding to the selected three surfaces.

Further, the home server 413 decodes the low-resolution texture stream and the low-resolution depth stream so as to generate a low-resolution texture image and a low-resolution depth image. By use of the texture image and depth image and the low-resolution texture image and low-resolution depth image on the first layer and the second layer corresponding to the selected three surfaces, the home server 413 generates an image in the vision field range of the viewer as a display image. The home server 413 sends the display image to the conversion apparatus 414 via a HDMI (registered trademark) (High-Definition Multimedia Interface) cable not depicted.

Still further, as with the reproduction apparatus 15 depicted in FIG. 1, the home server 413 records a viewing direction log that includes a log of timestamp and viewing vision field angle and, after the end of viewing, sends the recorded viewing direction log to the content server 412. In the case in which a suggestion for viewing the attention point comes from the content server 412, the home server 413 displays the display image corresponding to the 2D image of the attention point sent from the content server 412 in accordance with a manipulation by the user.

The conversion apparatus 414 converts the coordinates in the display image sent from the home server 413 into the coordinates in the head-mounted display 415. The conversion apparatus 414 supplies the display image with the coordinates converted to the head-mounted display 415.

The head-mounted display 415 has the marker 415A and the gyro sensor 415B and is worn on the head of the user. The head-mounted display 415 displays the display image supplied from the conversion apparatus 414. At the same time, the gyro sensor 415B incorporated in the head-mounted display 415 detects a tilt of the head-mounted display 415 and transmits the detection result to the home server 413 via the conversion apparatus 414.

(Configurational Example of Content Server)

FIG. 28 is a block diagram depicting a configurational example of the content server 412 depicted in FIG. 27.

The content server 412 depicted in FIG. 28 has a depth detection block 431, a low-resolution image processing block 433, and a high-resolution image processing block 434.

The depth detection block 431 of the content server 412 detects, for each pixel of a captured image captured by each camera supplied from the multiple-camera 411 depicted in FIG. 27, reciprocal number 1/z of distance z in the depth direction between the depth plane vertical to the depth direction including a subject in that pixel and the camera. The depth detection block 431 supplies a z-image with reciprocal number 1/z of each pixel of the captured image captured by each camera being a pixel value to the low-resolution image processing block 433 and the high-resolution image processing block 434.

By setting a predetermined three-dimensional position in a three-dimensional coordinate system (hereafter referred to as a camera coordinate system) of the multiple-camera 411 to a viewpoint, the low-resolution image processing block 433 maps (or perspectively projects) a captured image captured by each camera supplied from the multiple-camera 411 onto a regular octahedron with the viewpoint being the center, thereby generating a texture image of an omnidirectional image. In addition, the low-resolution image processing block 433 maps the z-image of each camera supplied from the depth detection block 431 onto a regular octahedron as with the captured images, thereby generating the z-image of the omnidirectional image.

The low-resolution image processing block 433 converts reciprocal number 1/z of each pixel of the z-image of the omnidirectional image into reciprocal number 1/r. Then, the low-resolution image processing block 433 executes 8-bit quantization on reciprocal number 1/r by equation (1) below.

[Math. 1]

$$I_d(r) = \text{round}\left[255\left(\frac{1}{r} - \frac{1}{r_{max}}\right) \Big/ \left(\frac{1}{r_{min}} - \frac{1}{r_{max}}\right)\right] \quad (1)$$

It should be noted that $I_d(r)$ is indicative of a value obtained after the 8-bit quantization executed on reciprocal number 1/r of distance r. $r_{max}$ and $r_{min}$ are indicative of a maximum value and a minimum value of the distance r in the omnidirectional image.

The low-resolution image processing block 433 uses the value obtained by the 8-bit quantization executed on reciprocal number 1/r of each pixel of the omnidirectional image as a pixel value so as to generate a depth image of the omnidirectional image.

With a predetermined three-dimensional position in the camera coordinate system being the viewpoint, the low-resolution image processing block 433 maps (or perspectively projects) the captured image captured by each camera supplied from the multiple-camera 411 onto a regular octahedron with the viewpoint being the center, thereby generating a texture image of the omnidirectional image. In addition, the low-resolution image processing block 433 maps the z-image of each camera supplied from the depth detection block 431 onto the regular octahedron as with the captured images, thereby a depth image of the omnidirectional image.

The low-resolution image processing block 433 reduces the resolutions of the texture image and depth image of the omnidirectional image so as to generate a low-resolution texture image and a low-resolution depth image. The low-resolution image processing block 433 compressingly encodes the low-resolution texture image and the low-resolution depth image and stores a low-resolution texture stream and a low-resolution depth stream obtained as the result of the encoding. The low-resolution image processing block 433 sends the stored low-resolution texture stream and low-resolution depth stream to the home server 413 depicted in FIG. 27.

By use of the captured image captured by each camera supplied from the multiple-camera 411, the high-resolution image processing block 434 generates texture images of the first layer and the second layer corresponding to the six surfaces making up a cube having the same center as that of the regular octahedron in the low-resolution image processing block 433. By use of the z-image captured by each camera supplied from the depth detection block 431, the high-resolution image processing block 434 generates the z-images of the first layer and the second layer corresponding to the six surfaces as with the captured image.

The high-resolution image processing block 434 compressingly encodes the texture images and the depth images of the first layer and the second layer of each surface as sorted by surface, image type, and layer. The content server 412 stores a first-layer texture stream, a first-layer depth stream, a second-layer texture stream, and a second-layer depth stream that are obtained as a result of the encoding.

Further, the high-resolution image processing block 434 generates and stores metadata. The content server 412 transmits the stored first layer texture stream, first layer depth stream, second layer texture stream, second layer depth stream, and metadata of each of the six surfaces to the home server 413 via a network not depicted.

(Configurational Example of High-Resolution Image Processing Block)

FIG. 29 is a block diagram depicting a configurational example of the high-resolution image processing block 434 depicted in FIG. 28.

The high-resolution image processing block 434 depicted in FIG. 29 has a first-layer generation block 450, a quantization block 451, an encoder 452, a second-layer generation block 453, a quantization block 454, an encoder 455, a setting block 456, a metadata generation block 457, a storage 458, a reconfiguration block 459, and a sending block 460. In addition, the high-resolution image processing block 434 has a receiving block 461, a log analysis block 462, an image change block 463, a 2D image generation block 464, and a 2D image distribution block 465.

Viewpoint position information indicative of the origin as the three-dimensional position of a viewpoint on the first layer in a three-dimensional coordinate system (hereafter referred to as a 3D model coordinate system) with a viewpoint of an omnidirectional image being the origin in the camera coordinate system is supplied from the setting block 456 to the first-layer generation block 450. In addition, the surface information indicative of the three-dimensional position and size in the 3D model coordinate system of each of the six surfaces making up a cube with the origin in the 3D model coordinate system being the center is supplied to the first-layer generation block 450.

The first-layer generation block 450 (or the image generation block) sets the origin indicated by the viewpoint position information to the viewpoint (or the first viewpoint) on the first layer. By setting the viewpoint of the omnidirectional image in the camera coordinate system to the origin, the first-layer generation block 450 maps, from the viewpoint on the first layer, the captured image supplied from the multiple-camera 411 depicted in FIG. 27 onto each of the six surfaces of three-dimensional position and size indicated by the surface information. Consequently, the first-layer generation block 450 generates the texture images of the six surfaces on the first layer.

Further, by setting the viewpoint of the omnidirectional image in the camera coordinate system to the origin, the first-layer generation block 450 maps, from the viewpoint on the first layer, the z-image supplied from the depth detection block 431 depicted in FIG. 28 onto each of the six surfaces of three-dimensional position and size indicated by the surface information. Consequently, the first-layer generation block 450 generates the z-images of the six surfaces on the first layer.

Since the viewpoint corresponding to the six surfaces on the first layer is the same, the texture image of the six surfaces on the first layer may be said to be an image obtained by mapping the omnidirectional image mapped to the 3D model with the viewpoint of the first layer being the center onto the six surfaces. Likewise, the z-image of the six surfaces on the first layer may be said to be an image obtained by mapping the z-image of the omnidirectional image mapped to the 3D model with the viewpoint of the first layer being the center onto the six surfaces. The first-layer generation block 450 supplies the texture image of the six surfaces on the first layer to the encoder 452 and the z-image of the six surfaces on the first layer to the quantization block 451.

The quantization block 451 converts reciprocal number 1/z of each pixel of the z-image of each of the six surfaces on the first layer supplied from the first-layer generation block 450 into reciprocal number 1/r. Then, from equation (1) mentioned above, the quantization block 451 executes 8-bit quantization on reciprocal number 1/r. It should be noted that $r_{max}$ and $r_{min}$ in equation (1) are indicative of maximum values and minimum values of distances r on all six surfaces. By setting $r_{max}$ and $r_{min}$ to maximum values and minimum values of distances r on all of six surfaces, the quantization step can be prevented from changing for each surface, as compared with the case in which $r_{max}$ and $r_{min}$ are a maximum value and a minimum value of distance r of each surface. By setting a value after the 8-bit quantization executed on reciprocal number 1/r of each pixel of the z-image of the six surfaces on the first layer to a pixel value, the quantization block 451 generates the depth images of the six surfaces on the first layer and supplies the generated depth images to the encoder 452.

The encoder 452 compressingly encodes the texture images and depth images of the six surfaces on the first layer as sorted by surface and image type so as to generate a first-layer texture stream and a first-layer depth stream. The encoder 452 supplies the first-layer texture stream and the first-layer depth stream to the storage 458.

The viewpoint position information of a viewpoint (a second viewpoint), different from the viewpoint of the first layer, of each surface on the second layer corresponding to each surface on the first layer and the surface information of each surface on the second layer corresponding to each surface on the first layer are supplied to the second-layer generation block 453 from the setting block 456. The second-layer generation block 453 sets, for each surface on the second layer, the three-dimensional position indicated by the viewpoint position information corresponding to that surface to the viewpoint of the second layer.

For each surface on the second layer, the second-layer generation block 453 (or the image generation block) maps, from the viewpoint of the second layer corresponding to that surface, an occlusion area in the viewpoint of the first layer in the captured image supplied from the multiple-camera 411 onto the surface on the second layer. Consequently, the second-layer generation block 453 generates texture images for the six surfaces on the second layer.

For each surface on the second layer, the second-layer generation block 453 (or the image generation block) maps, from the viewpoint of the second layer corresponding to that surface, an occlusion area in the viewpoint of the first layer in the z-image supplied from the depth detection block 31 onto the surface on the second layer. Consequently, the second-layer generation block 453 generates the z-images of the six surfaces on the second layer.

That is, since the position of each camera of the multiple-camera 411 is different from each other, if one three-dimensional position in the camera coordinate system is set to the viewpoint, the captured image includes the occlusion area at that viewpoint. However, since the texture image of the first layer is generated by mapping the omnidirectional image of one viewpoint, the texture image of the first layer does not include the captured image of the occlusion area at that viewpoint. Therefore, the second-layer generation block 453 includes that captured image of the occlusion area as a texture image of the second layer. This holds with a z-image. The second-layer generation block 453 supplies the texture images of the six surfaces on the second layer to the encoder 455 and the z-images of the six surfaces on the second layer to the quantization block 454.

The quantization block 454 converts reciprocal number 1/z of each pixel of the z-image of each of six surfaces on the second layer supplied from the second-layer generation block 453 into reciprocal number 1/r. Next, as with the quantization block 451, the quantization block 454 executes 8-bit quantization on reciprocal number 1/r by equation (1) mentioned above. By setting a value obtained after the 8-bit quantization executed on reciprocal number 1/r of each pixel of the z-images for the six surfaces on the second layer to a pixel value, the quantization block 454 generates the z-images of the six surfaces on the second layer and supplies the generated x-images to the encoder 455.

The encoder 455 compressingly encodes the texture images and depth images of the six surfaces on the second layer as sorted by surface and image type so as to generate a second-layer texture stream a second-layer depth stream. The encoder 455 supplies the generated second-layer texture stream and second-layer depth stream to the storage 458.

The setting block 456 sets the origin in the 3D model coordinate system as the viewpoint of the first layer. The setting block 456 sets, as the surfaces on the first layer, the six surfaces including six rectangular surfaces making up a cube with the viewpoint of the first layer being the center. Further, the setting block 456 sets the viewpoint and rectangular surface on the second layer for each surface on the first layer.

The setting block 456 supplies the one piece of viewpoint position information and six pieces of surface information of the first layer to the first-layer generation block 450 and the metadata generation block 457. In addition, the setting block 456 supplies the six pieces of viewpoint position information of the second layer corresponding to the six surfaces on the first layer and the six pieces of surface information to the second-layer generation block 453 and the metadata generation block 457.

The metadata generation block 457 generates, as metadata, a table that includes the viewpoint position information and surface information of the first layer and the viewpoint position information and surface information of the second layer that are supplied from the setting block 456 and supplies the generated information to the storage 458.

The storage 458 stores the first-layer texture stream and the first-layer depth stream supplied from the encoder 452 and the second-layer texture stream and the second-layer depth stream supplied from the encoder 455. In addition, the storage 458 stores the metadata supplied from the metadata generation block 457.

Further, the storage 458 stores the first-layer texture stream, first-layer depth stream, second-layer texture stream, second-layer depth stream, and metadata obtained after the reconfiguration supplied from the reconfiguration block 459.

The reconfiguration block 459 reads and reconfigures, as required, the first-layer texture stream, first-layer depth stream, second-layer texture stream, and second-layer depth stream stored in the storage 458 for the six surfaces.

To be more specific, the reconfiguration block 459 changes the number of surfaces and view angle corresponding to the first-layer texture stream by use of the first layer texture stream obtained before the reconfiguration and changes the number of surfaces and view angle corresponding to the first-layer depth stream by use of the first-layer depth stream obtained before the reconfiguration. For example, the reconfiguration block 459 changes the surfaces of the first layer from the six surfaces including each of the six surfaces making up a cube to 18 surfaces obtained by adding 12 surfaces with the normal lines passing the center of each of the six surfaces being lines that pass the midpoints of 12 sides of the cube and the viewpoint.

Alternatively, the reconfiguration block 459 changes an interval (or density) between the surfaces corresponding to the first-layer texture stream by use of the first-layer texture stream obtained before the reconfiguration and changes an interval between the surfaces corresponding to the first-layer depth stream by use of the first-layer depth stream obtained before the reconfiguration. For example, the reconfiguration block 459 changes the surfaces on the first layer from the six surfaces include the six surfaces making up a cube with the interval between the normal lines passing the center being 90 degrees to 18 surfaces with the interval between the normal lines passing the center being 45 degrees.

As the interval between the surfaces on the first layer gets narrow, the number of surfaces increases, so that a total data capacity increases, which, however, allows the home server 413 to generate a display image by use of the texture image and the depth image that correspond to the surfaces on the first layer nearer to the vision field range of the viewer. As a result, the high-resolution area that is generated by use of the texture image and the depth image of the first layer or the second layer increases in the display image, thereby enhancing the image quality of the display image.

It should be noted that the reconfiguration block 459 may change the position of the surface corresponding to the first-layer texture stream by use of the first-layer texture stream obtained before the reconfiguration and change the position of the surface corresponding to the first-layer depth stream by use of the first-layer depth stream obtained before the reconfiguration, thereby executing reconfiguration. In this case, if a main subject is located in the boundary of between the surfaces on the first layer, the reconfiguration block 459 execute reconfiguration by rotating the cube corresponding to the six surfaces on the first layer such that the main subject comes to a position (the center, for example) outside the boundary between the surfaces on the first layer.

Further, the reconfiguration block 459 may change the tilt of the surfaces corresponding to the first-layer texture stream by use of the first-layer texture stream obtained before the reconfiguration and the tilt of the surfaces corresponding to the first-layer depth stream by use of the first-layer depth stream obtained before the reconfiguration, thereby executing reconfiguration. In this case, if a main subject in the texture image of the first layer is tilted, for example, the reconfiguration block 459 executes reconfiguration by rotating the cube corresponding to the six surfaces on the first layer such that the tilt is eliminated.

The reconfiguration block 459 sets the reconfigured viewpoint and surface of the second layer to each of surfaces on the first layer obtained after reconfiguration. Then, the reconfiguration block 459 changes the viewpoint and surface corresponding to the second-layer texture stream to the preset viewpoint and surface of the second layer obtained after the reconfiguration by use of the second-layer texture stream obtained before the reconfiguration. In addition, the reconfiguration block 459 changes the viewpoint and surface corresponding to the second-layer depth stream to the preset viewpoint and surface of the second layer obtained after the reconfiguration by use of the second-layer depth stream obtained before the reconfiguration.

The reconfiguration block 459 supplies the first-layer texture stream, first-layer depth stream, second-layer texture stream, and second-layer depth stream that are obtained after the reconfiguration to the storage 458. In addition, the reconfiguration block 459 generates, as metadata, a table that includes the viewpoint position information and surface information of the first layer and the viewpoint position information and surface information of the second layer that are obtained after the reconfiguration, thereby supplying the generated table to the storage 458.

The sending block 460 reads the first-layer texture stream, first-layer depth stream, second-layer texture stream, second-layer depth stream, and metadata of the six surfaces from the storage 458 and sends the read streams and metadata to the home server 413 depicted in FIG. 27.

As with the receiving block 105 depicted in FIG. 6, the receiving block 461 receives the viewing direction log sent from the home server 413 and supplies the received viewing direction log to the log analysis block 462. As with the log analysis block 106 depicted in FIG. 6, the log analysis block 462 analyzes the viewing timestamp and viewing vision field angle of the user that make up the viewing direction log, extracts the most frequently viewed attention point, and supplies the information regarding the extracted attention point to the image change block 463 and the 2D image generation block 464.

As with the image change block 107 depicted in FIG. 6, the image change block 463 extracts the high-image-quality area and the low-image-quality area from the attention point extracted by the log analysis block 462 so as to change the texture image of the first layer recorded to the storage 458. For example, the compression ratio and resolution of the image are changed. As with the 2D image generation block 108 depicted in FIG. 6, the 2D image generation block 464 generates a 2D image corresponding to the attention point from the first-layer texture stream recorded to the storage 458 corresponding to the attention point extracted by the log analysis block 462 and registers the generated 2D image corresponding to the attention point into the storage 458. As with the 2D image distribution block 109 depicted in FIG. 6, the 2D image distribution block 465 sends a suggestion for viewing the registered 2D image corresponding to the attention point to the home server 413 and, in response to a request from the home server 413, distributes a stream of the 2D image corresponding to the attention point to the home server 413.

As described above, the high-resolution image processing block 434 depicted in FIG. 29 generates first-layer images and second-layer images by perspective projection. Therefore, the home server 413 can execute the processing for normal images on the first-layer images and the second-layer images. In addition, the high-resolution image processing block 434 can send the first-layer texture stream, the first-layer depth stream, the second-layer texture stream, and the second-layer depth stream in a method of sending the encoded streams of normal images.

(Configurational Example of Home Server)

FIG. 30 is a block diagram depicting a configurational example of the home server 413 depicted in FIG. 27.

The home server 413 depicted in FIG. 27 has the camera 413A, an acceptance block 481, a storage 482, an acceptance block 483, a viewing direction acquisition block 484, an ML3D model generation block 485, an ML3D model generation block 486, an ML3D model generation block 487, a 3D model generation block 488, and a drawing block 489. Further, the home server 413 has a sending block 491, a receiving block 492, a decoder 493, a display control block 494, and a display block 495.

The acceptance block 481 of the home server 413 accepts a low-resolution texture stream and a low-resolution depth stream and the first-layer texture streams, first-layer depth streams, second-layer texture streams, second-layer depth streams, metadata for the six surfaces that are sent from the content server 412 and supplies the accepted streams and metadata to the storage block 482.

The storage block 482 stores the low-resolution texture stream and the low-resolution depth stream and the first-layer texture streams, first-layer depth streams, second-layer texture streams, second-layer depth streams, metadata for the six surfaces supplied from the acceptance block 481.

The acceptance block 483 accepts a result of the detection by the gyro sensor 415B depicted in FIG. 27 from the head-mounted display 415 and supplies the accepted the detection result to the viewing direction acquisition block 484.

On the basis of the result of the detection by the gyro sensor 415B supplied from the acceptance block 483, the viewing direction acquisition block 484 determines the viewing direction (or the line-of-sight direction) of the viewer in the 3D model coordinate system. In addition, the viewing direction acquisition block 484 acquires a captured image of the marker 415A from the camera 413A and, on the basis of this captured image, detects a viewing position in the 3D model coordinate system.

The viewing direction acquisition block 484 reads the table of the first layer, the table being one of the metadata, from the storage block 482. On the basis of the viewing position and line-of-sight direction in the 3D model coordinate system and the table of the first layer, the viewing direction acquisition block 484 determines, of the six surfaces, the three surfaces corresponding to the line-of-sight vector nearest to the line-of-sight extending in the line-of-sight direction from the viewing position as the selected planes. To be more specific, the viewing direction acquisition block 484 determines, as the selected planes, a surface including one of a +X surface 81 and a −X surface 82, a surface including one of +Y surface 83 and −Y surface 84, and a surface including one of +Z surface 85 and −Z surface 86.

Determination of the selected planes as described above maximizes the ratio of the high-resolution area in a display image generated by the drawing block 489 to be described later by use of the texture images and depth images of the first layer and the second layer corresponding to the selected planes. Further, as compared with the case of selection of one selected plane, the determination of the three selected planes can increase the ratio of the high-resolution area in the display image in the case in which the line-of-sight is directed to around a vertex of the cube.

The viewing direction acquisition block 484 reads the first-layer texture stream, first-layer depth stream, second-layer texture stream, and second-layer depth stream corresponding to the three selected planes from the storage block 482. The viewing direction acquisition block 484 supplies the read first-layer texture stream, first-layer depth stream, second-layer texture stream, and second-layer depth stream to the ML3D model generation block 485 through ML3D model generation block 487, surface by surface. In addition, the viewing direction acquisition block 484 reads the low-resolution texture stream and the low-resolution depth stream from the storage block 482 and supplies these streams to the 3D model generation block 488.

Further, on the basis of the viewing position and viewing direction in the 3D model coordinate system, the viewing direction acquisition block 484 determines the vision field range of the viewer in the 3D model coordinate system. The viewing direction acquisition block 484 supplies the vision field range and viewing position of the viewer to the drawing block 489. The viewing direction acquisition block 484 supplies the three selected planes and the viewpoint position information and surface information of the three planes on the second layer corresponding to these three selected surfaces to the drawing block 489.

By use of the first-layer texture stream and the first-layer depth stream, the ML3D model generation blocks 485 through 487 each generate the three-dimensional data including three-dimensional position (u, v, z) in a texture image coordinate system of a sampling point corresponding to each pixel of the first-layer texture image and stitch information and the three-dimensional data and RGB values as color information. It should be noted that the stitch information of each sampling point is the information indicative of the stitching between that sampling point (or the vertex) and another sampling point. The texture image coordinate system is a coordinate system with the horizontal direction of the texture image being u-axis, the vertical direction being v-axis, and the depth direction being z-axis.

Further, by use of the second-layer texture stream and the second-layer depth stream supplied from the viewing direction acquisition block 484, the ML3D model generation blocks 485 through 487 each generate the three-dimensional data of a sampling point corresponding to each pixel of the second-layer texture image. The ML3D model generation blocks 485 through 487 supply the three-dimensional data of the first layer and the second layer to the drawing block 489.

The 3D model generation block 488 decodes the low-resolution texture stream and the low-resolution depth stream supplied from the viewing direction acquisition block 484 so as to generate a low-resolution texture image and a low-resolution depth image. The 3D model generation block 488 converts a YCbCr value as a pixel value of each pixel of the low-resolution texture image into an RGB value, thereby providing the RGB value of the sampling point corresponding to each pixel. Further, the 3D model generation block 488 executes 8-bit quantization on the pixel value of each pixel of the low-resolution depth image so as to obtain reciprocal number 1/r. Then, on the basis of reciprocal number 1/r of each pixel of the low-resolution depth image, the 3D model generation block 488 obtains the three-dimensional position (u, v, z) of each pixel as the three-dimensional position (u, v, z) of the sampling point corresponding to each pixel.

In addition, on the basis of the three-dimensional position (u, v, z) of each sampling point, the 3D model generation block 488 generates the stitch information of each sampling point such that the adjacent three sampling points are stitched with each other. The 3D model generation block 488 supplies the three-dimensional position (u, v, z), stitch information, and RGB value of each sampling point to the drawing block 489 as the three-dimensional data of the low-resolution texture image.

On the basis of the three-dimensional data of the low-resolution texture image supplied from the 3D model generation block 488, the drawing block 489 executes, in the 3D model coordinate system, triangular patch drawing (or point cloud drawing) of the low-resolution texture image. Subsequently, on the basis of the three-dimensional data of the first layer and the second layer supplied from the ML3D model generation blocks 485 through 237 and the viewpoint position information and surface information supplied from the viewing direction acquisition block 484, the drawing block 489 executes, in the 3D model coordinate system, triangular patch drawing of the texture images of the first layer and the second layer.

That is, the viewpoint of the low-resolution texture image is the origin in the 3D model coordinate system and the position and size of each of the surfaces of the regular octahedron as a 3D model are determined in advance. Therefore, the drawing block 489 can obtain an internal parameter and an external parameter of each camera corresponding to each surface of the regular octahedron. Hence, by use of these internal and external parameters, the drawing block 489 can recognize a position (u, v) on the screen of each sampling point and a three-dimensional position (X, Y, Z) in the 3D model coordinate system from the three-dimensional position (u, v, z) of each sampling point of the low-resolution texture image. As a result, by use of the position (u, v) on the screen and the three-dimensional position (X, Y, Z) of each sampling point and the stitch information and the RGB value of the low-resolution texture image, triangular patch drawing can be executed.

In addition, on the basis of the viewpoint position information and surface information of the first layer and the second layer, the drawing block 489 can obtain an internal parameter and an external parameter of each camera corresponding to each of the surfaces of the first layer and the second layer. Therefore, by use of these internal and external parameters, the drawing block 489 a position (u, v) on the screen and a three-dimensional position (X, Y, Z) of each sampling point from the three-dimensional position (u, v, z) of each sampling point of the first layer and the second layer. As a result, by use of the position (u, v) on the screen and the three-dimensional position (X, Y, Z) of each sampling point and the stitch information and the RGB value of the first layer and the second layer, the drawing block 489 can execute triangular patch drawing.

The drawing block 489 perspectively projects (or maps) the triangular patch drawn in the 3D model coordinate system onto the vision field range with the viewing position supplied from the viewing direction acquisition block 484 being a viewpoint, thereby generating a display image. The drawing block 489 sends the generated display image to the conversion apparatus 414 depicted in FIG. 27.

Further, as with the viewing direction acquisition block 128 depicted in FIG. 6, the viewing direction acquisition block 484 acquires a viewing timestamp and a viewing direction log that is a log of the viewing vision field angles (azimuth angle, elevation angle, and rotation angle) acquired by the viewing direction acquisition block 128 at that moment and supplies the acquired viewing timestamp and viewing direction log also to a viewing direction log recording block 490. As with the viewing direction log recording block 129 depicted in FIG. 6, the viewing direction log recording block 490 records the viewing direction log sent from the viewing direction acquisition block 484. As with the sending block 130 depicted in FIG. 6, the sending block 491 sends the viewing direction log acquired by the viewing direction log recording block 490 to the content server 412 after the end of the viewing.

As with the receiving block 131 depicted in FIG. 6, the receiving block 492 receives a viewing suggestion and a 2D image of the attention point sent from the content server 412 and supplies the received viewing suggestion of the attention point to the display control block 494 and the 2D image of the attention point to the decoder 493. As with the decoder 132 depicted in FIG. 6, the decoder 493 decodes the 2D image of the attention point sent from the receiving block 492 and supplies the decoded 2D image to the display control block 494.

As with the display control block 133 depicted in FIG. 6, the display control block 494 controls the displaying of the viewing suggestion of the attention point sent from the receiving block 492 so as to control the displaying of the decoded 2D image of the attention point in accordance with a manipulation done by the user. As with the display block 134 depicted in FIG. 6, the display block 495 includes an LCD or the like. The display block 495 displays the viewing suggestion of the attention point and the 2D image of the attention point.

The arrangement described above allows the reduction in the storage capacity of the content server 412 also in the image display system 410.

It should be noted that, in the second embodiment, a captured image is mapped to a regular octahedron so as to generate an omnidirectional image; it is also practicable for a 3D model to which a captured image is mapped to be a sphere or a cube in addition to a regular octahedron. In the case in which a captured image is mapped to a sphere, the resultant omnidirectional image is an image based on the equirectangular projection of a sphere with a captured image mapped, for example.

Further, a low-resolution texture stream and a low-resolution depth stream may not be generated. The depth images of the first layer and the second layer may not be generated. The texture image and depth image of the second layer may be generated only for some surfaces to which the captured image of an important subject is mapped.

Still further, as with a high-resolution texture image and a high-resolution depth image, a low-resolution texture image and a low-resolution depth image may be generated in a hierarchical manner.

3. Third Embodiment

The configuration of the third embodiment of a distribution system to which the present disclosure is applied is substantially the same as the configuration of the distribution system 10 depicted in FIG. 1 except that tan-axis projection (details thereof to be described later) is executed instead of perspective projection. Therefore, in what follows, only tan-axis projection will be described.

(Description of Coordinate System of Projection Surface)

FIG. 31 is a diagram depicting the coordinate system of a projection surface.

It should be noted that, in the third embodiment, the projection surface is a two-dimensional plane onto which the generation apparatus 12 tan-axis-projects an omnidirectional image mapped to a sphere in generating a high-resolution image or a vision field range in which the reproduction apparatus 15 tan-axis-projects a 3D model image in generating a display image.

In the example depicted in FIG. 31, in the three-dimensional xyz coordinate system of a 3D model, a projection surface 501 with z being −1.0 is set. In this case, a 2-dimensional st coordinate system with center O' of the projection surface 501 being the origin, the horizontal direction of the projection surface 501 being s direction, and the vertical direction being t direction provides the coordinate system of the projection surface 501.

It should be noted that, in what follows, a vector 502 directed from origin O of the xyz coordinate system to the coordinates (s, t) of the st coordinate system is referred to as a vector (s, t, −1.0) by use of the coordinates (s, t) and −1.0 that is a distance from origin O to the projection surface 501.

3. Third Embodiment (Description of Tan-Axis Projection)

FIG. 32 is a diagram depicting tan-axis projection (or tangent-axis projection).

FIG. 32 is a diagram with the projection surface 501 seen in the negative direction of z. In the example depicted in FIG. 32, the minimum value and the maximum value of the s value and the t value of the projection surface 501 are −1.0 and 1.0, respectively, in the st coordinate system.

In this case, in perspective projection, a projection point is set on the projection surface 501 such that a projection vector directed from origin O to the projection point on the projection surface 501 becomes a vector (s', t'−1.0). It should be noted that s' is indicative of a value at each predetermined interval arranged in a range of s values −1.0 to 1.0 and t' is indicative of a value at each predetermined interval in a range of t values −1.0 to 1.0. Therefore, the projection points in perspective projection are uniform on the projection surface 501.

By contrast, if the view angle of the projection surface 501 is θw (π/2 in the example in FIG. 32), then, in tan-axis projection, the projection point is set on the projection surface 501 such that the projection vector becomes vector (tan(s'*θw/2), tan(t'*θw/2), −1.0).

To be more specific, let s'*θw/2 be θ and t'*θw/2 be φ, then vector (tan(s'*θw/2), tan(t'*θw/2), −1.0) becomes vector (tan θ, tan φ, −1.0). At this moment, as view angle θw approaches π, tan θ and tan φ infinitely diverted. Therefore, the projection point is set on the projection surface 501 such that, in order for tan θ and tan φ to be prevented from infinite diversion, vector (tan θ, tan φ, −1.0) is corrected to vector (sin θ*cos φ, cos θ*sin φ, −cos θ*cos φ) to make the projection vector become vector (sin θ*cos φ, cos θ*sin φ, −cos ω*cos φ). Hence, in tan-axis projection, the angles between the projection vectors corresponding to adjacent projection points becomes identical.

It should be noted that, as with logarithmic axis (or log scale), tan(s'*θw/2) and tan(t'*θw/2) are understood as s' and t' of tan-axis. Therefore, in the present description, the projection in which the projection vector becomes vector (tan(s'*θw/2), tan(t'*θw/2), −1.0) is referred to as tan-axis projection.

As described above, in the third embodiment, a high-resolution image is generated by tan-axis-projecting an omnidirectional image mapped to a sphere onto a two-dimensional plane, so that the image quality of the high-resolution image can be enhanced. In addition, since a display image is generated by tan-axis-projecting a 3D model image to a vision field range, the image quality of the display image can be enhanced.

It should be noted that the projection to be executed in generating a high-resolution image or a display image may be other than perspective projection and tan-axis projection. Further, projection may be executed on different two-dimensional planes by use of different projection schemes. Still further, in the third embodiment, an example has been described in which tan-axis projection is used instead of perspective projection as another example of the distribution system 10 depicted in FIG. 1; however, it is also practicable to use tan-axis projection instead of perspective projection also in the case of the image display system 410 depicted in FIG. 27.

4. Fourth Embodiment (Description of Computer to which Present Disclosure is Applied)

The above-mentioned sequence of processing operations can be executed by hardware as well as software. In the case of execution of the sequence of processing operations by software, the programs making up that software are installed in a computer. It should be noted that the computer includes a computer assembled in dedicated hardware or a general-purpose personal computer capable of executing various functions by installing various programs.

FIG. 33 is a block diagram depicting the hardware configurational example of a computer for executing the above-mentioned sequence of processing operations by programs.

In the computer 900, a CPU (Central Processing Unit) 901, a ROM (Read Only Memory) 902, and a RAM (Random Access Memory) 903 are interconnected by a bus 904.

The bus 904 is further connected to an input/output Interface 905. The input/output interface 905 is connected to an input block 906, an output block 907, a storage block 908, a communication block 909, and a drive 910.

The input block 906 includes a keyboard, a mouse, a microphone, and the like. The output block 907 includes a display, a speaker, and the like. The storage block 908 includes a hard disk drive and, a nonvolatile memory, and the like. The communication block 909 includes a network interface and the like. The drive 910 drives a removable medium 911 such as a magnetic disc, an optical disc, a magneto-optical disc, a semiconductor memory, or the like.

In the computer 900 configured as described above, for example, the CPU 901 loads programs stored in the storage block 908 into the RAM 903 via the input/output interface 905 and the bus 904 and executes the loaded programs so as to execute the above-mentioned sequence of processing operations.

The programs to be executed by the computer 900 (the CPU 901) can be provided as recorded to the removable medium 911 as a package medium and the like, for example. In addition, the programs can be provided via a wired or wireless transmission medium such as a local area network, the Internet, and digital satellite broadcasting.

In the computer 900, programs can be installed in the storage block 908 via the input/output interface 905 by loading the removable medium 911 in which the programs are installed onto the drive 910. Further, programs can be received by the communication block 909 via a wired or wireless transmission medium so as to be installed in the storage block 908. In addition, programs can be installed in the ROM 902 or the storage block 908 in advance.

It should be noted that the programs to be executed by the computer 900 may be the programs that are executed in time sequence along the sequence described herein or the programs that are executed in parallel as required on an on-demand basis.

5. Application Examples

The technology related with the present disclosure is applicable to a variety of products. For example, the technology related with the present disclosure may be realized in apparatuses that are installed on any types of the vehicles such as automobiles, electric cars, hybrid electric cars, motor bicycles, bicycles, personal mobilities, airplanes, drones, ships, robots, construction machines, agriculture machines (tractors), and so on.

FIG. 34 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 34, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 35 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 35 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 35 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 34, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 32, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 32 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

It should be noted that a computer program for realizing each of the functions of the distribution system 10 or the image display system 410 related with the present embodiments as described with reference to FIG. 1 through FIG. 32 can be installed in any of the control units or the like. Further, a computer-readable recording medium in which such a computer program is stored can be provided. The recording medium is a magnetic disc, an optical disc, a magneto-optical disc, a flash memory, or the like. Still further, the above-mentioned computer program may be distributed via a network instead of being stored in the recording medium.

In the vehicle control system 7000 described above, the distribution system 10 or the image display system 410 related with the present embodiments as described with reference to FIG. 1 through FIG. 32 is applicable to the vehicle control system 7000 of the application example depicted in FIG. 34. For example, the image capture apparatus 11 of the distribution system 10 and the multiple-camera 411 of the image display system 410 correspond to at least a part of the imaging section 7410. Further, the generation apparatus 12, the distribution server 13, and reproduction apparatus 15 are unitized and the content server 412, the home server 413, and the conversion apparatus 414 are unitized so as to correspond to the microcomputer 7610 and the storage section 7690 of the integrated control unit 7600. The head-mounted display 16 and the head-mounted display 415 correspond to the display section 7720. It should be noted that, in the case in which the distribution system 10 or the image display system 410 is applied to the vehicle control system 7000, the camera 15A, the marker 16A, and the gyro sensor 16B and the camera 413A, the marker 415A, and the gyro sensor 415B are not arranged; instead, the line-of-sight direction and the viewing position of the user are inputted through the input section 7800 manipulated by the driver, or the user. As described above, applying the distribution system 10 or the image display system 410 to the vehicle control system 7000 that is an application example depicted in FIG. 34 allows the generation of high-image-quality display images by use of an omnidirectional image.

Further, at least some of the components of the distribution system 10 or the image display system 410 described with reference to FIG. 1 through FIG. 32 may be realized in modules (integrated-circuit modules configured by one die, for example) for the integrated control unit 7600 depicted in FIG. 34. Alternatively, the distribution system 10 or the image display system 410 described with reference to FIG. 1 through FIG. 32 may be realized by a plurality of control units of the vehicle control system 7000 depicted in FIG. 34.

In the present description, a system denotes an aggregation of a plurality of components (apparatuses, modules (parts), and so on) regardless whether or not all components are mounted in one same housing. Therefore, a plurality of apparatuses mounted in separate housings and interconnected via a network and one apparatus with a plurality of modules mounted in one housing are each regarded as a system.

It should be noted that the effects described herein are illustrative only and therefore not limited thereto; namely, other effects may be provided.

It should be noted that the embodiments of the present disclosure are not limited to the embodiments described above and therefore changes and variations may be made to the embodiments without departing from the spirit of the present disclosure.

For example, the present disclosure can take a configuration of cloud computer in which one function is dividedly and jointly processed by a plurality of apparatuses through a network.

Each step described in the flowcharts described above can be executed on one apparatus or on a plurality of apparatuses in a divided manner.

Further, in the case in which a plurality of processing operations are included in one step, the plurality of processing operations included in that one step can be executed by one apparatus or a plurality of apparatuses in a divided manner.

It should be noted that the present disclosure can also take the following configuration.

(1)

An image processing apparatus including:

an acceptance block configured to accept, of a plurality of images generated by projecting an omnidirectional image mapped to a 3D model onto a plurality of two-dimensional planes, an image corresponding to a viewing direction of a user and the omnidirectional image reduced in resolution;

a drawing block configured to generate a display image on the basis of at least one of the image or the omnidirectional image reduced in resolution accepted by the acceptance block;

a viewing direction acquisition block configured to acquire viewing direction information related with the viewing direction of the user; and a sending block configured to send a viewing direction log recorded on the basis of the viewing direction information acquired by the viewing direction acquisition block.

(2)

The image processing apparatus according to (1) above, in which the viewing direction acquisition block acquires the viewing direction information on the basis of an observation value acquired from a sensor mounted on the user.

(3)

The image processing apparatus according to (1) above, in which the viewing direction acquisition block acquires the viewing direction information on the basis of an observation value acquired from an outside apparatus.

(4)

The image processing apparatus according to (1) above, in which the viewing direction acquisition block acquires the viewing direction information by regularly acquiring an image in a direction viewed by the user.

(5)

The image processing apparatus according to (1) above, in which the viewing direction acquisition block acquires the viewing direction information on the basis of a manipulation done by the user.

(6)

The image processing apparatus according to any one of (1) to (5) above, in which the viewing direction log has a log of an azimuth angle, an elevation angle, and a rotation angle of the user and a timestamp.

(7)

The image processing apparatus according to any one of (1) to (6) above, in which the viewing direction log also includes positional information of the user.

(8)

The image processing apparatus according to any one of (1) to (7) above, in which the acceptance block accepts the plurality of images, an image corresponding to the viewing direction of the user among images changed from the plurality of images in accordance with the viewing direction log, and the omnidirectional image reduced in resolution.

(9)

The image processing apparatus according to any one of (1) to (8) above, further including:

a 2D image receiving block configured to receive a 2D image generated by use of an image in a most frequently viewed viewing direction among the plurality of images in accordance with the viewing direction log; and a display control block configured to control displaying of the 2D image received by the 2D image receiving block.

(10)

An image processing method executed by an image processing apparatus, including:

an acceptance step of accepting, of a plurality of images generated by projecting an omnidirectional image mapped to a 3D model onto a plurality of two-dimensional planes, an image corresponding to a viewing direction of a user and the omnidirectional image reduced in resolution;

a drawing step of generating a display image on the basis of at least one of the image or the omnidirectional image reduced in resolution accepted by the process in the acceptance step;

a viewing direction acquisition step of acquiring viewing direction information related with the viewing direction of the user; and a sending step of sending a viewing direction log recorded on the basis of the viewing direction information acquired by the process in the viewing direction acquisition step.

(11)

An image processing apparatus including:

a storage block configured to store a plurality of images generated by projecting an omnidirectional image mapped to a 3D model onto a plurality of two-dimensional planes and the omnidirectional image reduced in resolution;

a sending block configured to send the omnidirectional image and an image corresponding to a viewing direction of a user among the plurality of images to a terminal;

an acceptance block configured to accept a viewing direction log related with the viewing direction of the user from the terminal; and an image change block configured to change the plurality of images stored in the storage block in accordance with the viewing direction log accepted by the acceptance block.

(12)

The image processing apparatus according to (11) above, in which the viewing direction log has a log of an azimuth angle, an elevation angle, and a rotation angle of the user and a timestamp.

(13)

The image processing apparatus according to (11) or (12) above, in which the viewing direction log also includes positional information of the user.

(14)

The image processing apparatus according to any one of (11) to (13) above, in which the image change block changes a compression ratio of an image in a viewing direction not viewed among the plurality of images in accordance with the viewing direction log accepted by the acceptance block.

(15)

The image processing apparatus according to any one of (11) to (13) above, in which the image change block changes a resolution of an image in a viewing direction not viewed among the plurality of images in accordance with the viewing direction log accepted by the acceptance block.

(16)

The image processing apparatus according to any one of (11) to (13) above, in which the image change block deletes an image in a viewing direction not viewed among the plurality of images in accordance with the viewing direction log accepted by the acceptance block.

(17)

The image processing apparatus according to any one of (11) to (13) above, in which the image change block deletes an image in a viewing direction not viewed or having no image change amount among the plurality of images in accordance with the viewing direction log accepted by the acceptance block and image change amount.

(18)

The image processing apparatus according to (17) above, in which, in accordance with the viewing direction log accepted by the acceptance block and the image change amount, in a case in which images in a viewing direction not viewed or having no image change amount among the plurality of images continue in a time direction, the image change block decimates in a time direction images in the viewing direction not viewed or having no image change amount.

(19)

The image processing apparatus according to any one of (11) to (18) above, further including:

an image generation block configured to generate a 2D image by use of an image in a most frequently viewed viewing direction among the plurality of images stored in the storage block in accordance with the viewing direction log accepted by the acceptance block; and an image provision block configured to provide the 2D image generated by the image generation block to the terminal.

(20)

An image processing method executed by an image processing apparatus, including:

a sending step of sending, from a storage block in which a plurality of images generated by projecting an omnidirectional image mapped to a 3D model onto a plurality of two-dimensional planes and the omnidirectional image reduced in resolution are stored, the omnidirectional image and an image corresponding to a viewing direction of a user among the plurality of images to a terminal;

an acceptance step of accepting a viewing direction log related with the viewing direction of the user from the terminal; and an image changing step of changing the plurality of images stored in the storage block in accordance with the viewing direction log accepted by the process in the acceptance step.

REFERENCE SIGNS LIST

10 . . . Distribution system, 11 . . . Image capture apparatus, 12 . . . Generation apparatus, 13 . . . Distribution server, 14 . . . Network, 15 . . . Reproduction apparatus, 16 . . . Head-mounted display, 102 . . . Storage, 103 . . . Sending block, 104 . . . Sending block, 105 . . . Receiving block, 106 . . . Log analysis block, 107 . . . Image change block, 108 . . . 2D image generation block, 109 . . . 2D image distribution block, 128 . . . Viewing direction acquisition block, 129 . . . Viewing direction log recording block, 130 . . . Sending block, 131 . . . Receiving block, 132 . . . Decoder, 133 . . . Display control block, 134 . . . Display block, 410 . . . Image display system, 411 . . . Multiple-camera, 412 . . . Content server, 413 . . . Home server, 414 . . . Conversion apparatus, 415 . . . Head-mounted display

The invention claimed is:

1. An image processing apparatus, comprising:
an acceptance block configured to accept a first image of a plurality of images and a first omnidirectional image, wherein
generation of the plurality of images is based on a projection of the first omnidirectional image, mapped to a 3D model, onto a plurality of two-dimensional planes,
the first image corresponds to a viewing direction of a user associated with the image processing apparatus, and
the first omnidirectional image is a low-resolution image generated from a second omnidirectional image;
a drawing block configured to generate a display image based on the first image and the first omnidirectional image;
a viewing direction acquisition block configured to acquire viewing direction information related with the viewing direction of the user; and
a sending block configured to send a viewing direction log,
wherein the viewing direction log is based on the viewing direction information.

2. The image processing apparatus according to claim 1, wherein
the viewing direction acquisition block is further configured to acquire the viewing direction information based on an observation value acquired from a sensor mounted on the user.

3. The image processing apparatus according to claim 1, wherein
the viewing direction acquisition block is further configured to acquire the viewing direction information based on an observation value acquired from an outside apparatus.

4. The image processing apparatus according to claim 1, wherein
the viewing direction acquisition block is further configured to acquire the viewing direction information based on regular acquisition of a specific image in the viewing direction of the user.

5. The image processing apparatus according to claim 1, wherein
the viewing direction acquisition block is further configured to acquire the viewing direction information based on a user input.

6. The image processing apparatus according to claim 1, wherein
the viewing direction log includes a log of a plurality of viewing vision field angles of the user and a log of a timestamp, and
the plurality of viewing vision field angles comprises an azimuth angle, an elevation angle, and a rotation angle.

7. The image processing apparatus according to claim 6, wherein the viewing direction log further includes positional information of the user.

8. The image processing apparatus according to claim 1, wherein
the acceptance block is further configured to accept the plurality of images and a specific image corresponding to the viewing direction of the user, and
the specific image is among images changed from the plurality of images based on the viewing direction log.

9. The image processing apparatus according to claim 1, further comprising:
a 2D image receiving block configured to receive a 2D image based on the viewing direction log, wherein
generation of the 2D image is based on a second image of the plurality of images, and
the second image is in a most frequently viewed viewing direction of the user; and
a display control block configured to control display of the 2D image.

10. An image processing method, comprising: in an image processing apparatus:
accepting a first image of a plurality of images and a first omnidirectional image, wherein
generation of the plurality of images is based on a projection of the first omnidirectional image, mapped to a 3D model, onto a plurality of two-dimensional planes,
the first image corresponds to a viewing direction of a user associated with the image processing apparatus, and
the first omnidirectional image is a low-resolution image generated from a second omnidirectional image;
generating a display image based on the first image and the first omnidirectional image;
acquiring viewing direction information related with the viewing direction of the user; and
sending a viewing direction log,
wherein the viewing direction log is based on the viewing direction information.

11. An image processing apparatus, comprising:
a storage block configured to store a plurality of images and a first omnidirectional image, wherein
generation of the plurality of images is based on a projection of the first omnidirectional image, mapped to a 3D model, onto a plurality of two-dimensional planes, and
the first omnidirectional image is a low-resolution image generated from a second omnidirectional image;
a sending block configured to send the first omnidirectional image and a first image of the plurality of images to a terminal,
wherein the first image corresponds to a viewing direction of a user associated with the terminal;
an acceptance block configured to accept a viewing direction log related with the viewing direction of the user from the terminal; and
an image change block configured to change, based on the viewing direction log, the plurality of images stored in the storage block.

12. The image processing apparatus according to claim 11, wherein
the viewing direction log includes a log of a plurality of viewing vision field angles of the user and a log of a timestamp, and
the plurality of viewing vision field angles comprises an azimuth angle, an elevation angle, and a rotation angle.

13. The image processing apparatus according to claim 12, wherein the viewing direction log further includes positional information of the user.

14. The image processing apparatus according to claim 11, wherein
the image change block is further configured to change a compression ratio of a second image of the plurality of images based on the viewing direction log, and
the second image is in a non-viewing direction of the user.

15. The image processing apparatus according to claim 11, wherein
the image change block is further configured to change a resolution of a second image of the plurality of images based on the viewing direction log, and
the second image is in a non-viewing direction of the user.

16. The image processing apparatus according to claim 11, wherein
the image change block is further configured to delete a second image of the plurality of images based on the viewing direction log, and
the second image is in a non-viewing direction of the user.

17. The image processing apparatus according to claim 11, wherein
the image change block is further configured to delete at least one of a second image of the plurality of images or a third image of the plurality of images, based on the viewing direction log and an image change amount,
the second image is in a non-viewing direction of the user, and
the third image has no image change amount.

18. The image processing apparatus according to claim 17, wherein, in a case in which at least one of the second image or the third image continues in a time direction, the image change block is further configured to decimate in the time direction at least one of the second image or the third image.

19. The image processing apparatus according to claim 11, further comprising:
an image generation block configured to generate a 2D image based on the viewing direction log and a second image of the plurality of images,
wherein the second image is in a most frequently viewed viewing direction of the user; and
an image provision block configured to provide the 2D image to the terminal.

20. An image processing method, comprising: in an image processing apparatus:
storing a plurality of images and a first omnidirectional image in a storage block of the image processing apparatus, wherein
generation of the plurality of images is based on a projection of the first omnidirectional image, mapped to a 3D model, onto a plurality of two-dimensional planes, and
the first omnidirectional image is a low-resolution image generated from a second omnidirectional image;
sending the first omnidirectional image and an image of the plurality of images to a terminal,
wherein the image corresponds to a viewing direction of a user associated with the terminal;
accepting a viewing direction log related with the viewing direction of the user from the terminal; and
changing, based on the viewing direction log, the plurality of images stored in the storage block.

* * * * *